US012669574B2

(12) United States Patent     (10) Patent No.:   US 12,669,574 B2

Vollbracht et al.     (45) Date of Patent:    Jun. 30, 2026

(54) RADAR ANTENNA SYSTEM

(71) Applicant: Aptiv Technologies AG, Schaffhausen (CH)

(72) Inventors: Dennis Vollbracht, Hilden (DE); Sachit Varma, Duisburg (DE)

(73) Assignee: Aptiv Technologies AG, Schaffhausen (CH)

( * ) Notice: Subject to any disclaimer, the term of this patent is extended or adjusted under 35 U.S.C. 154(b) by 220 days.

(21) Appl. No.: 18/435,169

(22) Filed: Feb. 7, 2024

(65) Prior Publication Data

US 2024/0329192 A1     Oct. 3, 2024

(30) Foreign Application Priority Data

Mar. 31, 2023    (EP) ...................................... 23165837

(51) Int. Cl.
   *G01S 7/03*       (2006.01)
   *G01S 13/931*     (2020.01)

(52) U.S. Cl.
   CPC .............. *G01S 7/03* (2013.01); *G01S 13/931* (2013.01)

(58) Field of Classification Search
   CPC .................................. G01S 7/03; G01S 13/931
   See application file for complete search history.

(56) References Cited

U.S. PATENT DOCUMENTS

| | | | | |
|---|---|---|---|---|
| 8,760,355 B1 * | 6/2014 | Tonn | .......................... | H01Q 1/34 |
| | | | | 343/709 |
| 10,082,570 B1 * | 9/2018 | Izadian | .................... | H01Q 13/06 |
| 2004/0041663 A1 * | 3/2004 | Uchimura | ............... | H01P 1/2088 |
| | | | | 333/135 |
| 2018/0102578 A1 * | 4/2018 | Huang | .................... | H01P 11/007 |
| 2021/0104818 A1 | 4/2021 | Li et al. | | |
| 2021/0239791 A1 * | 8/2021 | Vollbracht | ............. | G01S 13/931 |
| 2021/0320425 A1 * | 10/2021 | Arkind | .................. | H01Q 21/061 |
| 2022/0317289 A1 * | 10/2022 | Alexanian | ............. | H01Q 21/005 |

OTHER PUBLICATIONS

Extended European Search Report regarding European Patent Application No. 23165837.8, dated Sep. 28, 2023.

* cited by examiner

*Primary Examiner* — William Kelleher
*Assistant Examiner* — Hailey R Le
(74) *Attorney, Agent, or Firm* — Harness, Dickey & Pierce, PLC

(57)           ABSTRACT

A radar antenna system comprises a first antenna, an additional first antenna, a second antenna, a guiding section, a branching section, an additional branching section, a filter section and an additional filter section. The branching section and the additional branching section are coupled in series in between the guiding section and the first antenna. The branching section couples the filter section to the guiding section and the additional branching section couples the additional filter section to the guiding section. The guiding section guides energy at a first, second and further frequency. The filter section couples the guiding section to the second antenna, blocks energy at the first frequency and passes energy at the second frequency. The additional filter section couples the guiding section to the second antenna or to a termination, blocks energy at the first frequency and passes energy at the further frequency.

20 Claims, 33 Drawing Sheets

<u>Fig. 4</u>

1
112, 121,
186, 206
102
301
20
110
180,
185
310
130,
132
114
134
200,
205
160,
162
106
350,
355
104
146
120
164
351,
147
160,
166
31
167
100
137
300
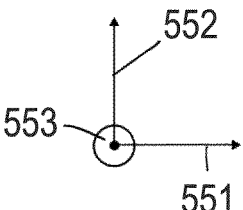
552
553
551
<u>Fig. 8</u>

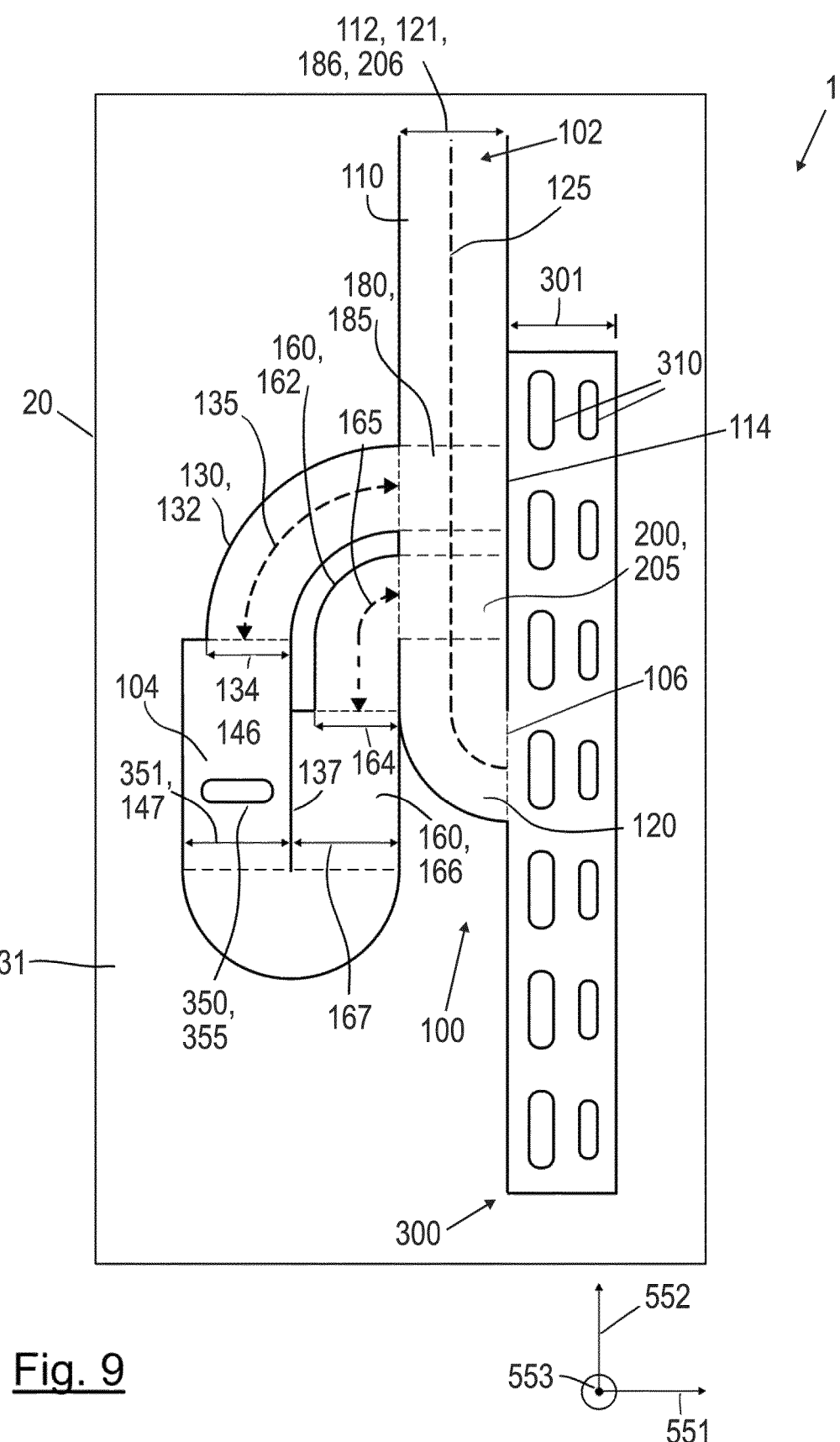
<u>Fig. 9</u>

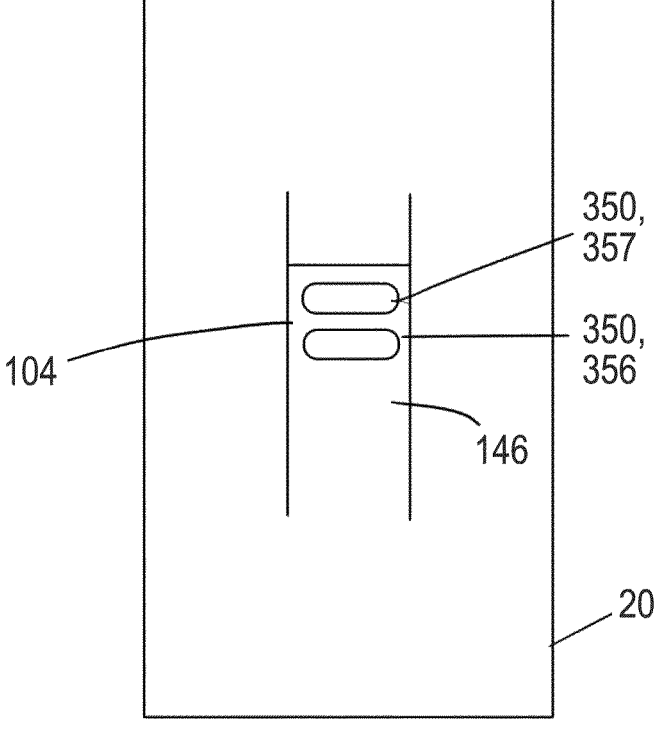
350,
357
350,
356
104
146
20
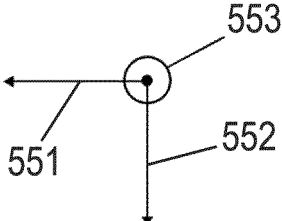
553
551
552
Fig. 23

<u>Fig. 28</u>

RADAR ANTENNA SYSTEM

CROSS-REFERENCE TO RELATED APPLICATION

This application claims the benefit and priority of European patent application number 23165837.8, filed on Mar. 31, 2023. The entire disclosure of the above application is incorporated herein by reference.

FIELD

The present disclosure relates to a radar antenna system, a radar system and a vehicle comprising a radar system.

BACKGROUND

This section provides background information related to the present disclosure which is not necessarily prior art.

Radar antenna systems are used to sense an environment by irradiating target objects within the environment with radar signals and by capturing reflections of the radar signals from the target object. By evaluating the reflected radar signals, properties of the target object, such as a distance, an angular location and/or a velocity may be determined.

When mounting such radar antenna systems on a vehicle, the information obtained from the radar signals may then further be used to perform functions that control the vehicle. In automotive applications, such vehicle control functions may comprise advanced driver's assist functions or autonomous driving functions, such as adaptive cruise control, lane change assist, parking assistance, blind spot detection, street condition monitoring or the like.

The individual functions of a vehicle control system usually demand different radar antennas with different characteristics of their antenna field. For example, automotive functions like adaptive cruise control, direction of arrival, lane change assist and lane keep assist demand a radiation field that provides high gain and high resolution at long distances. Other functions, like parking assistance, object detection, detection and classification of over/underdriveable obstacles, blind spot detection, cross traffic alert or street condition monitoring require a large field of view in elevation direction at short ranges to enable the differentiation of target reflections which are very close to the radar antenna and thus have large angular spread in the elevation or vertical direction at short range.

Typical radar antenna systems are usually optimized to provide an antenna field that suits one specific type of vehicle control function. Consequently, a typical vehicle needs to have a multitude of radar sensors to be able to perform a multitude of control functions. The number of radar sensors that may be used however is limited by their cost and the number of suitable mounting positions available at the vehicle. Furthermore, the individual functions performed by the vehicle control system usually demand a high isolation between the individual radar antennas to allow beamforming algorithms to achieve the angular resolution required for target isolation and direction of arrival estimation. This further limits the possible minimum distances between individual radar antennas and thus the minimum sizes of the entire antenna systems.

Accordingly, there is a need to provide radar antenna systems that allow for the dense integration of different radar antennas while simultaneously providing high isolation between the individual antennas.

SUMMARY

This section provides a general summary of the disclosure and is not a comprehensive disclosure of its full scope or all of its features.

The present disclosure provides a radar antenna system, a radar system and a vehicle comprising a radar antenna system according to the independent claims. Embodiments are given in the dependent claims, the description and the drawings.

In one aspect, the present disclosure is directed at a radar antenna system for a vehicle comprising a first antenna, a second antenna and a transmission line network. The transmission line network has a guiding section, a branching section, an additional branching section, a filter section and an additional filter section. The branching section and the additional branching section are coupled in series in between the guiding section and the first antenna. The filter section is coupled in parallel to the first antenna via the branching section and the additional filter section is coupled in parallel to the first antenna via the additional branching section. The filter section is configured to block electromagnetic energy at a first frequency or within a first frequency band and to pass electromagnetic energy at a second frequency or within a second frequency band. The additional filter section is configured to block electromagnetic energy at the first frequency or within the first frequency band and to pass electromagnetic energy at a further frequency or within a further frequency band. Furthermore, all sections of the transmission line network that couple the first antenna to the guiding section are configured to pass electromagnetic energy at the first frequency or within the first frequency band. The filter section couples the guiding section to the second antenna and the additional filter section couples the guiding section to the second antenna or to a termination of the transmission line network.

The radar antenna system provides a compact integration of at least two radar antennas that operate at different frequencies, for example on a single antenna board. The filter section allows to frequency-selectively and separately activate one of the antennas to transduce electromagnetic radiation only via the activated antenna but not via the other antenna. This allows to use the bandwidth of a radar circuit connected to the radar antenna system to selectively activate the first antenna by tuning the operating frequency of the radar circuit to the first frequency or to the first frequency band and to selectively activate the second antenna by tuning the operating frequency to the second frequency or the second frequency band.

With the radar antenna system, one of the filter section and the additional filter section connects the second antenna to the guiding section and the other one of the filter section and the additional filter section connects the second antenna or a termination to the guiding section. Both of these variants have the technical effect to enhance the isolation between the second antenna and the first antenna, compared to implementations that only feature a single branching section.

According to a general embodiment, the filter section and the additional filter section are configured to connect the same antenna to the guiding section. For example, an antenna element of the antenna or several antenna elements of the antenna may be connected to the guiding section via both the filter section and the additional filter section, for example via a single port. As another example of connecting the same antenna to the guiding section via the filter section and the additional filter section, a first antenna element or several first antenna elements of the antenna may only be connected to the guiding section via the filter section and not via the additional filter section, for example via a first port, and a second antenna element or several second antenna elements of the antenna may only be connected to the guiding section via the additional filter section and not via the filter section, for example via a second port.

Embodiments with additional filter sections that couple the additional branching section to a termination of the transmission line network prevent reflection of the electromagnetic energy coupled into the additional filter section and thus efficiently isolate the first antenna from the second antenna. The termination may be configured as an impedance matched termination. The termination may be configured as a standing wave termination, such as an open-circuited transmission line segment or a short-circuited transmission line segment. The termination may also be configured as a load, such as a resistive load.

The branching section may comprise an end that couples the filter section to the guiding section and the additional branching section may comprise an end that couples the additional filter section to the guiding section.

The guiding section may be configured to guide electromagnetic energy at the first frequency or within the first frequency band, to guide electromagnetic energy at the second frequency or within the second frequency band and to guide electromagnetic energy at the further frequency or within the further frequency band.

The first antenna may be configured to only transduce at the first frequency or within the first frequency band but not to transduce at the second frequency or within the second frequency band. Likewise, the second antenna may be configured to only transduce at the second frequency or within the second frequency band. Additionally or alternatively, the second antenna may be configured to not transduce at the first frequency or in the first frequency band.

The first antenna and the second antenna may be placed on the same antenna board. The first antenna and/or the second antenna may be configured as waveguide antennas, such as substrate integrated waveguide antennas. The first antenna and/or the second antenna may be configured as leaky waveguide antennas with antenna elements that comprise openings within the respective waveguide of the first antenna or the second antenna. The first antenna and/or the second antenna may, for example, be configured as slotted waveguide antennas.

The first antenna may be configured as an elongated antenna that extend in an elongation direction. The elongation direction constitutes a longitudinal direction of the first antenna. The first antenna may comprise a multitude of antenna elements that are placed next to each other in the elongation direction.

The second antenna and/or the filter section may be placed at longitudinal positions that are located in between longitudinal ends of the first antenna along the elongation direction or longitudinal direction of the first antenna. This provides for a compact construction of the radar antenna system also parallel to the elongation direction of the first antenna.

A number of antenna elements of the second antenna may be smaller than a number of antenna elements of the first antenna. For example, the first antenna may have at least two times, such as at least three times or at least four times, the number of antenna elements of the second antenna.

The second antenna may be configured to have a larger field of view in a transverse direction than the first antenna. For example, the transverse direction may be orientated perpendicular to the separation direction and/or parallel to the elongation direction of the first antenna.

The transmission line network may form a feed network of the antenna system. The transmission line network may couple the first antenna and the second antenna of the antenna system to a feed port of the radar antenna system, whereby the feed port is configured to be connected to a radar circuit. The transmission line network and the first and second antennas may be placed on a single antenna board of the radar antenna system. The second antenna may be coupled to the coupling section via a port of the transmission line network and the first antenna may be coupled to the guiding section via an additional port of the transmission line network. The first antenna and/or the second antenna may be directly connected to the respective port so that the respective port is directly located at the respective antenna, for example directly at an antenna element of the respective antenna.

In general, the transmission line network may couple one or more additional antennas in addition to the first antenna and the second antenna to the guiding section via the branching section. For example, one or more additional antennas in addition to the second antenna may be coupled to the branching section via the coupling section.

In general, the guiding section may be configured to guide electromagnetic energy at one or more additional frequencies in addition to electromagnetic energy at the first frequency, at the second frequency and at the further frequency. Analogously, the guiding section may be configured to guide electromagnetic energy within one or more additional frequency bands in addition to electromagnetic energy within the first frequency band, within the second frequency band and within the further frequency band.

The frequencies passed by the filter section or the additional filter section, such as the second frequency, constitute respective passed frequencies of the filter section or the additional filter section and the frequency bands passed by the filter section or the additional filter section, such as the second frequency band, constitute respective passed frequency bands of the filter section or the additional filter section.

The frequencies blocked by the filter section or the additional filter section, such as the first frequency, constitute respective blocked frequencies of the filter section or the additional filter section and the frequency bands blocked by the filter section or the additional filter section, such as the first frequency band, constitute respective blocked frequency bands of the filter section or the additional filter section.

In general, the filter section may be configured to block electromagnetic energy at one or more additional frequencies in addition to electromagnetic energy at the first frequency and/or to pass electromagnetic energy at one or more additional frequencies in addition to electromagnetic energy at the second frequency. Analogously, the filter section may be configured to block electromagnetic energy within one or more additional frequency bands in addition to electromagnetic energy within the first frequency band and/or to pass electromagnetic energy within one or more additional frequency bands in addition to electromagnetic energy within the second frequency band.

In general, the additional filter section may be configured to block electromagnetic energy at one or more additional frequencies in addition to electromagnetic energy at the first frequency and/or to pass electromagnetic energy at one or more additional frequencies in addition to electromagnetic energy at the further frequency. Analogously, the additional filter section may be configured to block electromagnetic energy within one or more additional frequency bands in addition to electromagnetic energy within the first frequency band and/or to pass electromagnetic energy within one or more additional frequency bands in addition to electromagnetic energy within the further frequency band.

Generally, all sections of the transmission line network that couple the first antenna to the guiding section may be configured to pass electromagnetic energy at one or more additional frequencies in addition to electromagnetic energy at the first frequency. Analogously, all sections of the transmission line network that couple the first antenna to the guiding section may be configured to pass electromagnetic energy within one or more additional frequency bands in addition to electromagnetic energy within the first frequency band.

According to an embodiment, the further frequency equals the second frequency. Likewise, the further frequency band may equal the second frequency band.

This provides a high isolation of the first antenna from the electromagnetic energy having the second frequency or from electromagnetic energy within the second frequency band. As a result, the electromagnetic energy at the second frequency or within the second frequency band is only transduced via the second antenna but not via the first antenna.

According to an embodiment, an end of the branching section that couples to the filter section and an end of the additional branching section that couples to the additional filter section are located at opposite sides from a longitudinal path connecting the guiding section to the first antenna via the branching section and the additional branching section. This isolates the respective ends of the branching sections from each other and helps to provide a steep frequency response of the filter sections connected to the respective ends of the branching sections.

In general, the branching section and/or the additional branching section each may comprise a first end, a second end and a third end. The end of the branching section that is coupled to the filter section may be the second end of the branching section and the end of the additional branching section that is coupled to the additional filter section may be the second end of the additional branching section. The guiding section may be coupled to the respective first ends of the branching section and the additional branching section and the first antenna may be coupled to the respective third ends of the branching section and the additional branching section. The third end of one of the branching section and the additional branching section may be coupled to the first end of the other one of the branching section and the additional branching section.

The longitudinal path may comprise a straight segment. The straight segment may comprise the branching section and/or the additional branching section. Additionally or alternatively, the straight segment may comprise an additional feed section that couples the first antenna to the branching sections. For example, the straight segment may comprise the branching section, the additional branching section and the additional feed section.

The longitudinal path may also comprise a bent segment. The bent segment may, for example, be located within the additional feed section connecting the first antenna to the branching sections.

According to an embodiment, the additional branching section is coupled in between the branching section and the first antenna. This prevents electromagnetic energy exiting from the guiding section from being disturbed before passing the branching section that feeds the second antenna. In particular, it prevents electromagnetic energy at the second frequency or within the second frequency band from being disturbed before passing the branching section. The second antenna thus receives a large amount of electromagnetic energy at the second frequency or within the second frequency band.

The filter section and/or the additional filter section may be configured as high-pass filters within a frequency range comprising the first and second frequency. Cutoff frequencies of the filter section and/or the additional filter section may be located in between the first frequency and the second frequency.

According to an embodiment, the filter section and/or the additional filter section are configured as stepped impedance filters. This provides a compact integration of the filter section and/or the additional filter section into the transmission line network.

A stepped impedance filter is formed by at least two transmission line segments that are serially coupled to each other and that have differing impedances. The transmission line segments may be configured as waveguide segments. The serially coupled transmission line segments, such as the serially coupled waveguide segments, thereby may have alternating high and low impedance values. In particular, a first transmission line segment, such as a first waveguide segment, may have a first impedance that is larger than a second impedance of a neighboring second transmission line segment, such as a neighboring second waveguide segment.

All transmission line segments of the stepped impedance filter are shorter than associated guided wavelengths at the first frequency and/or the second frequency or within the first frequency band and/or the second frequency band so that the individual transmission line segments act as lumped circuit elements. For example, a longitudinal length of the transmission line segments may amount to at most at most 0.8, such as at most 1.2 or at most 1.6 times the guided wavelength at the first frequency and/or at the second frequency or within the first frequency band and/or the second frequency band. The transmission line segments having a high impedance value, such as the first transmission line segment, then may act as series inductors and the transmission line segments having a low impedance value, such as the second transmission line segment, may act as shunt capacitors.

A stepped impedance filter thus deviates from a resonating filter in that it does not feature a resonating volume but a series of distributed transmission line segments with differing and/or alternating impedances.

The filter section being configured as a stepped impedance filter is not an essential feature of the present disclosure. With other embodiments of the transmission line network according to the present disclosure, the filter section may also comprise other types of filters, such as resonating structures.

According to an embodiment, the additional filter section couples the guiding section to the second antenna and the second antenna comprises an antenna element that is coupled to the guiding section via both the filter section and the additional filter section. This provides an efficient coupling between the guiding section and the antenna element.

According to an embodiment, the additional filter section couples the guiding section to the second antenna and the second antenna comprises a first antenna element and a second antenna element. The first antenna element thereby is coupled to the guiding section via the filter section but not via the additional filter section and the second antenna element is coupled to the guiding section via the additional filter section but not via the filter section. This provides a high flexibility in shaping the antenna field of the second antenna.

According to an embodiment, the radar antenna system further comprises an additional first antenna. The first antenna and the additional first antenna are placed at a distance from each other in a separation direction and the second antenna is placed in between the first antenna and the additional first antenna. Additionally, the filter section and/or the branching section are placed in between the first antenna and the additional first antenna.

Placing the filter section and/or the branching section and the second antenna in between the first antenna and the additional first antenna provides a compact construction and cost-efficient manufacture of the radar antenna system. Furthermore, due to the filter section, the transmission line network allows to frequency-selectively route electromagnetic energy within the antenna system, such as between the guiding section of the transmission line network and the antennas of the antenna system.

A distance between the first antenna and the additional first antenna along the separation direction may amount to an integer multiple of half a wavelength of electromagnetic energy within the first frequency band or within the second frequency band. For example, the distance may amount to an integer multiple of half a wavelength of electromagnetic energy at the first frequency or the second frequency.

As far as no differences are disclosed, the additional first antenna is configured as it is disclosed for the first antenna and vice versa.

The additional first antenna may be connected to a guiding section that is separate from the guiding section coupled to the first antenna. For example, the first antenna and the additional first antenna may be configured to be connected to separate ports of a radar circuit.

The additional first antenna may be configured as an elongated antenna that extends in an elongation direction. The elongation direction constitutes a longitudinal direction of the additional first antenna. The elongation direction of the additional first antenna and/or the elongation direction of the first antenna may be orientated perpendicular to the separation direction.

The additional first antenna may, for example, be configured as a waveguide antenna, such as a substrate integrated waveguide antenna. The additional first antenna may be configured as a leaky waveguide antenna with antenna elements that comprise openings within the waveguide of the additional first antenna. The additional first antenna may, for example be configured as slotted waveguide antenna. The additional first antenna may comprise a multitude of antenna elements that are placed next to each other in the elongation direction.

The second antenna and/or the filter section may be placed at longitudinal positions that are located in between longitudinal ends of the additional first antenna along the elongation direction of the additional first antenna. This provides for a compact construction of the radar antenna system also parallel to the elongation direction of the additional first antenna.

A number of antenna elements of the second antenna may be smaller than a number of antenna elements of the additional first antenna. For example, the additional first antenna may have at least two times, such as at least three times or at least four times, the number of antenna elements of the second antenna.

The second antenna may be configured to have a larger field of view in a transverse direction than the additional first antenna. For example, the transverse direction may be orientated perpendicular to the separation direction and/or parallel to the elongation direction of the additional first antenna.

Antenna elements of the first antenna and antenna elements of the additional first antenna, such as all antenna elements of the first antenna and all antenna elements of the second antenna, may be orientated parallel to each other. The antenna elements of the second antenna may be orientated perpendicular to the antenna elements of the first antenna and/or the antenna elements of the additional first antenna.

The first antenna and the additional first antenna may be part of an antenna array configured to operate at the first frequency or within the first frequency band. The antenna array may, for example, be adapted to be operated in a multiple-input-multiple-output (MIMO) configuration. The antenna system according to the present disclosure then allows to integrate a second antenna that is operated at the second frequency or within the second frequency band into this antenna array.

In general, one or more additional antennas in addition to the second antenna may be placed in between the first antenna and the additional first antenna and/or one or more additional sections of the transmission line network in addition to the filter section and/or the branching section may be placed in between the first antenna and the additional first antenna.

According to an embodiment, the transmission line network is configured as a waveguide network, such as a substrate integrated waveguide (SIW) network. This allows for a compact and cost-efficient implementation of the transmission line network. Furthermore, such a transmission line network features a rugged construction that is suited for use in automotive applications.

According to an embodiment, a transverse width of the filter section is smaller than a transverse width of the guiding section and the transverse width of the filter section is adapted to block the electromagnetic energy having the first frequency and to pass the electromagnetic energy having the second frequency.

The transmission line network having such a filter section provides a compact and highly integrated setup for implementing a filter functionality for high frequencies. It thereby enables frequency selective routing of radar signals between a feed port at the guiding section and the first or second or third antenna. By implementing the filter section as a section having a different width than the guiding section, the filter section may be configured as a stepped impedance filter integrated into transmission line network, such as into the waveguide, for example into the substrate integrated waveguide (SIW).

In general, the transverse width of the filter section may be adapted to block electromagnetic energy at the blocked frequencies or within the blocked frequency bands and to pass electromagnetic energy at the passed frequencies or within the passed frequency bands. Additionally or alternatively, the longitudinal length of the filter section may be adapted to block electromagnetic energy at the blocked frequencies or within the blocked frequency bands and to pass electromagnetic energy at the passed frequencies or within the passed frequency bands.

The filter section may have a lateral boundary structure that defines the width of the filter section and that has a multitude of boundary elements that are placed behind each other along the length of the filter section. For example, the lateral boundary structure may comprise at least five, at least eight, at least ten or at least twelve boundary elements. This realizes the filter function of the filter section with a multitude of elements that are distributed over a path having a length that is larger than the width of the filter section.

A larger amount of boundary elements enhances the stability of the filter function with respect to production tolerances compared to filter structures having a smaller number of boundary elements. With the filter section according to the present disclosure, small changes in the alignment of the series line of boundary elements is less sensitive to production tolerances compared to, for example, dual resonance filters or diplexer structures. In diplexer structures or dual resonator structures, the resonance volume is typically defined by a set of two or four boundary elements (dual resonator structures have two volumes to provide the two resonances; these volumes are defined by stand-alone pairs of boundary elements). When these boundary elements exhibit positional shifts due to production tolerances, the resonance frequency can shift significantly. Consequently, at high operating frequencies, such as at frequencies of about 77 GHz, diplexer or dual resonator structures are sensitive to production tolerances.

Diplexers and dual resonance filters may provide a steeper transition curve than stepped impedance filters. According to the present disclosure, this may be compensated by at least one additional branching section coupled in series with the branching section. For example, each branching section may provide an isolation improvement of at least 3 dB at the second frequency and/or within the second frequency band, such as at 80.5 GHz.

The transmission line network and thus also the radar antenna system comprising the transmission line network is simple in construction and may be fabricated with low efforts and costs. At the same time, the integration of the filter section makes it robust to production jitters or tolerance.

In addition to the width, also a longitudinal length of the filter section may be adapted to block the electromagnetic energy at the first frequency or within the first frequency band and to pass the electromagnetic energy at the second frequency or within the second frequency band. In general, the filter section may have a predetermined width in a transverse direction and/or a predetermined length along a longitudinal path that are adapted to block the electromagnetic energy at the first frequency or within the first frequency band and to pass the electromagnetic energy at the second frequency or within the second frequency band.

The guiding section and/or the coupling section and/or the filter section may extend along a longitudinal path. The longitudinal path may define the propagation direction of the electromagnetic energy within the guiding section and/or the coupling section and/or the filter section. A transverse direction of each respective section may be orientated perpendicular to the longitudinal path. The transverse width of the filter section may be the width of the filter section in the transverse direction and the transverse width of the guiding section may be the width of the guiding section in the transverse direction.

The transmission line network may be implemented on an antenna board. The antenna board may comprise a substrate that is made from an electrically insulating material such as a plastic or a ceramic material. The substrate may be covered by an electrically conducting material. For example, the substrate may be coated by the electrically conducting material. The electrically conducting material may, for example, be a metal, such as copper or gold. The antenna board may be fabricated as a printed circuit board. The antenna board may also comprise a substrate that is fabricated as an injection molded component and that is covered by an electrically conducting material.

The antenna board may have a top plate and/or a bottom plate. The top plate and the bottom plate may be located at opposite surfaces of the antenna board and/or the substrate. The top plate and/or the bottom plate may be electrically conducting. For example, the top plate and/or the bottom plate may be made from the electrically conducting material.

With transmission line networks that are configured as waveguides, the waveguide may be bounded in the transverse direction by a lateral boundary structure that is placed in between a top surface and a bottom surface of the waveguide, for example between a top surface and a bottom surface of the antenna board and/or substrate. For example, the lateral boundary structure may connect the top plate and the bottom plate of the antenna board. The lateral boundary structure may be electrically conducting. For example, the lateral boundary structure may comprise a metal.

The lateral boundary structure may comprise several boundary elements, such as posts or via holes. The individual boundary elements may be placed next to each other and spaced by a distance. This distance may be shorter than the wavelength of the electromagnetic energy guided within the waveguide. For example, the distance may be at most 0.5 times, such as at most 0.2 times or 0.1 times the wavelength of the electromagnetic energy.

Alternatively, the lateral boundary structure may also comprise a single boundary element. The boundary element may extend along the longitudinal path without interruptions. The boundary element may, for example, be configured as a continuous lateral wall.

The waveguide network may be configured as a substrate integrated waveguide (SIW). The substrate integrated waveguide may comprise a top plate and a bottom plate which are positioned at opposite sides of the antenna board and lateral boundary structures that connect the top plate and the bottom plate through the antenna board.

Alternatively, the waveguide network may also be configured as any other type of waveguide, such as an air-filled waveguide or a waveguide filled with a dielectric other than air. The waveguide may comprise a top plate and a bottom plate that are orientated parallel to each other and lateral boundary structures, which are configured as lateral continuous surfaces, that delimit the waveguide in a transverse direction that is orientated parallel to the top plate and the bottom plate. With all embodiments of waveguide networks, the top plate, the bottom plate and the lateral boundary structures may fully enclose a mode volume of the waveguide in a transverse plane perpendicular to the propagation direction. The top plate, the bottom plate and the lateral boundary structures may be freestanding metallic structures. Alternatively, the top plate, the bottom plate and the lateral boundary structures may also be configured as conductive surfaces of a dielectric carrier structure. The dielectric carrier structure may, for example, comprise injection-molded members.

The filter section may be delimited by at least one iris wall that defines the width of the filter section. The iris wall may form the lateral boundary structure of the filter section. The iris wall may be displaced perpendicular to the longitudinal path with respect to the lateral boundary structure of the guiding section.

The electromagnetic energy having the first and second frequencies or the electromagnetic energy within the first and second frequency bands may represent individual radar signals. The radar signals may exhibit a modulation of at least one signal parameter, such as a phase, an amplitude, a pulse duration, a pulse distance or the like, to encode information and/or to allow to discern individual radar signals that all have the first frequency and/or individual radar signals that all have the second frequency.

The first frequency and the second frequency may be separate frequencies. The first frequency may be part of the first frequency band and/or the second frequency may be part of the second frequency band. The filter section may be adapted to block electromagnetic energy within the entire first frequency band and to pass electromagnetic energy within the entire second frequency band.

The radar antenna system may be configured to block electromagnetic energy at blocked frequencies, such as at the blocked frequencies of the individual filter sections, by attenuating them by at least −3 dB, such as by at least −5 dB or at least −10 dB. The radar antenna system may be configured to pass electromagnetic energy at passed frequencies, such as at the passed frequencies of the individual filter sections, by attenuating them by at most −10 dB, such as at most −5 dB or at most −3 dB.

The first frequency and/or the second frequency may be at least 50 GHz, such as at least 65 GHz, at least 70 GHz, at least 75 GHz or at least 76 GHz. Additionally or alternatively, the first frequency and/or the second frequency may be at most 200 GHz, such as at most 160 GHz, at most 140 GHz, at most 100 GHz, at most 90 GHz, at most 85 GHz or at most 81 GHz. For example, the first frequency and/or the second frequency may lie in between 76 GHz and 81 GHz.

Furthermore, a lower bound of the first frequency band and/or a lower bound of the second frequency band may be at least 50 GHz, such as at least 65 GHz, at least 70 GHz, at least 75 GHz or at least 76 GHz. Additionally or alternatively, an upper bound of the first frequency band and/or an upper bound of the second frequency band may be at most 100 GHz, such as at most 90 GHz, at most 85 GHz or at most 81 GHz. For example, the first frequency band and/or the second frequency band may lie in between 75.75 GHz and 81 GHz.

The first frequency band and the second frequency band may be separated by a frequency gap. The frequency gap may amount to at least 0.5 GHz, such as at least 0.75 GHz or at least 1 GHz. For example, the lower bound of one of the first and second frequency band may amount to 76 GHz and the upper bound of the other one of the first and second frequency band may amount to 81 GHz. For example, one of the first and second frequency band, such as the first frequency band, may have a lower bound of 75.75 GHz and an upper bound of 76.75 GHz or 78 GHz or 78.25 GHz and the other one of the first and second frequency band, such as the second frequency band, may have a lower bound of 78.75 GHz or 79 GHz and an upper bound of 81 GHz.

The guiding section may be configured to be connected to a radar circuit. For example, the guiding section may be coupled to a feed port of the transmission line network that is configured to be connected to a circuit port of the radar circuit. For example, the feed port that is coupled to the guiding section may be configured to be directly connected to the circuit port, such as by gluing or welding. In general, all feed ports of the antenna system may be configured to be directly connected to corresponding circuit ports of the radar circuit, for example by gluing or welding.

The radar circuit may be configured to handle radar signals at the first and second frequency or within the first and second frequency band that are transferred via the feed port between the radar circuit and the guiding section. The radar circuit may be configured to handle the radar signals by generating electromagnetic energy representing the radar signals and by transmitting the electromagnetic energy via the circuit port. Additionally or alternatively, the radar circuit may be configured to handle the radar signals by receiving electromagnetic energy that represents the radar signals via the circuit port and by evaluating the electromagnetic energy.

For generating the electromagnetic energy that represents the radar signals, the radar circuit may comprise a transmit chain. The transmit chain may be configured to convert digital or analog control signals received by the radar circuit to radar signals at the first and second frequency or within the first and second frequency band. The transmit chain may, for example, comprise digital-to-analog converters, oscillators, amplifiers or the like. For evaluating the electromagnetic energy that represents the radar signals, the radar circuit may comprise a receive chain. The receive chain may be configured to convert radar signals at the first and second frequency or within the first and second frequency band to digital or analog receive signals. The receive chain may, for example comprise attenuators, phase shifters, analog-to-digital converters or the like. For example, a single transmit chain and/or a single receive chain may be coupled to the circuit port of the radar circuit that is coupled to the guiding section of the transmission line network.

The radar circuit may comprise an integrated component or consist of the integrated component. The integrated component may comprise the transmit chain and/or the receive chain. The integrated component may, for example, be a monolithic microwave integrated circuit (MMIC). The ports of the radar circuit may be ports or connection points of the integrated component. The ports of the radar circuit may be generally denoted circuit ports.

According to an embodiment, the filter section comprises a bent section, such as a bent section that is bent by a right-angle. This allows for a compact integration of the filter section within the transmission line network. In addition to the bent section, the filter section may also comprise one or more straight sections.

According to an embodiment, a lateral boundary structure of the guiding section and a lateral boundary structure of the filter section comprise the same conductive elements, such as posts or via holes. This allows to fabricate the guiding section and the filter section with the same process and/or during the same production step and thus facilitates fabrication of the transmission line network or an antenna board comprising the transmission line network.

According to an embodiment, a respective dimension, such as a respective diameter, of the conductive elements of the guiding section and of the conductive elements of the filter section are equal. This allows, for example, to fabricate the guiding section and the filter section with the same tools, such as with the same drills, milling cutters or the like.

According to an embodiment, the coupling section comprises a feed section that is coupled between the filter section and the second antenna and the feed section has a transverse width that is larger than the transverse width of the filter section. This allows to precisely define the length of the filter section along the longitudinal path. The transverse width of the feed section may equal the transverse width of the guiding section. The feed section may be directly coupled to the second antenna. The feed section may have a constant width between the filter section and the second antenna.

According to an embodiment, a longitudinal length of the filter section is longer than the transverse width of the filter section. This provides a well-defined mode volume within the filter section and thus a filter section having low losses at the passed frequencies and a high rejection at the blocked frequencies.

Independent of its longitudinal length, the filter section may have a constant transverse width over its entire longitudinal length. Thus, the filter section may constitute a narrowed section of the transmission line network. Additionally or alternatively, also the guiding section may have a constant transverse width over its entire longitudinal length.

According to an embodiment, the transmission line network further comprises a branching section. The branching section thereby is coupled between the guiding section and the filter section and comprises a first end, a second end and a third end. The guiding section is coupled to the branching section via the first end, the filter section is coupled to the branching section via the second end and the first antenna is coupled to the branching section via the third end. Such a branching section allows to couple the electromagnetic energy having the second frequency from a part of the transmission line network that is configured to guide electromagnetic energy both at the first frequency and the second frequency or both within the first frequency band and the second frequency band. The branching section may form a power divider.

The branching section may be configured to guide electromagnetic energy at the first frequency and/or within the first frequency band in between the first end and the third end. For example, the branching section and/or all further sections that couple the first antenna to the guiding section may be configured to guide electromagnetic energy at the first frequency and/or within the first frequency band between the guiding section and the first antenna. For example, the branching section, for example the guiding segment of the branching section, may be configured to attenuate the electromagnetic energy at the first frequency and/or within the first frequency band between its connection to the guiding section and its connection to the first antenna, such as between the first end and the third end, by at most 0.5 dB, such as at most 0.3 dB, at most 0.2 dB or at most 0.15 dB, compared to a straight guiding section without branch out. Additionally or alternatively, the branching section, for example the guiding segment of the branching section, may be configured to in total attenuate the electromagnetic energy at the first frequency and/or within the first frequency band between its connection to the guiding section and its connection to the first antenna, such as between the first end and the third end, by at most 0.17 dB, 0.25 dB, 0.35 dB, 0.5 dB, 0.7 dB, 0.9 dB, 1.1 dB or 1.4 dB.

The branching section may be configured to guide electromagnetic energy between the first end and the second end and/or between the first end and the third end at both the first frequency and the second frequency or within both the first frequency band and the second frequency band.

The transmission line network may be configured to guide electromagnetic energy at the second frequency or within the second frequency band only between the guiding section and the second antenna but not between the guiding section and the first antenna. For example, the branching section and/or the filter section may be configured to block electromagnetic energy at the second frequency or within the second frequency band from being guided between the guiding section and the first antenna. This may, for example, be achieved by configuring the branching section and/or the filter section to provide a more efficient coupling for electromagnetic energy at the second frequency or within the second frequency band between the guiding section and the second antenna than between the guiding section and the first antenna.

According to an embodiment, the branching section comprises a guiding segment that connects the first end with the third end. The filter section may then be connected, for example, to the guiding segment via the second end in between the first end and the third end. This allows to efficiently couple energy traveling between the first and third end to the filter section via the second end of the branching section.

The second end may, for example, be located at a lateral boundary structure of the branching section that connects the first end with the third end, such as at a lateral boundary structure of the guiding segment. For example, the second end may be configured as an opening within the lateral boundary structure.

The guiding segment may have a constant width over its entire length in between the first and third end. This minimizes reflections within the guiding segment.

The guiding section may, for example, be directly coupled to the branching section via the first end. With alternative embodiments, the guiding section may also be coupled to the branching section via additional intermediate sections.

According to an embodiment, the guiding segment has a transverse width that is equal to the transverse width of the guiding section. This minimizes reflections at the transition between the guiding section and the branching section.

Additionally or alternatively, all sections of the transmission line network that connect the first antenna to the branching section via the third end may have a constant transverse width. This constant transverse width may amount to the transverse width of the guiding segment of the branching section. This also minimizes reflections in between the branching section and the additional port.

According to an embodiment, the guiding segment is configured as a straight segment. This minimizes losses between the first and third end of the branching section while providing a compact configuration of the branching section. The guiding segment may, for example, be orientated at least partly parallel to the guiding section and/or the feed section.

According to an embodiment, the filter section directly connects to the guiding segment so that the second end of the branching section is located at the guiding segment. The second end may have a transverse width that corresponds to the transverse width of the filter section. This efficiently blocks electromagnetic energy at the first frequency and/or within the first frequency band from passing through the second end and thus enhances transmission of the electromagnetic energy of the first frequency and/or within the first frequency band in between the first end and the third end of the branching section.

For example, a first boundary element of the filter section may be positioned in line with lateral boundary elements of the guiding segment, such as in line with all lateral boundary elements of the guiding segment at the side of the filter section.

According to an embodiment, the second end connects the filter section to the guiding segment at a right angle. This enhances separation of the electromagnetic energy at the second frequency or within the second frequency band from the electromagnetic energy at the first frequency or within the first frequency band.

According to an embodiment, the transmission line network further comprises an additional feed section, wherein the first antenna is connected to the third end of the branching section via the additional feed section. The additional feed section may be configured to guide electromagnetic energy having the first frequency or electromagnetic energy within the first frequency band. Additionally, the additional feed section may also be configured to guide electromagnetic energy having the second frequency or electromagnetic energy within the second frequency band.

The additional feed section may, for example, be configured as a bent section, such as a section that is bent by an angle of 90°. The additional feed section may be bent in a direction that is opposite to the direction in which the second end is located at the branching section. This allows to place the second antenna and the first antenna at different sides, such as opposite sides, of the branching section in a transverse direction.

With alternative embodiments, the additional feed section may also be configured as a straight section. In particular, a longitudinal path connecting the guiding section, the guiding segment of the branching section and the additional feed section may be configured as a straight path. This minimizes losses and reflections within the respective sections of the transmission line network.

According to an embodiment, the additional feed section has a transverse width that equals the transverse width of the guiding section. This minimizes losses of electromagnetic energy at the first frequency and/or within the first frequency band within the additional feed section. Additionally or alternatively, the additional feed section may also have a transverse width that equals the transverse width of the guiding segment of the branching section. The additional feed section may have a constant transverse width along its entire longitudinal length.

According to an embodiment, the transmission line network further comprises an additional branching section, wherein the additional branching section has a first end, a second end and a third end. The first end thereby couples the additional branching section to the third end of the branching section, the second end couples the additional branching section to an additional filter section and the third end couples the additional branching section to the first antenna. The additional filter section may be configured to block electromagnetic energy at the first frequency or within the first frequency band and to pass electromagnetic energy at the second frequency or within the second frequency band.

Such an additional branching section increases the amount of electromagnetic energy at the second frequency or within the second frequency band that is coupled from the part of the transmission line network that connects the guiding section and the first antenna. This in turn enhances isolation between the first antenna and the second antenna.

The additional filter section may be configured as it is disclosed for the filter section or vice versa. Analogously, the additional branching section may be configured as it is disclosed for the branching section or vice versa. For example, the additional filter section may have a transverse width that is smaller than the transverse width of the guiding section. For example, the transverse width of the additional filter section may equal the transverse width of the filter section.

A length of the filter section and a length of the additional filter section may be different. For example, the length of the filter section and the length of the additional filter section may be adapted to maximize coupling of the electromagnetic energy at the second frequency or within the second frequency band from the guiding segments of the branching sections via the second ends of the branching sections.

The additional filter section may be directly connected to a guiding segment, such as a straight guiding segment, of the additional branching section so that the second end of the guiding section has a transverse width that equals the transverse width of the filter section. Additionally or alternatively, the additional filter section may connect to the guiding segment at a right angle.

The filter section and the additional filter section may run in parallel.

The branching section and the additional branching section may be located directly next to each other. Furthermore, also the second end of the branching section and the second end of the additional branching section may be located next to each other, for example at the same lateral boundary structure of the guiding segment.

The additional filter section may be part of an additional coupling section. Thereby, the coupling section and the additional coupling section may be placed adjacent to each other and/or the coupling section and the additional coupling section may share a common sidewall. For example, a lateral boundary structure of the coupling section may also form a lateral boundary structure of the additional coupling section.

The branching section may be configured to extract a portion of electromagnetic energy at the second frequency from its guiding segment that amounts to at least 2 dB, such as to at least 3 dB. Additionally or alternatively, the additional branching section may be configured to extract a portion of electromagnetic energy at the second frequency from its guiding segment that amounts to at least 2 dB, such as to at least 3 dB.

The second end of the branching section and the second end of the additional branching section may be located at opposite sides from a longitudinal path connecting the first end of the branching section with the third end of the additional branching section. This increases mutual isolation of the second ends of the branching sections and improves the frequency response of the branching sections compared to locating both second ends at the same side of the longitudinal path.

With alternative embodiments, the second end of the branching section and the second end of the additional branching section may also be located at the same side from the longitudinal path connecting the first end of the branching section with the third end of the additional branching section. This may provide a more compact integration of the filter section and the additional filter section within the transmission line network.

According to an embodiment, both the filter section and the additional filter section couple the second antenna to the guiding section. This enhances the amount of electromagnetic energy at the second frequency or within the second frequency band that is coupled from the guiding section to the second antenna. For example, coupling both the filter section and the additional filter section to the second antenna may realize a multi-stage filter in between the guiding section and the second antenna.

A length of the transmission line network between the filter section and the second antenna and an additional length of the transmission line network between the additional filter section and the second antenna may be adapted for constructive interference of the portion of the electromagnetic energy traveling via the filter section and the portion of the electromagnetic energy traveling via the additional filter section. Such constructive interference may, for example, amount to coupling both portions in phase to the port that connects the second antenna to the coupling section via a further section of the transmission line network. The constructive interference also may, for example, amount to coupling both portions out of phase, such as with a phase shift of 180°, to the second antenna, for example in cases, in which the second antenna is configured as an antenna element that is directly fed from two sides via the coupling section and the additional coupling section.

According to an embodiment, a portion of the transmission line network coupling the guiding section to the second antenna via the filter section and a portion of the transmission line network coupling the guiding section to the second antenna via the additional filter section may be configured to pass the electromagnetic energy with a relative phase shift of 180°.

According to an embodiment, the filter section couples a port of the antenna system and the additional filter section couples a further port of the antenna system to the guiding section. This allows to separate portions of electromagnetic energy traveling within the transmission line network via the filter section and portions of electromagnetic energy traveling within the transmission line network via the additional filter section. For example, the port and the additional port may be coupled to separate antennas or separate antenna elements of an antenna.

The port may be coupled to the guiding section via the filter section but not via the additional filter section. The further port may be coupled to the guiding section via the further filter section but not via the filter section. This isolates the port and the further port within the transmission line network at the ends of the filter section and the additional filter section that face away from the guiding section. The port and the further port may only be coupled to each other within the transmission line network via the filter sections. The filter sections may be isolated from each other at the ends that oppose the respective ends of the filter sections that are connected to the guiding section.

A portion of the transmission line network coupling the guiding section to the port via the filter section and a portion of the transmission line network coupling the guiding section to the further port via the additional filter section may be configured to pass the electromagnetic energy with a relative phase shift of 180°. This allows for out-of-phase excitation of several antenna elements coupled to the port and the additional port. With other embodiments, the portion of the transmission line network coupling the guiding section to the port and the portion of the transmission line network coupling the guiding section to the further port may be configured to pass the electromagnetic energy with a relative phase shift of 0°. This allows for in-phase excitation of antenna elements coupled to the port and the additional port.

According to an embodiment, both the port and the further port are coupled to the second antenna of the radar antenna system. This allows to coherently transduce electromagnetic energy between an antenna field of the antenna system and the guiding section via both the filter section and the additional filter section.

For example, the port may be coupled to a first antenna element of the antenna and the further port may be coupled to a second antenna element of the same antenna. The transmission line network may then be configured to coherently transduce electromagnetic radiation between the radiation field of the antenna and the guiding section via the first and second antenna element.

According to an embodiment, a transverse width of the guiding section and/or a transverse width of the guiding segment of the branching section and/or a transverse width of the feed section and/or a transverse width of the further feed section are at most 1.5 times, such as at most one time or at most one half, a wavelength of the electromagnetic energy at the first or second frequency or within the first frequency band or the second frequency band.

The first antenna may, for example, be coupled to the guiding section via the additional port and the branching section. The second antenna may, for example, be coupled via the port to the filter section. The first antenna and the second antenna may be located in a lateral direction at opposite sides of the branching section.

The guiding section and/or the guiding segment of the branching section and/or the feed section and/or the further feed section and/or the guiding segment of the additional branching section and/or the addition feed section may run at least partly parallel to the first antenna and/or the additional first antenna. This allows to place these sections in between the first antenna and the additional first antenna even for close spacings of these two antennas.

According to an embodiment, the guiding section and the first antenna share a common sidewall and/or the guiding section and the additional first antenna share a common sidewall. Additionally or alternatively, the coupling section and the additional first antenna may share a common sidewall and/or the coupling section and the first antenna may share a common sidewall.

Such common sidewalls provide a compact construction of the antenna system. The common sidewall may, for example, be formed by the lateral boundary structure of the guiding section or the coupling section.

In general, each common sidewall of the present disclosure may be formed by a single lateral boundary structure such as a single line of conductive boundary elements or a single continuous boundary element.

According to an embodiment, the distance between the first antenna and the additional first antenna equals at most 16 times, such as at most 11 times, at most 8 times, at most 7 times, at most 6 times, at most 4 times, such as at most 3.5 times or at most 3 times, a transverse width of the first antenna and/or a transverse width of the additional first antenna. For example, the distance may amount to 3 times the transverse width of the first antenna and/or the transverse width of the additional first antenna. This provides for a compact configuration while at the same time allowing to use the first antenna and the additional first antenna in an antenna array, for example in a MIMO configuration.

According to an embodiment, the distance between the first antenna and the additional first antenna equals at least 1.5 times, such as at least 2 times, at least 3 times, at least 3.5 times or at least 4 times the wavelength of the electromagnetic energy at an operating frequency of the first, second or additional antenna, such as at the first frequency, at the second frequency, within the first frequency band or within the second frequency band and/or to at most 8 times, such as at most 5.5 times, at most 4 times, at most 3.5 times, at most 3 times, at most 2 times or at most 1.5 times a wavelength of electromagnetic energy at an operating frequency of the first, second or additional antenna, such as at the first or second frequency or within the first or second frequency band. For example, the distance may amount to 1.5 times the wavelength of electromagnetic energy at the operating frequency.

According to an embodiment, a transverse width of the coupling section and/or a transverse width of the second antenna are at most two times, such as at most 1.5 times or at most one time, a transverse width of the first antenna and/or a transverse width of the additional first antenna.

According to an embodiment, a transverse width of the second antenna is at most 1.5 times, such as at most one time or at most one half, a wavelength of the electromagnetic energy at the first or second frequency or within the first or second frequency band. For example, the transverse width of the second antenna may be one half the wavelength of electromagnetic energy at the second frequency or within the second frequency band. Such transverse widths provide for a compact construction of the radar antenna system.

According to an embodiment, the coupling section runs at least partly parallel to the first antenna and/or the additional first antenna, wherein the coupling section runs offset from the guiding section and/or the branching section in between the first antenna and the additional first antenna. This further contributes to a compact construction of the antenna system.

According to an embodiment, the transmission line network comprises the additional branching section and the additional coupling section having the additional filter section, wherein the first end and the third end of the additional branching section are coupled between the guiding section and the first antenna and the second end of the additional branching section is coupled to the additional filter section that is configured to block electromagnetic energy at the first frequency or within the first frequency band and to pass electromagnetic energy at the second frequency or within the second frequency band. This increases the amount of electromagnetic energy coupled from the segments of the transmission line network in between the guiding section and the first antenna compared to embodiments that only feature a single branching section.

According to an embodiment, the coupling section and the additional coupling section are placed adjacent to each other and/or the coupling section and the additional coupling section share a common sidewall.

According to an embodiment, the additional filter section couples the additional branching section to the second antenna. This increases the amount of electromagnetic energy transduced via the second antenna compared to a connection of the second antenna only to the filter section.

According to an embodiment, the second antenna comprises an antenna element that is coupled to the guiding section via both the branching section and the additional branching section. This provides an efficient construction for feeding the second antenna via both the branching section and the additional branching section or the filter section and the additional filter section, respectively. The antenna element may, for example, be an elongated opening, such as a slot provided in a surface of the waveguide. The antenna element may, for example, be coupled to the branching section and/or the additional branching section at a longitudinal side of the antenna element and in a transverse direction. This provides a transversely fed antenna element.

According to an embodiment, the branching section and the additional branching section are coupled to the antenna element from different directions, such as from opposite directions. This allows to superimpose portions of electromagnetic energy traveling via the branching section and portions of electromagnetic energy traveling via the additional branching section directly at the antenna element.

According to an embodiment, the transmission line network is configured to route a first portion of electromagnetic energy between the antenna element and the guiding section via the filter section and to route a second portion of electromagnetic energy between the antenna element and the guiding section via the additional filter section. Furthermore, the transmission line network may be configured to route the first and second portion to the antenna element with a relative phase shift, such as a 180° phase shift. For a connection of the antenna element at opposite sides, such a phase shift provides for a constructive interference of the portions of electromagnetic energy at the antenna element.

The second antenna may comprise a single antenna element. The second antenna may also comprise more than one antenna element, such as a first antenna element and a second antenna element and the transmission line network may be configured to coherently transduce electromagnetic energy via all antenna elements of the second antenna, such as via both the first antenna element and the second antenna element, between an antenna field of the second antenna and the guiding section. A second antenna that comprises at least two antenna elements allows to shape the antenna field, for example shift a direction of a main antenna lobe of the second antenna in a specific direction. The first antenna element and the second antenna element may, for example, be orientated parallel to each other. They may be formed as elongated elements. For example, the antenna elements may be formed as openings or slots.

Both the first antenna element and the second antenna element may be transversely fed by the transmission line network so that the respective antenna element is orientated perpendicular to a propagation direction of the electromagnetic energy within the transmission line network at the coupling point between the transmission line network and the respective antenna element. Alternatively, both the first antenna element and the second antenna element may be longitudinally fed so that the respective antenna element is orientated parallel to the propagation direction of the electromagnetic energy within the transmission line network at the coupling point. With other embodiments, one of the first and second antenna element may be transversely fed and the other one of the first and second antenna element may be longitudinally fed.

According to an embodiment, the second antenna comprises two antenna elements that are serially coupled to the filter section. This allows to introduce a predefined phase shift between the respective portions of electromagnetic energy that are transduced via the individual antenna elements and thus provides a possibility for beam shaping and/or steering.

According to another embodiment, the second antenna comprises two antenna elements that are coupled to the filter section in parallel. This allows to equally distribute the transduced electromagnetic energy over the first and second antenna element. These antenna elements may, for example, be configured as longitudinally fed antenna elements.

According to an embodiment, a width of a main antenna lobe of the first antenna in a transverse direction differs from a width of a main antenna lobe of the second antenna in the transverse direction. For example, the width of the main antenna lobe of the first antenna in the transverse direction may be smaller than the width of the main antenna lobe of the second antenna and the transverse direction.

This may provide the second antenna with a larger field of view that is, for example, suited for radar sensing at shorter distances, while the first antenna provides a narrower field of view but a higher gain that is, for example, suited for radar sensing at larger distances. By shifting the frequency of the electromagnetic energy fed to the guiding section, a radar circuit may switch between these two different antenna fields. The transverse direction may, for example, be the direction perpendicular to the separation direction.

According to an embodiment, a direction of the main antenna lobe of the second antenna is different from a direction of the main antenna lobe of the first antenna. For example, the direction of the main antenna lobe of the first antenna may be directed perpendicular to a surface of the first and/or second antenna, such as a surface of the antenna board, and parallel to a boresight direction of the first and/or second antenna, such as a boresight direction of the antenna board. The direction of the main antenna lobe of the second antenna may be tilted with respect to the boresight direction, for example along an elevation direction. The first antenna may be mounted to a vehicle with the direction of the main lobe being orientated parallel to a surface over which the vehicle moves. The direction of the main lobe of the second antenna then is directed towards the surface or away from the surface. The first antenna then may be used for obstacle detection and the second antenna for detection and classification of overdriveable and/or underdriveable objects or surface monitoring and/or classification.

According to an embodiment, a polarization of the first antenna differs from a polarization of the second antenna. This enhances isolation between the first antenna and the second antenna even when placing the antennas next to each other. For example, the polarization of the first antenna may be perpendicular to the polarization of the second antenna. This allows to calibrate an antenna set comprising several first antennas having the same polarization and an antenna set comprising several second antennas having the same polarization at different frequencies for adequate angle finding.

According to an embodiment, the second antenna comprises an antenna element that is configured as a transversely fed elongated element, such as a transversely fed elongated opening or a transversely fed slot. This allows for a compact integration of the antenna element into the feeding line, such as into a waveguide of the feeding line.

According to an embodiment, the second antenna comprises an antenna element that is configured as a longitudinally fed elongated element, such as a longitudinally fed elongated opening. This may enhance the amount of electromagnetic energy coupled between the radiation field and the waveguide at the antenna element.

According to an embodiment, the first antenna and/or the additional first antenna have a transverse width parallel to the separation direction that is at most one time, such as at most one half a wavelength of electromagnetic radiation at the first or second frequency or within the first or second frequency band. This allows to place the first antenna and/or the additional first antenna at close distances to other antennas of the transmission line network in the separation direction.

According to an embodiment, the first antenna and/or the additional first antenna extend perpendicular to the separation direction. This concentrates the electromagnetic energy transduced via the antennas in a plane parallel to the separation direction and allows, for example, for efficient sensing of an angular position of a target object within this plane. The plane may, for example, be parallel to the azimuthal direction.

According to an embodiment, the first antenna and the additional first antenna are part of an antenna arrangement that is configured to be operated in a MIMO configuration for determining an angular position of an irradiated target object, for example along the separation direction. For example, the first antenna and the additional first antenna may be coupled to separate guiding sections and/or separate feed ports of the antenna system. This allows to operate the first antenna and the additional first antenna independently from each other. For example, the first antenna and the additional first antenna may be configured to be coupled to different ports of a radar circuit.

The antenna arrangement may provide a multitude of first antennas. The individual first antennas may exhibit a relative spacing that is an integer multiple of half a wavelength of electromagnetic energy at the first frequency or the second frequency or within the first frequency band or the second frequency band.

According to an embodiment, the radar antenna system further comprises a third antenna, wherein the transmission line network couples the third antenna to the guiding section. The filter section is configured to block electromagnetic energy having a third frequency and all sections of the transmission line network that couple the third antenna to the guiding section are configured to pass electromagnetic energy having the third frequency. The radar antenna system is configured to transduce via the third antenna electromagnetic energy having the third frequency and to block electromagnetic energy having the first frequency from being transduced via the third antenna.

Such a radar antenna system allows to frequency selectively activate only the third antenna but not the second antenna by changing an operating frequency of the radar circuit coupled to the radar antenna system.

The filter section may also be configured to block electromagnetic energy within a third frequency band that comprises the third frequency and all sections of the transmission line network that couple the third antenna to the guiding section may be configured to pass electromagnetic energy within the third frequency band. The radar antenna system may then be configured to transduce via the third antenna electromagnetic energy within the third frequency band. The radar antenna system may also be configured to block electromagnetic energy within the first frequency band from being transduced by the third antenna.

The third antenna may be configured as a substrate integrated antenna. Additionally or alternatively, the third antenna may be configured as a waveguide antenna. For example, the third antenna may be configured as a substrate integrated waveguide antenna. Antenna elements of the third antenna may be configured as openings, such as slots. The antenna elements of the third antenna may be elongated elements. They may be orientated parallel to the antenna elements of the first antenna and/or the additional first antenna. The antenna elements of the third antenna may be placed parallel to each other. They may be configured as longitudinally fed antenna elements.

The third antenna may have a larger number of antenna elements than the first antenna. For example, the third antenna may have at least 1.5 times, at least two times or at least 2.5 times the number of antenna elements of the first antenna.

The third antenna may comprise separate segments that are coupled in parallel to the guiding section. The segments may have an elongated shape, for example, perpendicular to the separation direction. The segments may be placed directly adjacent to each other, for example, along a transverse direction that is perpendicular to the elongation of the segments. With some embodiments, the segments may share a common sidewall. This common sidewall may be formed by a single line of boundary elements.

The third antenna may have a polarization that is parallel to the polarization of the first antenna and/or the additional first antenna. The third antenna may have a polarization that is perpendicular to the polarization of the second antenna. The third antenna may be elongated perpendicular to the separation direction.

The third antenna may be configured to only transduce at the third frequency or within the third frequency band but not to transduce at the first and/or the second frequency or within the first and/or second frequency band. Likewise, the second antenna may be configured to only transduce at the second frequency or within the second frequency band and not at the third frequency or within the third frequency band.

According to an embodiment, the third antenna is coupled to the guiding section via the branching section. Coupling both the first antenna and the third antenna to the guiding section via the branching section provides a compact integration of the third antenna, for example on the antenna board of the radar antenna system.

The branching section, for example the guiding segment of the branching section, may be configured to pass electromagnetic energy at the third frequency or within the third frequency band between the guiding section and the third antenna. For example, the branching section, for example the guiding segment of the branching section, may be configured to attenuate the electromagnetic energy at the third frequency and/or within the third frequency band between its connection to the guiding section and its connection to the third antenna and/or between its connection to the guiding section and the its connection to first antenna, such as between the first end and the third end of the branching section, by at most 0.5 dB, such as at most 0.3 dB, at most 0.2 dB or at most 0.15 dB, compared to a straight guiding section without branch out. Additionally or alternatively, the branching section, for example the guiding segment of the branching section, may be configured to in total attenuate the electromagnetic energy at the third frequency and/or within the third frequency band between its connection to the guiding section and its connection to the third antenna and/or between its connection to the guiding section and its connection to the first antenna, such as between the first end and the third end of the branching section, by at most 0.17 dB, 0.25 dB, 0.35 dB, 0.5 dB, 0.7 dB, 0.9 dB, 1.1 dB or 1.4 dB. The third antenna may be coupled to the guiding section via the first end and the third end of the branching section.

Additionally or alternatively, the sections of the transmission line network connecting the first antenna to the beginning of the guiding section at a feed port of the antenna system and/or the sections of the transmission line network connecting the third antenna to the beginning of the guiding section at the feed port of the antenna system, which sections may include the branching section and the guiding section, may be configured to in total attenuate the electromagnetic energy at the first frequency and/or within the first frequency band and/or at the third frequency and/or within the third frequency band by at most 0.17 dB, 0.25 dB, 0.35 dB, 0.5 dB, 0.7 dB, 0.9 dB, 1.1 dB or 1.4 dB.

According to an embodiment, the third antenna is coupled to the guiding section via at least a part of the first antenna. This allows to densely integrate the third antenna next to the first antenna within the antenna system. The third antenna may be coupled to the first antenna via a part of the transmission line network, such as a further filter section.

According to an embodiment, the first antenna is configured to transduce electromagnetic energy both at the first frequency or within the first frequency band and at the third frequency or within the third frequency band. This allows to activate both the first antenna and the third antenna at the third frequency or within the third frequency band so that the first and third antenna form a common antenna that transduces between an antenna field and the guiding segment of the transmission line network at the third frequency or within the third frequency band.

When transducing both via the first antenna and the third antenna, the antenna field of the third antenna also depends on the antenna elements of the first antenna, such as on the position and/or shape of these antenna elements. For example, a width and/or a direction of antenna lobes of the antenna field of the third antenna is also influenced by the antenna elements of the first antenna. In general, the antenna field of the third antenna is determined by the antenna elements of the third antenna and by all other antenna elements that simultaneously and coherently radiate together with the antenna elements of the third antenna.

According to an embodiment, the third antenna is orientated parallel to the first antenna. This allows for compact integration of the first and third antenna, for example on the antenna board.

According to an embodiment, the third antenna is located directly adjacent to the first antenna and/or the third antenna and the first antenna share a common sidewall.

According to an embodiment, the first antenna and/or the third antenna are configured as waveguide antennas, such as slotted waveguide antennas. Such antennas are especially suited for compact and integrated radar antenna systems.

For example, the first antenna and/or the third antenna may be configured as horn antennas.

According to an embodiment, the third antenna is coupled to the guiding section via a further filter section of the transmission line network, wherein the further filter section is configured to pass electromagnetic energy at the third frequency or within the third frequency band and to block electromagnetic energy at the first frequency or within the first frequency band.

The further filter section may be configured as it is disclosed for the filter section of the transmission line network according to the present disclosure. For example, the further filter section may have a transverse width that deviates from the transverse width of the guiding section. For example, the further filter section may have a transverse width that is smaller than the transverse width of the guiding section. A longitudinal length of the filter section may be larger than the transverse width. The filter section may comprise a bent segment, for example a segment that is bent by an angle of 90°.

According to an embodiment, the further filter section is configured as a stepped impedance filter. Such a filter provides a steep filter action while at the same time occupying only a small space.

According to an embodiment, the further filter section is configured as a section of a waveguide, such as a substrate integrated waveguide. For example, the filter may comprise a lateral iris wall that narrows the transverse width of the waveguide at the filter.

According to an embodiment, the third antenna comprises a first antenna element and a second antenna element, wherein the first antenna element is coupled to the guiding section via the further filter section and the second antenna element is coupled to the guiding section via an additional further filter section. Furthermore, the additional further filter section is configured to pass electromagnetic energy at the third frequency or within the third frequency band and to block electromagnetic energy at the first frequency or within the first frequency band. This allows to feed the first and second antenna element in parallel and to evenly distribute the transduced electromagnetic energy over the first and second antenna element.

The further filter section and the additional further filter section may be coupled in parallel to the guiding section.

The additional further filter section may be configured as it is disclosed for the further filter section and vice versa. The first antenna element may be part of a first segment of the third antenna and the second antenna element may be part of a second segment of the third antenna. The first segment may be coupled to the guiding section via the further filter section and the second segment may be coupled to the guiding section via the additional further filter section.

According to an embodiment, the further filter section and the additional further filter section are coupled to the guiding section via at least a part of the first antenna. The further filter section and the additional further filter section thereby are coupled to the first antenna at different ends of the first antenna, such as opposite ends of the first antenna, and the first antenna is coupled to the guiding section in between the different ends of the first antenna. This allows to couple the filter section and the further filter section in parallel to the guiding section via the first antenna. The first antenna may then act as a power divider for feeding the first and second antenna element of the third antenna in parallel. The further filter section may be coupled to the guiding section via one part of the first antenna and the additional further filter section may be coupled to the guiding section via another part of the first antenna. With other embodiments, the parts coupling the further filter section and the additional further filter section to the guiding section may also be the same.

According to an embodiment, the radar antenna system further comprises an additional third antenna, wherein the radar antenna system is configured to transduce via the additional third antenna electromagnetic energy at the third frequency or within the third frequency band and to block electromagnetic energy at the first frequency or within the first frequency band from being transduced via the additional third antenna. The third antenna and the additional third antenna are located next to each other, for example on the antenna board. The third antenna and the additional third antenna may then form a common antenna and the antenna field of the third antenna may also be generated with contributions from the additional third antenna.

As far as no differences are disclosed, the additional third antenna may be configured as it is disclosed for the third antenna.

The additional third antenna and one or more sections of the transmission line network, such as the guiding section and/or the filter section and/or the branching section, may be located at opposite sides of the third antenna. Additionally or alternatively, the additional third antenna and the first antenna may be located at opposite sides of the third antenna.

The additional third antenna may be orientated parallel to the third antenna. For example, the additional third antenna and the third antenna may be located directly adjacent to each other.

The third antenna and the additional third antenna may share a common sidewall. This allows for dense integration of the third antenna and the additional third antenna, for example on the antenna board of the radar antenna system.

According to an embodiment, the additional third antenna is coupled to an additional guiding section that is separate from the guiding section, wherein the guiding section and the additional guiding section are configured to connect to separate ports of a radar circuit. This allows to separately operate the third antenna and the additional third antenna. Alternatively, it also allows to coherently transduce electromagnetic energy between a common antenna field generated by the third antenna and the additional third antenna and both the guiding section and the additional guiding section by simultaneously operating both ports of the radar circuit at the third frequency or at the same frequency within the third frequency band.

According to an embodiment, a width of a main antenna lobe of the third antenna in a transverse direction is smaller than a width of a main antenna lobe of the first antenna and/or a width of a main antenna lobe of the second antenna. Such a radar antenna system allows to frequency-selectively adapt the width of the main antenna lobe by changing the operating frequency of a radar circuit connected to the radar antenna system.

According to an embodiment, a direction of the main antenna lobe of the third antenna differs from the direction of the main antenna lobe of the first antenna and/or the direction of the main antenna lobe of the second antenna. This allows to frequency-selectively adapt the direction of the antenna lobe of the radar antenna system by changing the operating frequency. For example, the direction of the main antenna lobe of the third antenna may be tilted with respect to the direction of the main antenna lobe of the first antenna and/or the second antenna along the separation direction and/or perpendicular to a longitudinal extent of the first antenna and/or the third antenna.

The radar antenna system may be configured to be mounted to a vehicle in an orientation in which the main antenna lobe of the third antenna is tilted in the azimuthal direction. For example, the radar antenna system may be configured to be mounted at a corner of the vehicle and the direction of the main antenna lobe of the third antenna may be tilted towards a longitudinal center axis of the vehicle. The present disclosure also is directed at such mounting of the radar antenna system to a vehicle.

The present disclosure is also directed at a radar system comprising a radar antenna system according to the present disclosure and a radar circuit, wherein a port of the radar circuit is coupled to the guiding section of the radar antenna system and wherein the radar circuit is configured to separately handle a first radar signal having the first frequency and a second radar signal having the second frequency to selectively activate the first antenna or the second antenna. This allows to separately operate two different types of antennas through a single port of the radar circuit and thus provides a versatile, yet compact radar system.

The radar circuit may handle the first and second radar signals by generating them with a transmit chain coupled to the port. The radar circuit may also handle the first and second radar signals by evaluating them with a receive chain coupled to the port. In general, the radar circuit may be configured to selectively operate the port at the first or second frequency by selectively handling the first or second radar signal.

The radar circuit may be configured to operate the first antenna and the additional first antenna in a multiple-input-multiple-output (MIMO) configuration. The first antenna and the additional first antenna may be coupled via separate guiding sections and separate feed ports to separate circuit ports of the radar circuit.

With embodiments having the third antenna coupled to the guiding section and the additional third antenna coupled to the additional guiding section, the radar circuit may have a first port that is coupled to the guiding section and a second port that is coupled to the additional guiding section. Furthermore, the radar circuit may be configured to operate the third antenna and the additional third antenna as a single common antenna by simultaneously routing a first one of two radar signals via the first port and a second one of the two radar signals via the second port, wherein each of the two radar signals has the third frequency. This provides a high-gain mode of operation using both the third antenna and the additional third antenna.

The two radar signals may be coherently transduced via the transmission line network between the radar circuit and an antenna field of both the third antenna and the additional third antenna. The two radar signals may both exhibit the same modulation and/or coding. For example, the two radar signals may have a same phase coding, such as a same binary phase coding. The modulation and/or coding may be configured to distinguish between target reflections arising from the two radar signals that are simultaneously transduced via the first and second port and target reflection arising from other radar signals that are transmitted via other antennas and/or ports of the antenna system. The other radar signals may be transduced with differing modulation and/or coding, such as with orthogonal modulation and/or coding.

The first antenna may be part of a first antenna array, such as a first MIMO array, that comprises a multitude of the first antennas and the second antenna may be part of a second antenna array, such as a second MIMO array, that is different from the first antenna array and that comprises a multitude of the second antennas. For example, the first and second antenna array each may comprise, such as consist of, mutually different antennas.

The antennas of the first antenna array may have a first polarization that differs from a second polarization of the antennas of the second antenna array. For example, the first polarization maybe orthogonal to the second polarization. The first polarization may be a horizontal polarization along a first transverse direction and the second polarization may be a vertical polarization along a second transverse direction. The horizontal polarization may be parallel to a ground surface and the vertical polarization may be perpendicular to the ground surface.

The first antenna array may have a resolution along a first transverse direction, such as an azimuthal direction, that is larger than a resolution of the second antenna array along the first transverse direction. Additionally or alternatively, the second antenna array may have a resolution along a second transverse direction different from the first transverse direction, such as an elevation direction, that is larger than a resolution of the first antenna array along the second transverse direction. This allows to compensate a lower resolution of one of the antenna arrays along a specific transverse direction by a higher resolution of the other one of the antenna arrays along this transverse direction.

A field of view of the first antenna array may be smaller than a field of view of the second antenna array, for example along the second transverse direction, such as along the elevation direction.

According to an embodiment, the field of view of the first antenna array is smaller than the field of view of the second antenna array along the elevation direction and the antennas of the first antenna array have a polarization that is perpendicular to the polarization of the second antenna array.

For each second antenna of the second antenna array, the respective one or more filter sections of the transmission line network coupling the respective second antenna to its respective guiding section, the respective second antenna and, optionally, the respective one or more branching sections of the transmission line network coupling the respective second antenna to its respective guiding section may be located in between two of the first antennas of the first antenna array. The distance between the respective two first antennas may be configured to allow unambiguous angle determination with the first antenna array, for example in a direction parallel to the separation direction of the respective two first antennas. For example, the distance may be at most 1.5 times the wavelength of the first frequency.

The first antenna array may be an antenna array of first receive antennas or an antenna array of first transmit antennas. For both the antenna array of first receive antennas or the antenna array of first transmit antennas, the radar antenna system may comprise an additional first antenna array that is configured as an antenna array of the respective other one of the first receive antennas and the first transmit antennas. The polarization of the first antennas of the first antenna array and the polarization of the first antennas of the additional first antenna array may be different, such as orthogonal.

The second antenna array may be an antenna array of second receive antennas or an antenna array of second transmit antennas. For both the antenna array of second receive antennas or the antenna array of second transmit antennas, the radar antenna system may comprise an additional second antenna array that is configured as an antenna array of the respective other one of the second receive antennas and the second transmit antennas. The polarization of the second antennas of the second antenna array and the polarization of the second antennas of the additional second antenna array may be different, such as orthogonal.

In a radar system according to the present disclosure, the first transmit antennas and the second transmit antennas may be coupled to transmit ports of a radar circuit of the radar system and the first receive antennas and the second receive antennas may be coupled to receive ports the radar circuit.

In a further aspect, the present disclosure is directed at a transmission line network for a radar antenna system. The transmission line network comprises a guiding section, a port and a filter section coupled between the guiding section and the port. The guiding section is configured to guide electromagnetic energy at the first frequency or within the first frequency band and to guide electromagnetic energy at the second frequency of within the second frequency band. A transverse width of the filter section is smaller than a transverse width of the guiding section and the transverse width of the filter section is adapted to block electromagnetic energy at the first frequency or within the first frequency band and to pass electromagnetic energy at the second frequency or within the second frequency band.

The filter section may be configured as a stepped impedance filter. Additionally or alternatively, the transmission line network may be configured as a waveguide network, such as an air-filled waveguide network or a substrate integrated waveguide network.

The transmission line network may be configured as it is disclosed for the transmission line networks of the antenna systems according to the present disclosure and vice versa. All embodiments and technical effects disclosed for the transmission line networks of the antenna systems according to the present disclosure also apply to the transmission line network and vice versa.

The guiding section may be configured to also guide electromagnetic energy at the third frequency or within the third frequency band. The transverse width of the filter section may be adapted to block electromagnetic energy at the third frequency or within the third frequency band.

In a further aspect, the present disclosure is directed at a radar antenna system for a vehicle comprising a first antenna, an additional first antenna, a second antenna and a transmission line network. The transmission line network has a guiding section, a branching section and a coupling section with a filter section and couples the first antenna and the second antenna to the guiding section via the branching section. The second antenna is thereby coupled to the branching section via the coupling section. The guiding section is configured to guide electromagnetic energy at a first frequency or within a first frequency band and to guide electromagnetic energy at a second frequency or within a second frequency band, the filter section is configured to block electromagnetic energy at the first frequency or within the first frequency band and to pass electromagnetic energy at the second frequency or within the second frequency band and all sections of the transmission line network that couple the first antenna to the guiding section are configured to pass electromagnetic energy at the first frequency or within the first frequency band. The first antenna and the additional first antenna are placed at a distance from each other in a separation direction and the second antenna is placed in between the first antenna and the additional first antenna. Additionally, the filter section and/or the branching section are placed in between the first antenna and the additional first antenna.

In another aspect, the present disclosure is directed at a further radar antenna system for a vehicle comprising a first antenna, a second antenna, a third antenna and a transmission line network, wherein the transmission line network has a guiding section, a branching section and a filter section. The transmission line network couples the first antenna, the second antenna and the third antenna to the guiding section via the branching section and the second antenna is coupled to the branching section via a coupling section that comprises a filter section. The guiding section is configured to guide electromagnetic energy having a first frequency, to guide electromagnetic energy having a second frequency and to guide electromagnetic energy having a third frequency. The filter section is configured to block electromagnetic energy having the first frequency and the third frequency and to pass electromagnetic energy having the second frequency. Furthermore, all sections of the transmission line network that couple the first antenna to the guiding section are configured to pass electromagnetic energy having the first frequency and all sections of the transmission line network that couple the third antenna to the guiding section are configured to pass electromagnetic energy having the third frequency. The radar antenna system is configured to transduce via the third antenna electromagnetic energy having the third frequency and to block electromagnetic energy having the first frequency from being transduced via the third antenna.

The transmission line network may be the transmission line network according to the further aspect of the present disclosure. All embodiments and technical effects that are disclosed for the transmission line network also apply to the transmission line network of the further radar antenna system and vice versa.

Furthermore, the further radar system may be configured as it is disclosed for the radar system according to the present disclosure. All embodiments and technical effects that are disclosed for the radar system according to the present disclosure also apply to the further radar system and vice versa.

In general, further antennas may be coupled to the guiding section and/or the branching section and/or the filter section of the further radar antenna system in addition to the first antenna, the second antenna and the third antenna. For example, two or more antennas may be coupled via the filter section to the branching section. Additionally alternatively, the sections that couple the first antenna to the guiding section may couple one or more additional antennas to the guiding section and/or the sections that couple the third antenna to the guiding section may couple one or more additional antennas to the guiding section.

In general, the guiding section of the further radar antenna system may be configured to guide electromagnetic energy at additional frequencies in addition to the first, second and third frequency and/or within additional frequency bands in addition to the first, second and third frequency band. Additionally or alternatively, the filter section of the further radar antenna system may be configured to block electromagnetic energy at one or more additional frequencies in addition to electromagnetic energy at the first and third frequency and/or pass electromagnetic energy at one or more additional frequencies in addition to electromagnetic energy at the second frequency. Analogously, the filter section may be configured to block electromagnetic energy within one or more additional frequency bands in addition to electromagnetic energy within the first and third frequency band and/or pass electromagnetic energy within one or more additional frequency bands in addition to electromagnetic energy within the second frequency band.

In general, all sections of the transmission line network of the further radar antenna system that couple the first antenna to the guiding section may be configured to pass electromagnetic energy at additional frequencies in addition to the first frequency or within additional frequency bands in addition to the first frequency band. Additionally or alternatively, all sections of the transmission line network that couple the third antenna to the guiding section may be configured to pass electromagnetic energy at additional frequencies in addition to the third frequency or within additional frequency bands in addition to the third frequency band. The further radar antenna system may be configured to transduce via the third antenna electromagnetic energy at additional frequencies in addition to the third frequency and to block electromagnetic energy at additional frequencies in addition to the first frequency from being transduced via the third antenna. Analogously, the further radar antenna system may be configured to transduce via the third antenna electromagnetic energy within additional frequency bands in addition to the third frequency band and to block electromagnetic energy within additional frequency bands in addition to the first frequency band from being transduced via the third antenna.

In another aspect, the present disclosure is directed at a radar system, for example for automotive applications, having an antenna system comprising a first antenna and a second antenna, wherein the first antenna is coupled to a first feed port of the antenna system and the second antenna is coupled to a second feed port of the antenna system that is separate from the first feed port. The radar system further comprises a radar circuit that is connected to the first feed port and to the second feed port. The radar circuit is configured to operate the first antenna and the second antenna as a single common antenna by simultaneously routing a first one of two radar signals via the first feed port and a second one of the two radar signals via the second feed port, wherein each of the two radar signals has the same frequency.

The first antenna and the second antenna of the radar system of this aspect of the present disclosure each may be one of the antennas of the other antenna systems according to the present disclosure. Therefore, all embodiments and technical effects that are disclosed for the other antenna systems also apply to the antenna system of this aspect of the present disclosure and vice versa.

For example, the first antenna may be configured as it is disclosed for the third antennas of other embodiments of the antenna systems according to the present disclosure and the second antenna may be configured as it is disclosed for the additional third antennas of the other embodiments.

The first antenna may be coupled via a first guiding section to the first feed port and the second antenna may be coupled via a second guiding section to the second feed port, whereby the first guiding section is separate from the second guiding section. The radar circuit may have a first port that is coupled to the first guiding section and a second port that is coupled to the second guiding section.

The first and second antenna may have the same polarization. The first one of the radar signals and the second one of the radar signals may exhibit the same modulation and/or coding, such as the same phase coding.

The radar circuit may be configured to transduce the first one of the radar signals in different frequency bands and/or to transduce the second one of the radar signals in different frequency bands. The first and/or second antenna may be configured to simultaneously transduce together with at least one other antenna coupled to the same feed port within a first one of the frequency bands and to individually transduce within a second one of the frequency bands without the at least one other antenna coupled to the same feed port transducing simultaneously.

In another aspect, the present disclosure is directed at a radar system comprising an antenna system having a first antenna and a second antenna, wherein the first antenna has a first polarization and the second antenna has a second polarization different from, for example orthogonal to, the first polarization. The radar system is configured to transduce a first radar signal at a first frequency via the first antenna and a second radar signal at a second frequency via the second antenna, whereby the first frequency is different from the second frequency. Furthermore, the radar system is configured to classify target objects based on both the first radar signal and the second radar signal.

Such a radar system provides a novel way of classification of target objects. In particular, classification is performed with at least two polarizations and at the same time at at least two frequencies. This allows to use more information on the target objects for classification than with radar systems using only radar signals at a single frequency and/or a single polarization.

The radar system may be one of the other radar systems according to the present disclosure. Therefore, all embodiments and technical effects that are disclosed for the other radar systems according to the present disclosure also apply to the radar system according to this aspect of the disclosure and vice versa.

Furthermore, the antenna system may be one of the antenna systems according to the present disclosure. All embodiments and technical effects that are disclosed for the antenna systems according to the present disclosure also apply to the radar system according to this aspect of the disclosure and vice versa.

The radar system may be configured to classify the target objects based on both target reflections of the first radar signal and target reflections of the second radar signal.

Both the first antenna and the second antenna may be coupled to a single feed port of the antenna system and/or to a single circuit port of a radar circuit of the radar system.

In a further aspect, the present disclosure is directed at an antenna system having a first antenna and a second antenna, wherein the first antenna is configured to transduce a first radar signal at a first frequency and the second antenna is configured to transduce a second radar signal at a second frequency, whereby the first frequency is different from the second frequency. Furthermore, a main antenna lobe of one of the first and second antenna is directed in a boresight direction of the antenna system, such as in a boresight direction of an antenna board of the antenna system, and a main antenna lobe of the other one of the first and second antenna is tilted with respect to the boresight direction.

The first and/or second antenna may be one of the antennas of the antenna and radar systems according to the other aspects of the present disclosure. Therefore, all features, embodiments and technical aspects of the antennas of the other aspects of the present disclosure also apply to the first and/or second antenna and vice versa. For example, both the first and second antenna may be coupled to the same feed port of the antenna system.

In a further aspect, the present disclosure is directed at an antenna system having a first antenna and a second antenna, wherein the first antenna is configured to transduce a first radar signal at a first frequency and the second antenna is configured to transduce a second radar signal at a second frequency, whereby the first frequency is different from the second frequency. Furthermore, one of the first and second antenna has a field of view that is larger than the other one of the first and second antenna.

The first and/or second antenna may be one of the antennas of the antenna and radar systems according to the other aspects of the present disclosure. Therefore, all features, embodiments and technical aspects of the antennas of the other aspects of the present disclosure also apply to the first and/or second antenna and vice versa. For example, both the first and second antenna may be coupled to the same feed port of the antenna system.

In another aspect, the present disclosure is directed at a radar system comprising an antenna system having a first antenna and a second antenna, wherein the first antenna is configured to transduce a first radar signal at a first frequency and the second antenna is configured to transduce a second radar signal at a second frequency, whereby the first frequency is different from the second frequency. Furthermore, the radar system is configured to use radar signals transduced via one of the first and second antenna for at least one of adaptive cruise control, direction of arrival, lane change assist and lane keep assist and to use radar signals transduced via the other one of the first and second antenna for at least one of parking assistance, object detection, detection and classification of over/underdriveable obstacles, blind spot detection, cross traffic alert and street condition monitoring.

The first and/or second antenna may be one of the antennas of the antenna and radar systems according to the other aspects of the present disclosure. Therefore, all features, embodiments and technical aspects of the antennas of the other aspects of the present disclosure also apply to the first and/or second antenna and vice versa. For example, both the first and second antenna may be coupled to the same feed port of the antenna system.

In another aspect, the present disclosure is directed at a vehicle comprising a radar antenna system or a radar system according to the present disclosure. All embodiments and technical effects disclosed for the radar antenna systems or the radar systems according to the present disclosure also apply to the vehicle and vice versa.

The radar antenna system or the radar system may be placed at a front, a side, a corner, a rear or an interior of the vehicle. With radar antenna systems having the first antenna and the additional first antenna, the separation direction may, for example, be an azimuthal direction that is orientated parallel to a ground over which the vehicle moves and perpendicular to a boresight direction of the antenna system.

With all aspects of the present disclosure, the vehicle may be a land vehicle, such as a road vehicle. The vehicle may be a motor vehicle. For example, the vehicle may be an automotive vehicle.

The transmission line network and/or the radar antenna system may only comprise passive components. In particular, electromagnetic energy may only be routed via passive components in between the guiding section and the ports of the transmission line network and/or in between the guiding section and the individual antennas of the radar antenna system.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Exemplary embodiments and functions of the present disclosure are described herein in conjunction with the following drawings, showing schematically:

FIG. 8 is an illustration of a first detailed view of a first variant of a first antenna system according to the present disclosure.

FIG. 9 is an illustration of a detailed view of a second variant of the first antenna system according to the present disclosure.

FIG. 23 is an illustration of a detailed view of another embodiment of the second antenna of the seventh antenna system.

Corresponding reference numerals indicate corresponding parts throughout the several views of the drawings.

DETAILED DESCRIPTION

Example embodiments will now be described more fully with reference to the accompanying drawings.

Figure 1:
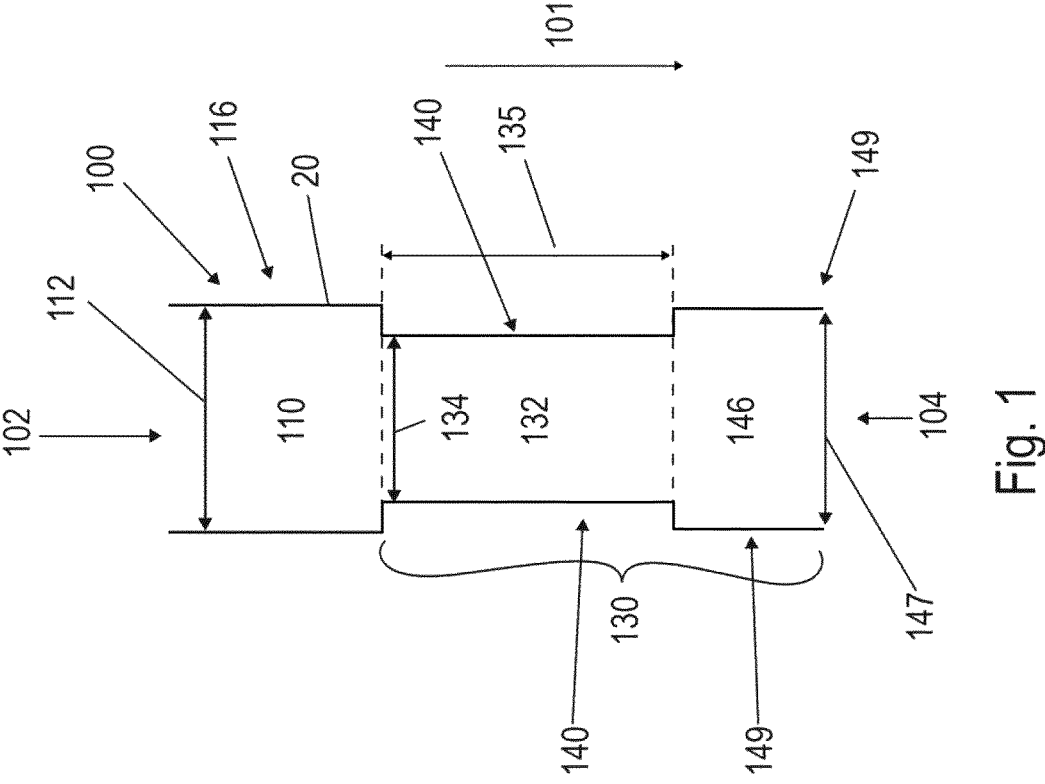
FIG. 1 is an illustration of a detailed top view of a first embodiment of a transmission line network having a filter section according to the present disclosure.

FIG. 1 depicts a detailed top view of a transmission line network 100 according to the present disclosure having a coupling section 130 and a guiding section 110. The coupling section 130 comprises a filter section 132 and a feed section 146 and the guiding section 110 is directly coupled to the coupling section 130, namely to the filter section 132 of the coupling section 130. Along a longitudinal path defined by the transmission line network 100, which longitudinal path is orientated parallel to a longitudinal direction 101, the transmission line network 100 sequentially comprises the guiding section 110, the filter section 132 and the feed section 146.

The transmission line network 100 is exemplarily configured as a substrate integrated waveguide. The transmission line network 100 comprises an antenna board 20 and the individual sections of the transmission line network 100 are bounded in a transverse direction perpendicular to the longitudinal path by lateral boundary structures 116 of the guiding section 110, lateral boundary structures 140 of the filter section 132 and lateral boundary structures 149 of the feed section 146.

Each of the lateral boundary structures 116 of the guiding section 110, the lateral boundary structures 140 of the filter section 132 and the lateral boundary structures 149 of the feed section 146 may comprise boundary elements. The boundary elements of the individual sections 110, 132, 146 may be placed next to each other and/or spaced apart from each other parallel to the longitudinal path on both sides of the respective sections 110, 132, 146. They may be configured as conductive cylinders, for example as metal-coated holes within the antenna board 20.

Generally, the transmission line network 100 may also be configured as a waveguide, such as a hollow waveguide, for example an air-filled hollow waveguide. Alternatively, the transmission line network 100 may also be configured as a hollow waveguide filled with a dielectric different than air. The lateral boundary structures 116 of the guiding section 110 and/or the lateral boundary structures 140 of the filter section 132 and/or the lateral boundary structures 149 of the feed section 146 may be configured as solid walls.

A transverse width 134 of the filter section 132 is smaller than a transverse width 112 of the guiding section 110 and a transverse width 147 of the feed section 146. The transverse width 112 of the guiding section 110 and the transverse width 147 of the feed section 146 are equal.

The transmission line network 100 extends between a feed port 102 at the guiding section 110 and a port 104 at the feed section 146.

The filter section 132 narrows the transmission line network 100 to the transverse width 134 over an entire longitudinal length 135 of the filter section 132. It constitutes a stepped impedance filter of the waveguide. The longitudinal length 135 and the transverse width 134 of the filter section 132, a longitudinal length and the transverse width 112 of the guiding section 110, and a longitudinal length and the transverse width 147 of the feed section 146 are adapted to block electromagnetic energy within a first frequency band from propagating through the filter section 132 and to allow electromagnetic energy within a second frequency band to pass through the filter section 132.

Figure 2:
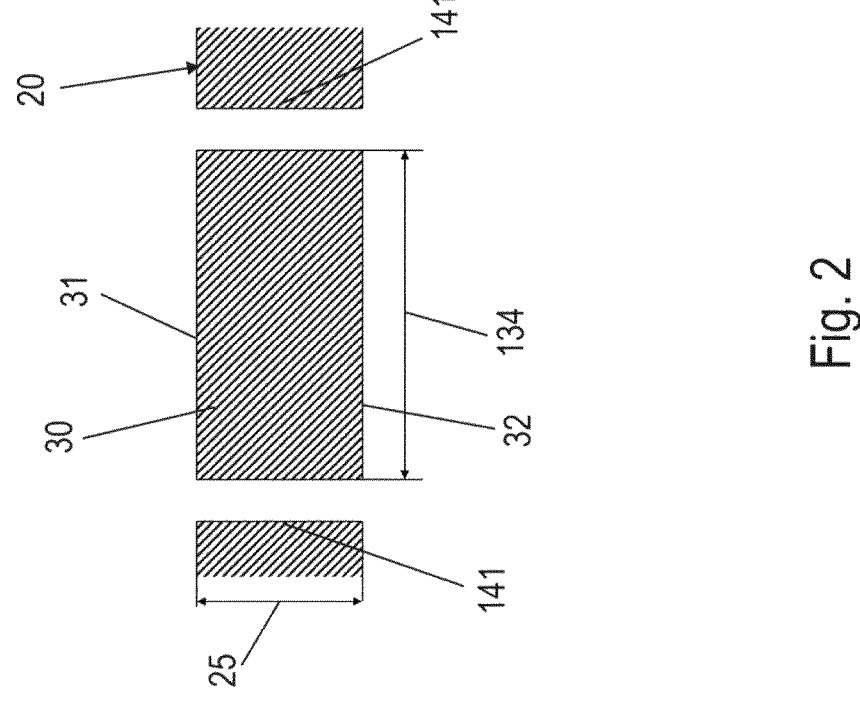
FIG. 2 is an illustration of a cross-sectional cut through an antenna board having the filter section.

FIG. 2 depicts a cross-sectional cut through the antenna board 20 of the transmission line network 100. The antenna board 20 comprises a substrate 30 having a height 25. A top plate 31 and a bottom plate 32 of the antenna board 20 are placed at opposite sides of the substrate 30. Both the top plate 31 and the bottom plate 32 are electrically conducting and formed by metal coatings of the substrate 30. The height 25 of the substrate 30 is smaller than the transverse width 134 of the filter section 132.

The individual boundary elements, which are in FIG. 2 exemplarily depicted by the boundary elements of the filter section 132, are configured as through holes in the substrate 30. The inner surfaces of the through holes thereby have an electrically conducting coating.

Figure 3:
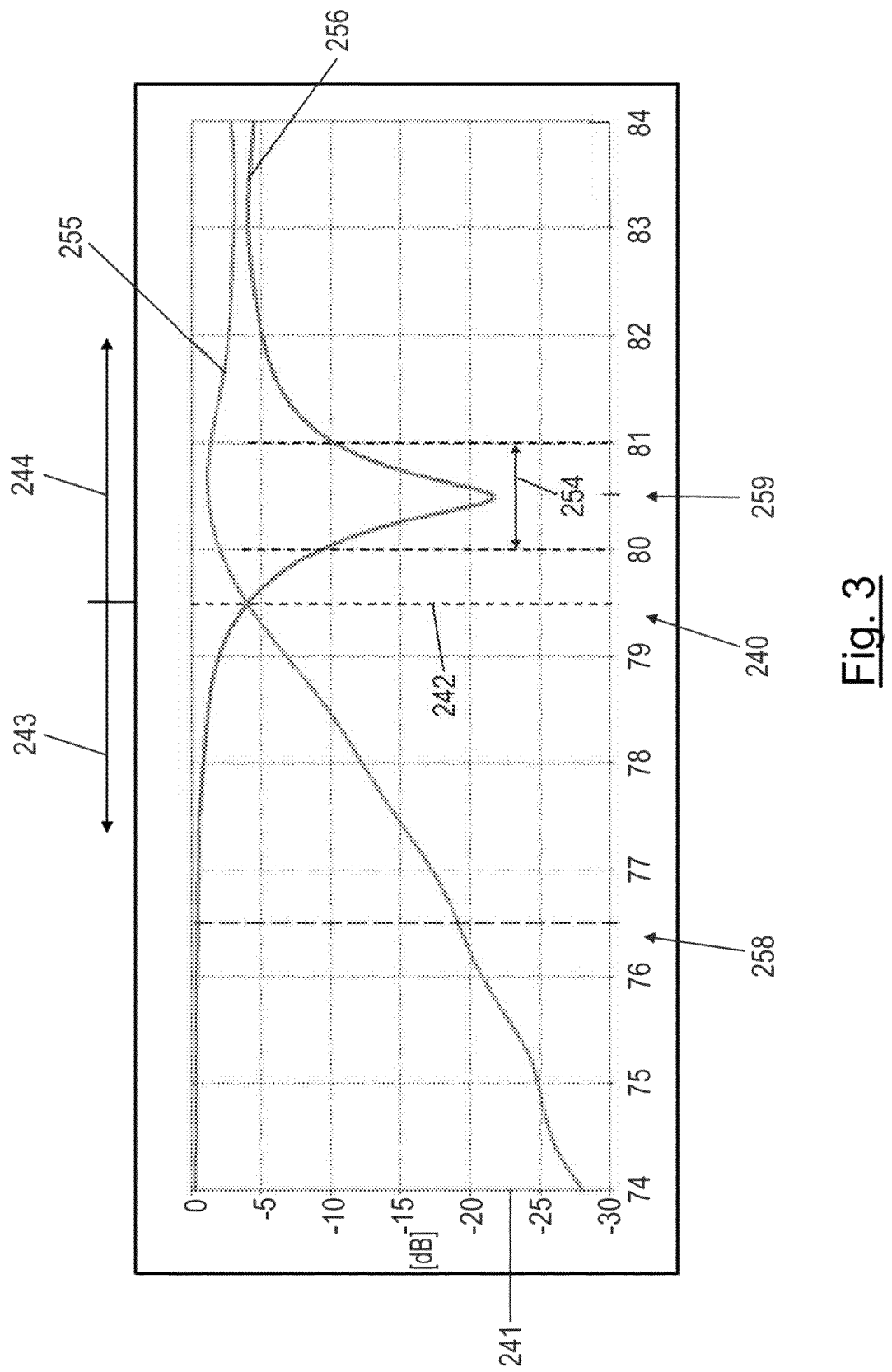
FIG. 3 is an illustration of scattering parameters of the filter section.

FIG. 3 depicts a frequency dependency of scattering parameters of the transmission line network 100 shown in FIG. 1. It shows the portions 241 of the electromagnetic energy transferred between two of the ports 102, 104 of the transmission line network 100 as a function of frequency 240.

A transmission 255 through the filter section 132, which is given by the portion of electromagnetic energy transferred between the feed port 102 and the port 104, is below −15 dB at a first frequency 258 of 76.5 GHz and rises with increasing frequency 240. At a second frequency 259 of 80.5 GHz, the transmission 255 exhibits a maximum above −2.5 dB. A corresponding reflection 256, which is given by the portion of electromagnetic energy that is reflected back to the feed port 102 after having entered the transmission line network 100 at the feed port 102, exhibits a minimum of below −20 dB at the second frequency 259. A threshold frequency 242, at which the transmission 255 equals the reflection 256, amounts to 79.5 GHz. The transmission 252 is larger than the reflection 256 above the threshold frequency 242. In total, the filter section 132 represents a high-pass filter with a stop band 243 up to the threshold frequency 242 and a pass band 244 above the threshold frequency 242. A bandwidth 254 of transmission around the second frequency 259 amounts to at least 1 GHz.

Figure 4:
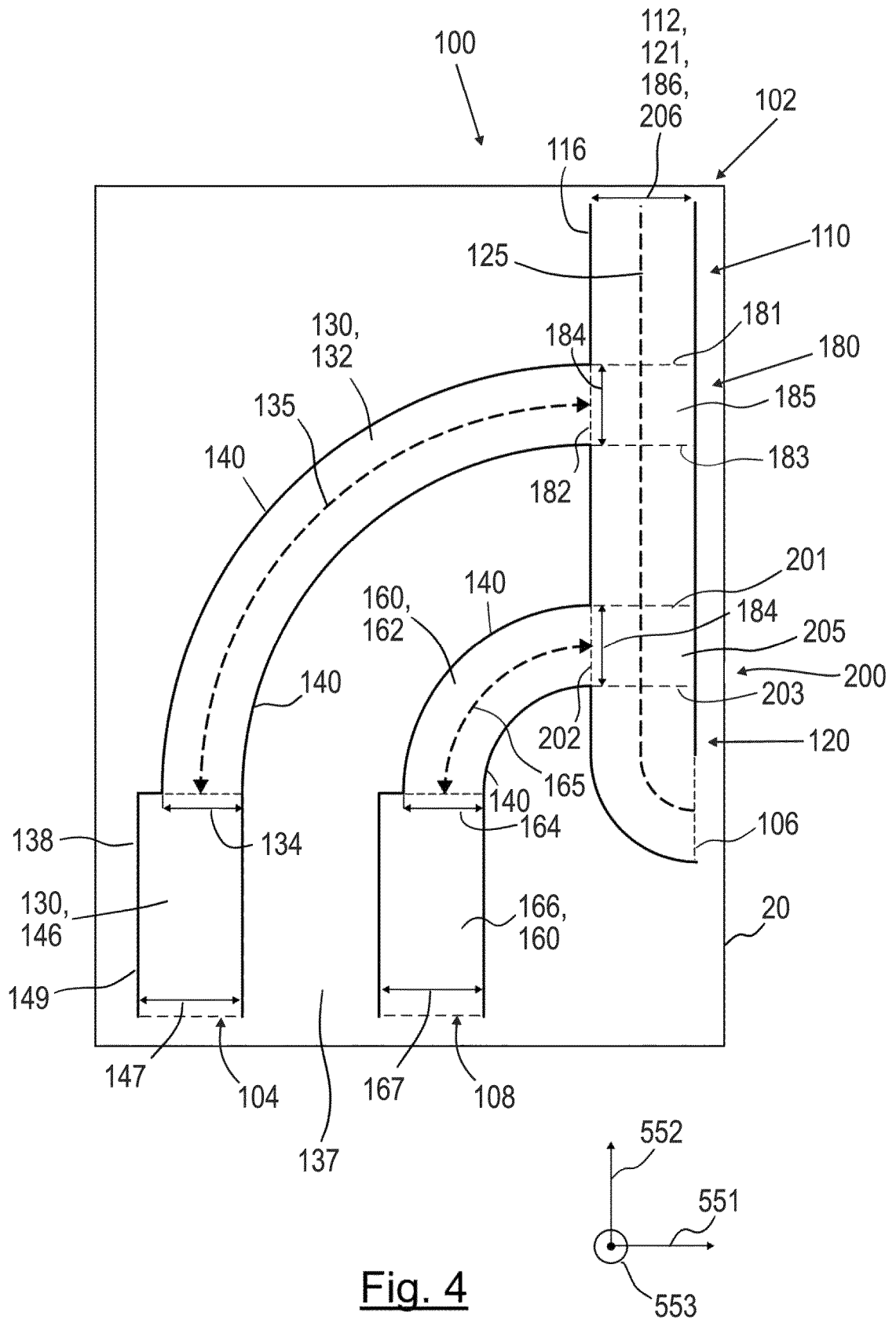
FIG. 4 is an illustration of a second embodiment of a transmission line network according to the present disclosure.

FIG. 4 depicts a second embodiment of a transmission line network 100 according to the present disclosure. As far as no differences are disclosed, the transmission line network 100 according to the second embodiment is configured as it is disclosed for the transmission line network 100 according to the first embodiment and vice versa.

The transmission line network 100 comprises a guiding section 110, a branching section 180, an additional branching section 200, a coupling section 130, and an additional coupling section 160. The guiding section 110, the branching section 180 and the additional branching section 200 are sequentially coupled to each other. Thereby, a first end 181 of the branching section 180 is directly coupled to the guiding section 110, a second end 182 of the branching section 180 is coupled to the coupling section 130 and a third end 183 of the branching section 180 is directly coupled to a first end 201 of the additional branching section 200. A second end 202 of the additional branching section 200 is coupled to the additional coupling section 160. A third end 203 of the additional branching section 200 is coupled to an additional feed section 120.

An end of the guiding section 110 that is coupled to the branching section 180, the branching section 180 and the additional branching section 200 are aligned with each other along a straight longitudinal path 125. The longitudinal path 125 runs perpendicular to a first transverse direction 551 and parallel to a second transverse direction 552. A boresight direction 553 of the antenna board 20 is orientated perpendicular to the first transverse direction 551 and the second transverse direction 552.

The longitudinal path 125 is bounded by straight lateral boundary structures that delimit the guiding section 110, the branching section 180 and the additional branching section 200 in a transverse direction perpendicular to the longitudinal path 125 and parallel to the first transverse direction 551. Both the branching section 180 and the additional branching section 200 each have a guiding segment 185, 205 that connects the first end 181, 201 with the third end 183,

203 of the respective branching section 180, 200. These guiding segments 185, 205 each are configured as straight segments.

The second end 182 of the branching section 180 and the second end 202 of the additional branching section 200 are each located at a lateral boundary structure of the respective branching section 180, 200. Thereby, the second end 182 of the branching section 180 and the second end 202 of the additional branching section 200 are located at the same side from the longitudinal path 125. With alternative embodiments, the second end 182 of the branching section 180 and the second end 202 of the additional branching section 200 may be located at opposite sides from the longitudinal path 125. Compared to locating the second ends 182, 202 of the branching sections 180, 200 at the same side from the longitudinal path 125, placing them at opposite sides may provide for more space for connecting further transmission line components to the transmission line network 100.

The coupling section 130 comprises a filter section 132 that is directly coupled to a feed section 146 and the additional coupling section 160 likewise comprises an additional filter section 162 that is directly coupled to a further feed section 166. The filter section 132 is directly coupled to the second end 182 of the branching section 180 and the additional filter section 162 is directly coupled to the second end 202 of the additional branching section 200. The coupling section 130 connects to the branching section 180 at a right angle with respect to the longitudinal path 125 and the additional coupling section 160 connects to the additional branching section 200 at a right angle with respect to the longitudinal path 125.

A transverse width 112 of the guiding section 110, a transverse width 186 of the guiding segment 185 of the branching section 180 and a transverse width 206 of the guiding segment 205 of the additional branching section 200 are all equal. The filter section 132 has a transverse width 134 and a longitudinal length 135. The transverse width 134 is smaller than the transverse widths 112, 186, 206 of the guiding section 110, the branching section 180 and the additional branching section 200. A transverse width 184 of the second end 182 of the branching section 180 equals the transverse width 134 of the filter section 132. The filter section 132 directly connects to the lateral boundary structure 116, which is running parallel to the longitudinal path 125.

A first boundary element of the lateral boundary structure 140 of the filter section 132 may be positioned in line with the lateral boundary elements of the lateral boundary structure of the guiding segment 185. Exemplarily, the first boundary element of the lateral boundary structure 140 of the filter section 132 may be in line with all lateral boundary elements of the guiding segment 185 at the side of the guiding segment 185 at which the filter section 132 is located.

The transverse widths 112, 186, 206 of the guiding section 110, the branching section 180 and the additional branching section 200 are adapted to pass electromagnetic energy at the first frequency 258 and at the second frequency 259, as well as within the first frequency band comprising the first frequency 258 and within the second frequency band comprising the second frequency 259. A transverse width 147 of the feed section 146 is larger than the transverse width 134 of the filter section 132. The transverse width 147 of the feed section 146 equals the transverse widths 112, 186, 206 of the guiding section 110, the branching section 180 and the additional branching section 200.

The transverse width 134 and the longitudinal length 135 of the filter section 132 are adapted to block electromagnetic energy at the first frequency 258 and within the first frequency band and to pass electromagnetic energy at the second frequency 259 and within the second frequency band.

The additional filter section 162 has a transverse width 164 and a longitudinal length 165. The transverse width 164 is smaller than the transverse widths 112, 186, 206 of the guiding section 110, the branching section 180 and the additional branching section 200. Exemplarily, the transverse width 164 equals the transverse width 134 of the filter section 132. Furthermore, the transverse width 164 is smaller than a transverse width 167 of the further feed section 166. The transverse width 167 of the further feed section 166 equals the transverse widths 112, 186, 206 of the guiding section 110, the branching section 180 and the additional branching section 200 and the transverse width 147 of the feed section 146. The transverse width 164 and the longitudinal length 165 of the additional filter section 162 are adapted to block electromagnetic energy at the first frequency 258 and within the first frequency band and to pass electromagnetic energy at the second frequency 259 and within the second frequency band.

The filter section 132 is at least partly located in a bent segment of the coupling section 130 and the additional filter section 162 is at least partly located in a bent segment of the additional coupling section 160.

The coupling section 130 and the additional coupling section 160 run parallel to each other at their connection to the branching sections 180, 200. Furthermore, the filter section 132 and the additional filter section 162 run parallel to each other. With the transmission line network 100 shown in FIG. 4, the filter section 132 and the additional filter section 162 run parallel to each other over their entire lengths 135, 165.

Furthermore, the coupling section 130 and the additional coupling section 160 share a common sidewall 137. The common sidewall 137 forms both a lateral boundary structure of the coupling section 130 and a lateral boundary structure of the coupling section 160.

With embodiments that are configured as substrate integrated waveguides, the common sidewall 137 may be formed by a single line of boundary elements, such as a single line of conductive members, for example a single line of conductive cylinders. Alternatively, the common sidewall 137 may also be delimited by two separate and spaced apart lines of boundary elements.

At the third end 203, the additional branching section 200 is directly coupled to the additional feed section 120. The additional feed section 120 has a transverse width 121 that is larger than the transverse widths 134, 164 of the filter section 132 and the additional filter section 162 and corresponds to the transverse widths 112, 186, 206 of the guiding section 110, the branching section 118 and the additional branching section 200. The additional feed section 120 has a bent segment that directs the longitudinal path 125 away from that side of the additional branching section 200, at which the second end 202 of the additional branching section 200 is located. The additional coupling section 160 and the additional feed section 120 share a common sidewall that forms both a lateral boundary structure 140 of the additional coupling section 160 and a lateral boundary structure 140 of the additional feed section 120.

The transmission line network 100 is exemplarily configured as a substrate integrated waveguide. The lateral boundary structures 116, 140, 149 each comprise boundary elements that are configured as it is disclosed for the boundary elements of the embodiment of the transmission line network 100 shown in FIG. 1.

The guiding section 110 is connected to a feed port 102 of the transmission line network 100. A port 104 of the transmission line network 100 is connected to the feed port 102 via the coupling section 130, the branching section 180 and the guiding section 110. An additional port 106 of the transmission line network 100 is connected to the feed port 102 via the additional feed section 120, the additional branching section 200, the branching section 180 and the guiding section 110. A further port 108 of the transmission line network 100 is connected to the feed port 102 via the additional coupling section 160, the additional branching section 200, the branching section 118 and the guiding section 110.

Due to the filter sections 132, 162, the transmission line network 100 is configured to block electromagnetic energy at the first frequency 258 and within the first frequency band from propagating between the feed port 102 and the port 104, as well as between the feed port 102 and the further port 108 and to pass electromagnetic energy at the second frequency 259 and within the second frequency band between the feed port 102 and the port 104, as well as between the feed port 102 and the further port 108.

Furthermore, the transmission line network 100 is configured to pass electromagnetic energy at the first frequency 258 and within the first frequency band between the feed port 102 and the additional port 106. The transmission line network 100 is also configured to block electromagnetic energy at the second frequency 259 and within the second frequency band from propagating between the feed port 102 and the additional port 106. This is because the coupling sections 130, 160 with their filter sections 132, 162 provide a lower resistance path to electromagnetic energy within the second frequency band than the guiding segments 185, 205 of the branching sections 180, 200 and than the additional feed section 120.

Electromagnetic energy at the first frequency 258 propagates from the feed port 102 at the guiding section 110 to the additional port 106 at the additional feed section 120. Portions of the electromagnetic energy at the first frequency 258 that leak into the filter sections 132, 162 of the coupling sections 130, 160 become attenuated so that the portion of the electromagnetic energy at the first frequency 258 that travels between the feed port 102 and the additional port 106 exemplarily is larger than the portions of the electromagnetic energy that travel between the feed port 102 and the ports 104, 108 by at least 15 dB, such as at least 20 dB or at least 25 dB.

Electromagnetic energy at the second frequency 259 propagates from the feed port 102 via the coupling section 130 to the port 104 and via the additional coupling section 160 to the further port 108. Furthermore, propagation of the electromagnetic energy at the second frequency 259 is blocked between the feed port 102 and the additional port 106. When being fed via the port 102 to the transmission line network 100, a portion of 3 dB of the fed electromagnetic energy may be coupled to the coupling section 130 and an additional of 3 dB of the remaining electromagnetic energy may be coupled to the additional coupling section 160.

Figure 5:
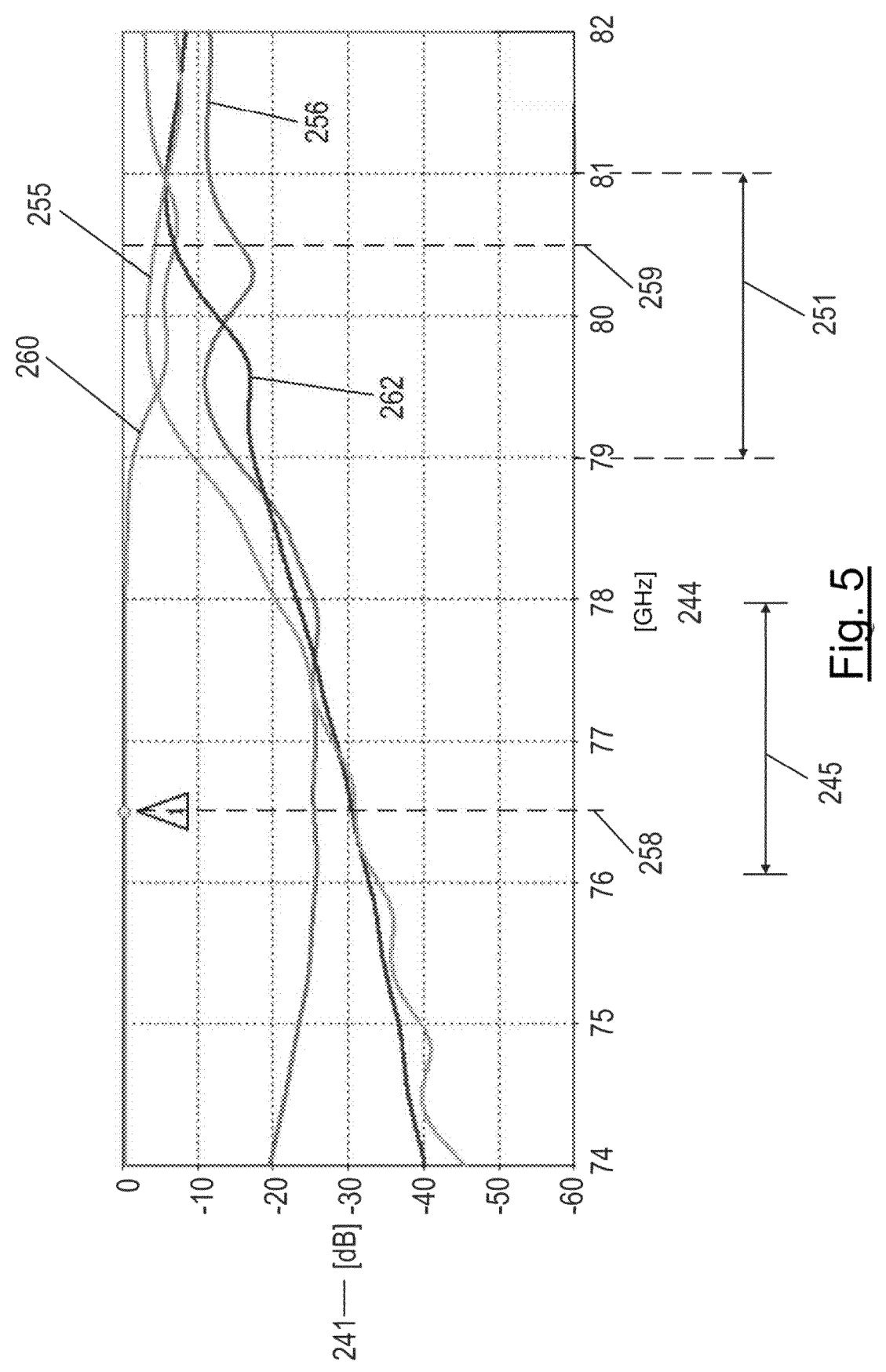
FIG. 5 is an illustration of scattering parameters of the transmission line network of the second embodiment.

FIG. 5 depicts scattering parameters of the transmission line network 100 shown in FIG. 4. Thereby, a portion 241 of electromagnetic energy traveling between individual ports 102, 104, 106, 108 of the transmission line network 100 are depicted as a function of the frequency 240. A transmission 255 via the coupling section 130 is given by the portion of the electromagnetic energy that travels between the feed port 102 and the port 104, a transmission 262 via the additional coupling section 160 is given by the portion of the electromagnetic energy that travels between the feed port 102 and the further port 108 and a transmission 260 via the additional feed section 120 is given by the portion of the electromagnetic energy that travels between the feed port 102 and the additional port 106. Lastly, a reflection 256 into the feed port 102 is given by the portion of electromagnetic energy that is reflected back to the feed port 102 when feeding the electromagnetic energy via the feed port 102.

At the first frequency 258, the transmission 260 via the additional feed section 120 is at nearly 0 dB, while the reflection 256 and the transmissions 255, 262 via the coupling sections 130, 160 are below −25 dB. At the second frequency 259, the transmissions 255, 262 via the coupling sections 130, 160 are above −10 dB, while the transmission 260 via the additional feed section 120 falls below −5 dB.

Overall, the transmission 260 via the additional feed section 120 is nearly undisturbed until about 78 GHz and then starts to drop with increasing frequency 240 to a minimum between 79.5 GHz and 81 GHz. Simultaneously, the transmissions 255, 262 via the coupling sections 130, 160 are blocked up to 79 GHz and then reach a maximum in a frequency range between 80 GHz and 81 GHz.

With the transmission line network 100 shown in FIG. 4, the first frequency band 245 around the first frequency 258 that is passed in between the feed port 102 and the further port 106 and blocked between the feed port 102 and the ports 104, 108 has a lower bound of 76 GHz and an upper bound of 78 GHz and the second frequency band 251 around the second frequency 259 that is blocked between the feed port 102 and the additional port 106 and passed between the feed port 102 and the ports 104, 108 has a lower bound of 79 GHz and an upper bound of 81 GHz.

Figures 6, 7:
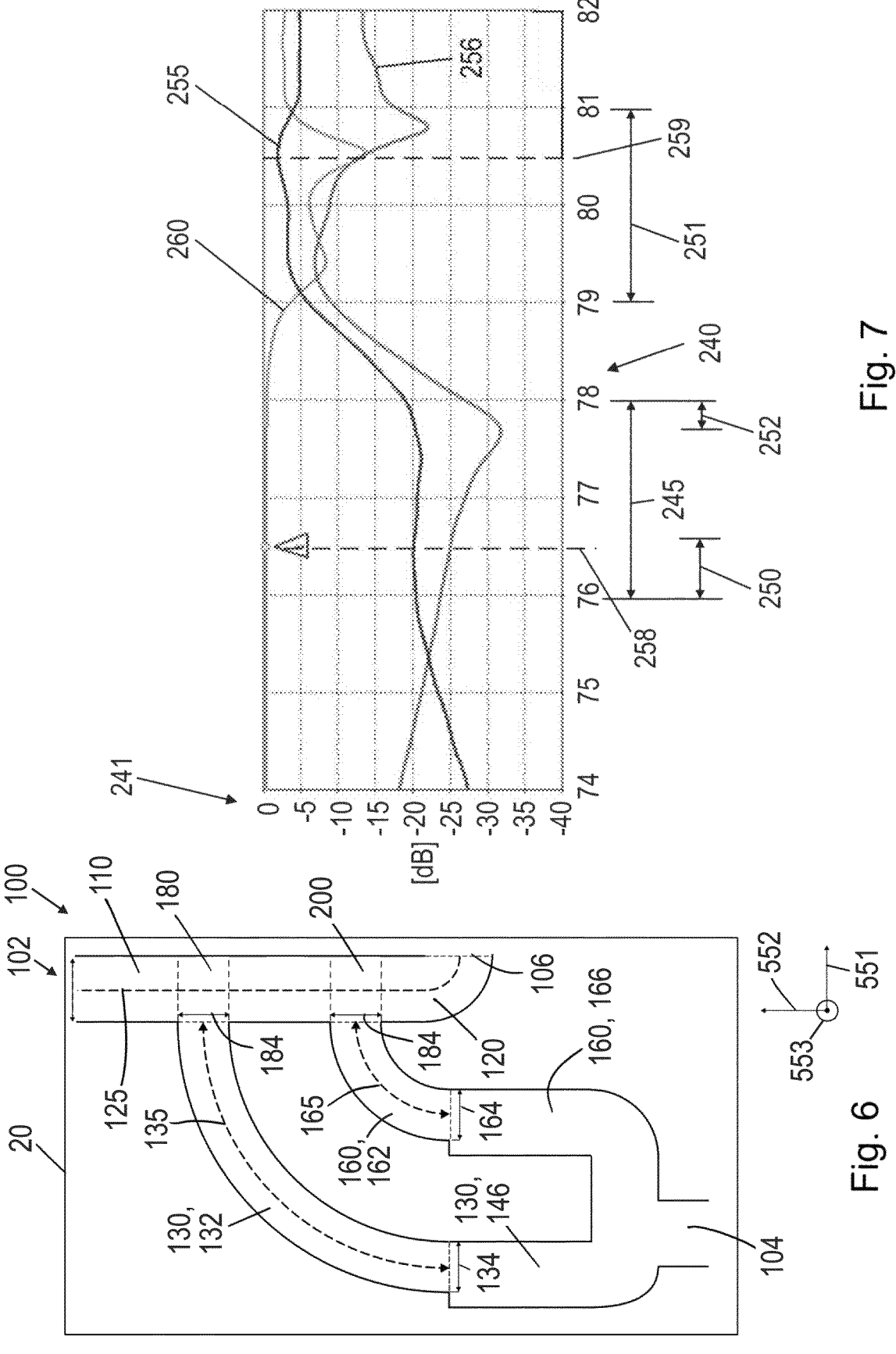
FIG. 6 is an illustration of a third embodiment of a transmission line network according to the present disclosure.
FIG. 7 is an illustration of scattering parameters of the transmission line network according to the third embodiment.

FIG. 6 depicts a third embodiment of a transmission line network 100 according to the present disclosure. As far as no differences are disclosed, the transmission line network 100 according to the third embodiment is configured as it is disclosed for the transmission line network according to the second embodiment and vice versa.

With the transmission line network 100 shown in FIG. 6, the feed section 146 of the coupling section 130 and the further feed section 166 of the additional coupling section 160 are joined together and are commonly coupled to the port 104. A longitudinal length of the feed section 146 along its longitudinal path and a longitudinal length of the further feed section 166 along its longitudinal path are adapted to provide constructive interference of the electromagnetic energy traveling via the coupling section 130 and the additional coupling section 160 at the port 104. With the present embodiment, the longitudinal length of the further feed section 166 differs from the longitudinal length of the feed section 146. The longitudinal length of the further feed section 166 is larger than the longitudinal length of the feed section 146. With other embodiments, the longitudinal length of the further feed section 166 may also be smaller than the longitudinal length of the feed section 146.

FIG. 7 depicts scattering parameters of the transmission line network 100 shown in FIG. 6. The transmission 255 between the feed port 102 and the port 104 exhibits a maximum at the second frequency 259 and lies above −6 dB in the second frequency band 251. Within the first frequency band 245, the transmission 255 lies below −15 dB.

The transmission 260 between the feed port 102 and the additional port 106 is below −2.5 dB within the second frequency band 251 and at about 0 dB within the first frequency band 245. The reflection 256 back into the feed port 102 lies below 6 dB within the first and second frequency bands 245, 251.

FIG. 8 shows a first detailed view of a first antenna system 1 according to the present disclosure. The first antenna system 1 comprises a transmission line network 100. As far as no differences are disclosed, the transmission line network 100 is configured as it is disclosed for the transmission line network 100 shown in FIG. 6.

The first antenna system 1 comprises a first antenna 300 and a second antenna 350 that are both integrated together with the transmission line network 100 on an antenna board 20. The first antenna 300 is directly coupled to the additional port 106 of the transmission line network 100. It exemplarily is elongated in an elongation direction or longitudinal direction that runs parallel to the longitudinal paths of the guiding section 110, of the guiding segment 185 of the branching section 180 and of the guiding section 205 of the additional branching section 200. The first antenna 300 has a transverse width 301 that is orientated perpendicular to its longitudinal direction. The transverse width 301 of the first antenna 300 equals the transverse widths 112, 121, 147, 167, 186, 206 of the guiding section 110, the additional feed section 120, the feed section 146, the further feed section 166, the guiding segment 185 of the branching section 180 and the guiding segment 205 of the additional branching section 200.

The first antenna 300 is configured as a waveguide antenna, namely a slotted waveguide antenna, and as a horn antenna. It comprises a waveguide, exemplarily a substrate integrated waveguide, that runs parallel to its longitudinal direction. The waveguide has antenna elements 310 that are configured as openings in the top plate 31 of the waveguide. The antenna elements 310 form elongated slots that are orientated parallel to the longitudinal direction of the first antenna 300. Furthermore, the antenna elements 310 are longitudinally fed via the waveguide of the first antenna 300.

The first antenna 300 is coupled to the additional port 106 at its center along its longitudinal direction. The antenna elements 310 on both sides of the additional port 106 are then coupled in parallel to the transmission line network 100.

The second antenna 350 is configured as a waveguide antenna, namely a slotted waveguide antenna. The second antenna 350 further is a horn antenna. The second antenna 350 is directly coupled to the port 104. It comprises a single antenna element 355 that is formed by an opening in the top plate 31 of the waveguide of the transmission line network 100 at the port 104. The antenna element 355 forms an elongated opening, namely a slot. Along the longitudinal path of the waveguide at the port 104, the coupling section 130 and the additional coupling section 160 are coupled to the second antenna 350 from opposite sides. The second antenna 350 has a transverse width 351 that equals the transverse width 147 of the feed section 146, as well as the transverse width 167 of the further feed section 166.

The antenna element 355 of the second antenna 350 is transversely fed at its longitudinal edges and the coupling sections 130, 160 run perpendicular to the longitudinal edges underneath the antenna element 355. The antenna element 355 thus forms a transversely fed antenna element, exemplarily a transversely fed slot.

The transmission line network 100 is adapted to couple electromagnetic energy traveling via the coupling section 130 and electromagnetic energy traveling via the additional coupling section 160 with a phase shift of 180° to the port 104 and the antenna element 355 of the second antenna 350. This maximizes the amplitude of the electric field within the opening of the antenna element 355 when transducing between the antenna field and the transmission line network 100. A phase shift of 180° is, inter alia, generated by adapting the longitudinal lengths of the feed section 146 and the further feed section 166.

A polarization of the first antenna 300 and a polarization of the second antenna 350 are orientated perpendicular to each other. This is realized by the antenna elements 310 of the first antenna 300 and the antenna element 355 of the second antenna 350 being orientated perpendicular to each other. The polarization of the first antenna 300 is orientated perpendicular to its longitudinal direction. The polarization of the second antenna 350 is orientated parallel to the longitudinal path of the coupling sections 130, 160 at the port 104 and parallel to the longitudinal direction of the first antenna 300.

With the first antenna system 1 shown in FIG. 8, the first antenna 300 shares a common sidewall 114 with the guiding section 110, the branching section 180, the additional branching section 200 and the additional feed section 120. The common sidewall 114 forms a lateral boundary structure of the first antenna 300 and at least a section of the transmission line network 100, such as the sections 110, 120, 180, 200 of the transmission line network 100.

An antenna field of the first antenna system 1 at the first frequency 258 of 76.5 GHz is dominated by an antenna field of the first antenna 300 with a first main antenna lobe. A direction of the first main antenna lobe is tilted with respect to the boresight direction 553 of the antenna board 20 along the first transverse direction 551 and orientated perpendicular to the second transverse direction 552. The first main antenna lobe has a larger extent along the first transverse direction 551 than along the second transverse direction 552 that is orientated perpendicular to the first transverse direction 551 and the boresight direction 553. The first transverse direction 551 is orientated perpendicular to the longitudinal extent of the first antenna 300 and perpendicular to the elongation of the antenna elements 310 of the first antenna 300.

An antenna field of the first antenna system 1 at the second frequency 259 of 80.5 GHz is dominated by an antenna field of the second antenna 350 with a second main antenna lobe. A direction of the second main antenna lobe is orientated parallel to the boresight direction 553 and the second main antenna lobe has comparable widths along the first transverse direction 551 and the second transverse direction 552.

Generally speaking, the direction of the first main antenna lobe deviates from the direction of the second main antenna lobe. Exemplarily, one of the first and second main antenna lobe is orientated parallel to the boresight direction and the other one of the first and second main antenna lobe deviates from the boresight direction.

The first antenna system 1 is configured to be mounted on a vehicle in an orientation that places the first transverse direction 551 parallel to an azimuthal direction and the second transverse direction 552 parallel to an elevation direction. With alternative embodiments of the first antenna system 1, the first transverse direction 551 may also be placed parallel to the elevation direction and the second transverse direction 552 may be placed parallel to the azimuthal direction. As such, the present disclosure also is directed at the first antenna system 1 being mounted in one of said orientations on a vehicle.

FIG. 9 depicts a detailed view of a second variant of the first antenna system 1 according to the present disclosure. As far as no differences are disclosed, the second variant of the first antenna system 1 is configured as it is disclosed for the first variant shown in FIG. 8 and vice versa.

With the second variant of the first antenna 1, the sidewall 137 between the coupling section 130 and the additional coupling section 160 is configured as a common sidewall. The common sidewall is formed by a single lateral boundary structure that is a lateral boundary structure of both the coupling section 130 and the additional coupling section 160. Exemplarily, the common sidewall is located in between the feed section 146 of the coupling section 130 and the further feed section 166 of the additional coupling section 160. The single lateral boundary structure of the sidewall 137 forms both a lateral boundary structure of the feed section 146 and the further feed section 166.

In addition, the sidewall 114 between the first antenna 300 and at least one section of the transmission line network 100 along the longitudinal path 125 is also configured as a common sidewall. This common sidewall comprises a single lateral boundary structure that is a lateral boundary structure of both the first antenna 300 and the at least one section of the transmission line network 100. Exemplarily, the sidewall 114 formed as common sidewall delimits the guiding section 110, the guiding segment 185 of the branching section 180, the guiding segment 205 of the additional branching section 200 and the additional feed section 120.

The additional coupling section 160 and at least one section of the transmission line network 100 along the longitudinal path 125 also share a sidewall that is configured as a common sidewall with a single lateral boundary structure that is a lateral boundary structure of both the section of the transmission line network 100 and the additional coupling section 160. With the embodiment shown in FIG. 9, this sidewall is located in between the additional filter section 162 and the additional feed section 120. With other embodiments, the sidewall may be additionally or alternatively located in between the further feed section 166 and the additional feed section 120.

With both variants of the first antenna system 1, a distance between the center of the first antenna 300 and the center of the second antenna 350 may amount to three halves of the wavelength of electromagnetic energy at the first and/or second frequency. For example, each width 112, 121, 147, 167, 186, 206, 301, 351 may amount to half said wavelength.

Figures 10, 11:
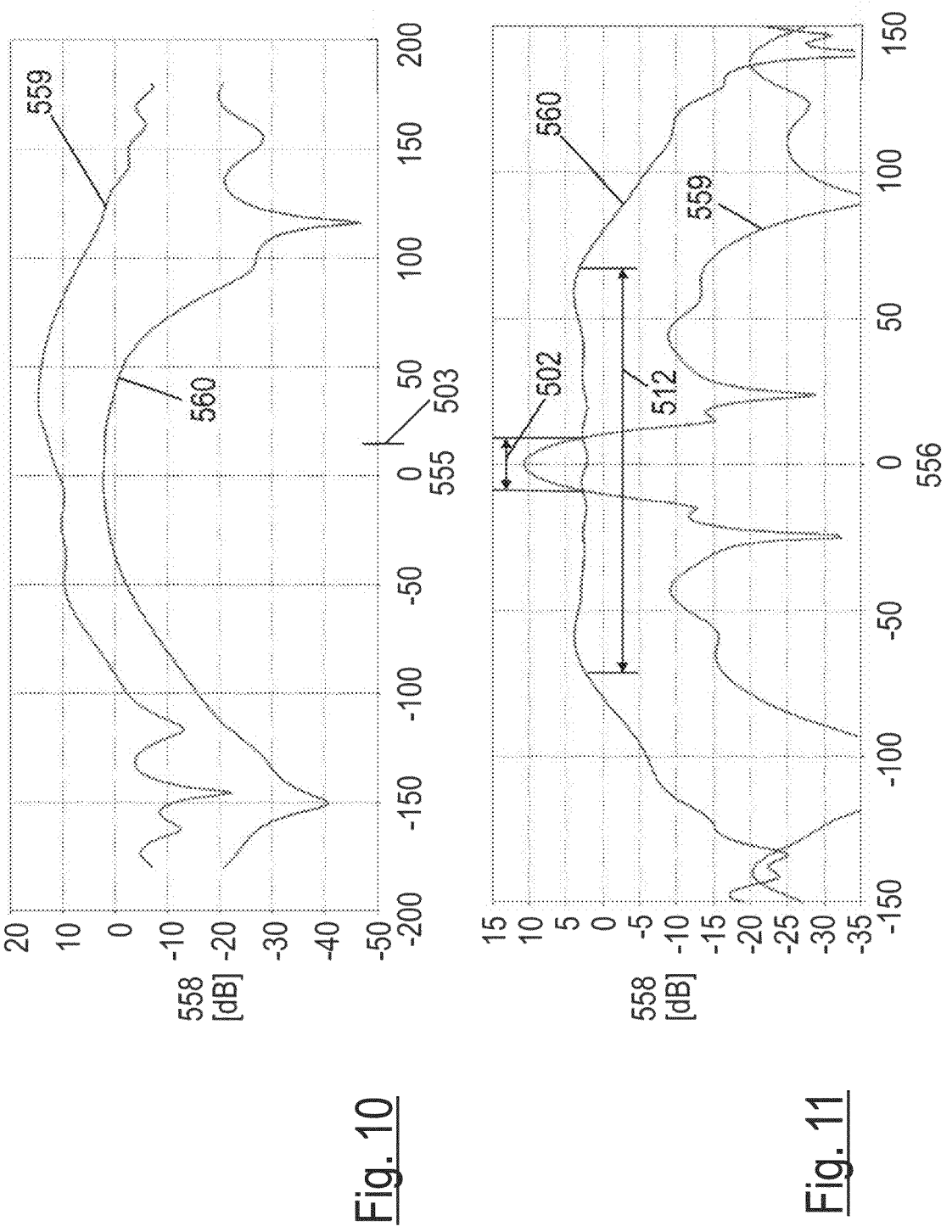
FIG. 10 is an illustration of an antenna gain of the first antenna system along a first transverse direction at a first frequency and at a second frequency.
FIG. 11 is an illustration of an antenna gain of the first antenna system along a second transverse direction at the first frequency and at the second frequency.

FIG. 10 depicts an antenna gain 558 of the first antenna system 1 in a cut plane parallel to the first transverse direction 551 and perpendicular to the second transverse direction 552 as a function of a first angle 555 that specifies a rotation around the second transverse direction 552. The cut plane is centered with respect to the first antenna 300. FIG. 10 thereby depicts a first antenna gain 559 of the first antenna system 1 at the first frequency 258 and a second antenna gain 560 of the first antenna system 1 at the second frequency 259.

Overall, the first antenna gain 559 at the first frequency 258 is dominated by the antenna field of first antenna 300 and provides a higher gain 558 than the second antenna gain 560 at the second frequency 259, which is dominated by the antenna field of the second antenna 350. A relative width of the antenna field of the first antenna 300 and a relative width of the antenna field of the second antenna 350 in the first transverse direction 551 are essentially equal.

FIG. 11 depicts the antenna gain 558 in a cut plane parallel to the second transverse direction 552 and perpendicular to the first transverse direction 551 as a function of a second angle 556 that specifies a rotation around the first transverse direction 551. The cut plane is centered with respect to the first antenna 300. The first antenna gain 559 at the first frequency 258 is dominated by the antenna field of the first antenna 300 and has a first width 502. The second antenna gain 560 at the second frequency 259 is dominated by the antenna field of the second antenna 350 and has a second width 512.

The second width 512 thereby is larger than the first width 502. Furthermore, the second antenna gain 559 and the antenna field of the second antenna 350 are symmetric with respect to the boresight direction 553, which corresponds to a second angle 556 of 0°. The first width 502 amounts to an angular range or field of view of second angles 556 between −9° and 9° and the second width 512 amounts to an angular range or field of view of second angles 556 between −60° and 60°. Generally, the second width 512 may have a lower bound that is between −80° and −10°, such as between −60° and −20°. The second width 512 generally may have an upper bound that is between 10° and 80°, such as between 20° and 60°. At second angles 556 between 20° and 30° in either direction, an increase in gain 558 when operating at the second frequency 259 compared to operation at the first frequency 258 amounts to more than 15 dB, such as more than 17 dB.

Figure 12:
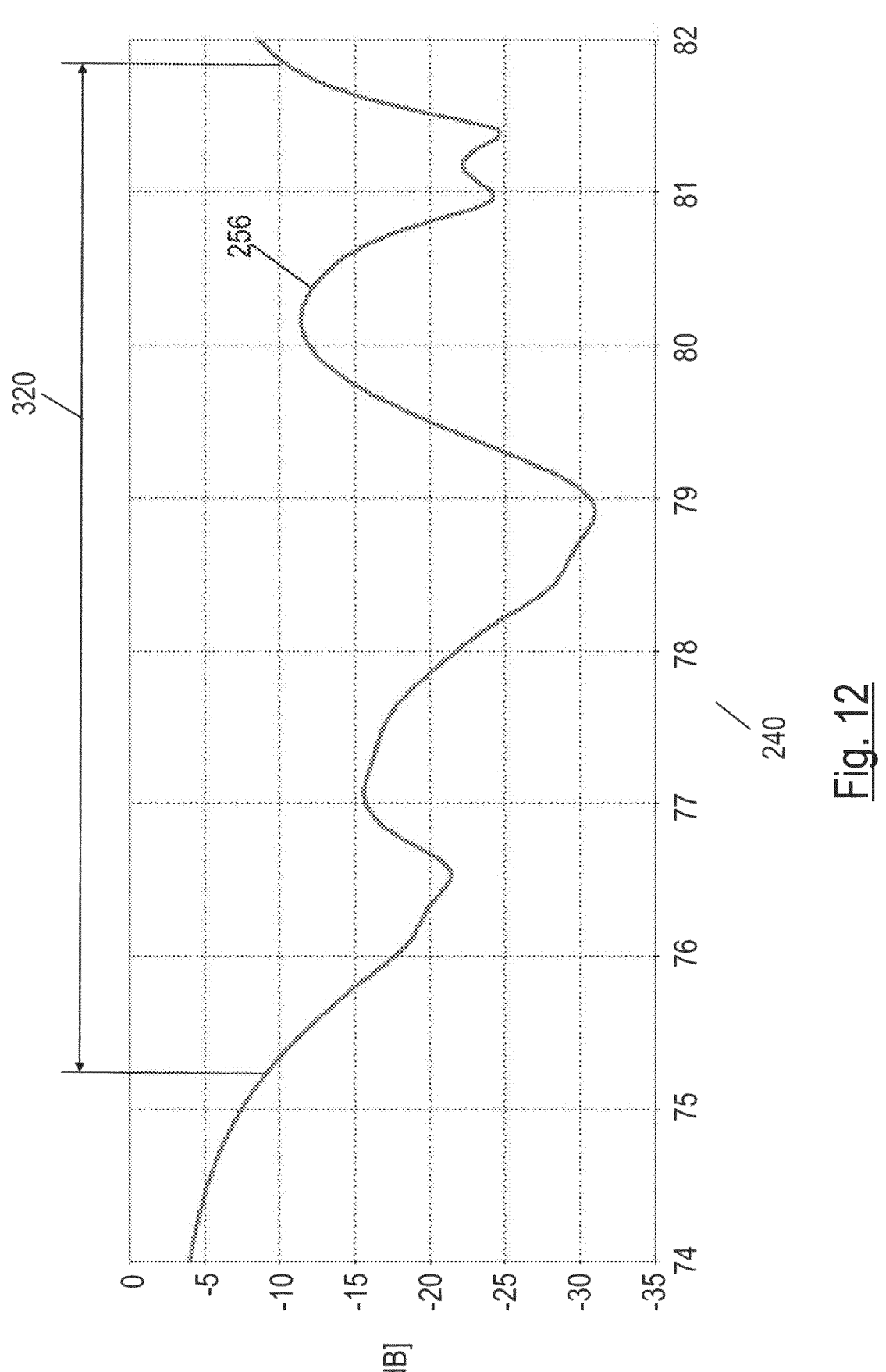
FIG. 12 is an illustration of a frequency dependency of a reflection of the first antenna system at a feed port.

FIG. 12 depicts a reflection 256 of the first antenna system 1 at the feed port 102 located at the guiding section 110 as a function of the frequency 240. The reflection 256 is below −10 dB in a bandwidth 320 of 6.5 GHz. The bandwidth 320 comprises a frequency range from 76 GHz to 81 GHz. It includes the first frequency 258 and the second frequency 259.

Figure 13:
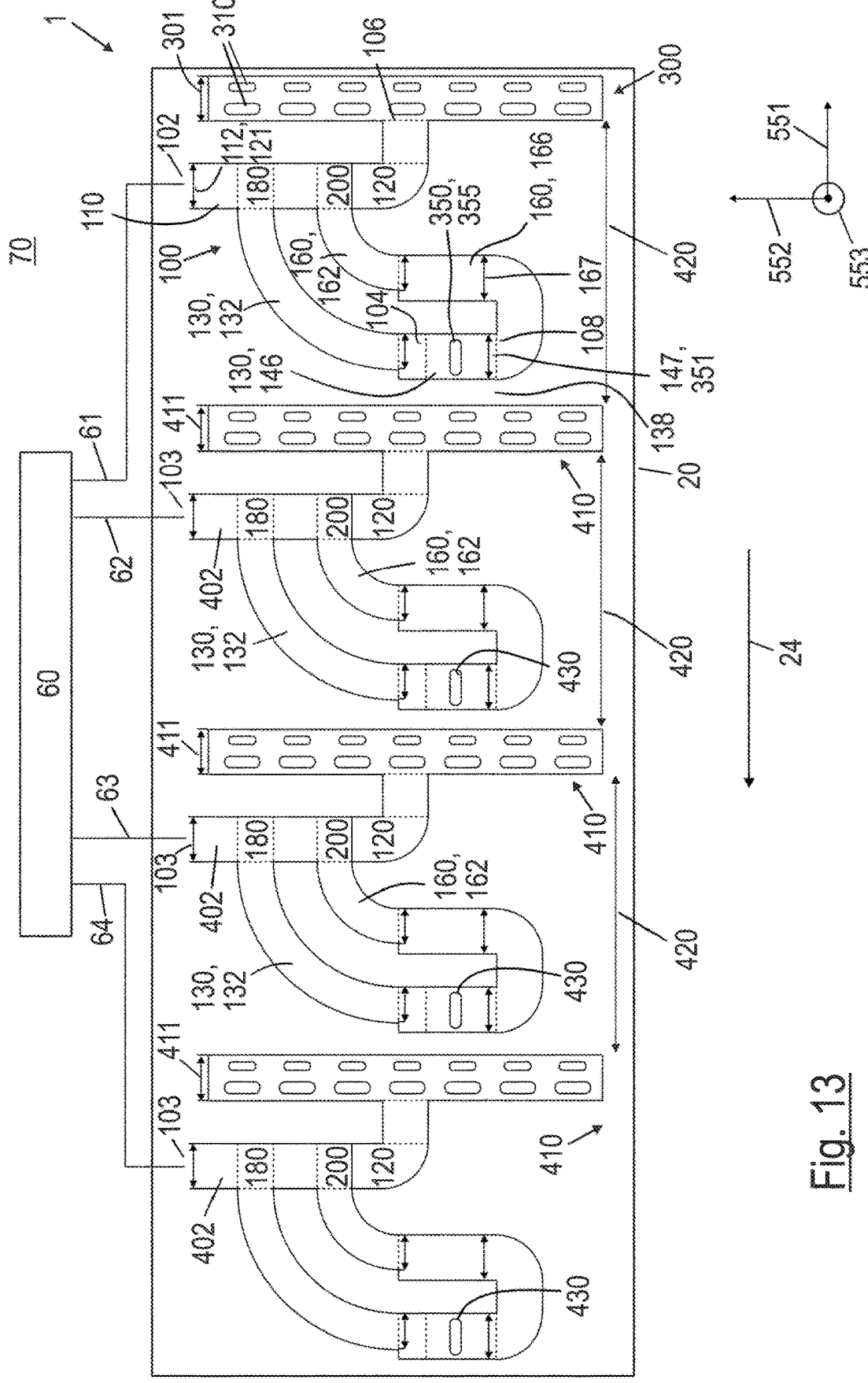
FIG. 13 is an illustration of a radar system with a second detailed view of the first variant of the first antenna system.

FIG. 13 depicts a radar system 70 comprising the first embodiment of the first antenna system 1 shown in FIG. 8, whereby the first antenna system 1 is shown in a second detailed view. The first antenna system 1 comprises an additional first antenna 410 and an additional second antenna 430. As far as no differences are disclosed, the additional first antenna 410 and the additional second antenna 430 are configured as it is disclosed for the first antenna 300 and the second antenna 350 and vice versa. The additional first antenna 410 and the additional second antenna 430 are coupled to an additional guiding section 402 of the transmission line network 100. As far as no differences are disclosed, the additional guiding section 402 is configured as it is disclosed for the guiding section 110 and vice versa.

The first antenna 300 and the additional first antenna 410 are placed next to each other on the antenna board 20. Thereby, the first antenna 300 and the additional first antenna 410 are orientated parallel to each other. The additional first antenna 410 is placed at a distance 420 from the first antenna 300 in a separation direction 24. The separation direction 24 is orientated perpendicular to the longitudinal extent of the first antenna 300 and the longitudinal extent of the additional first antenna 410. It is also orientated parallel to the first transverse direction 551.

The distance 420 is larger than the sum of the widths 121, 147, 167 of the additional feed section 120, the feed section 146 and the further feed section 166. With other embodiments, the distance 420 may equal the sum of the widths 121, 147, 167. With such an embodiment, the feed section 146 and the further feed section 166 may be placed directly adjacent to each other and/or share a single boundary structure, such as a single line of conductive cylinders. Additionally or alternatively, the further feed section 166 and the additional feed section 120 may be placed directly adjacent to each other and/or share a single boundary structure, such as a single line of conductive cylinders. For example, such an embodiment may comprise the second variant of the first antenna system 1 shown in FIG. 9.

With the first antenna system 1 shown in FIG. 13, the transverse width 301 of the first antenna 300, the transverse width 147 of the feed section 146, the transverse width 167 of the further feed section 166 and the transverse width 121 of the additional feed section 120 all equal half a wavelength of the electromagnetic energy at the first frequency 258.

The additional first antenna 410 is centered with respect to the first antenna 300 in the second transverse direction 252 perpendicular to the separation direction 24. A transverse width 411 of the additional first antenna 410 equals the transverse width 301 of the first antenna 300.

The coupling section 130 that is connected to the guiding section 110 and the second antenna 350 shares a common sidewall 138 with the additional first antenna 410. The common sidewall 138 forms both a lateral boundary structure of the coupling section 130 and as a lateral boundary structure of the additional first antenna 410. The common sidewall 138 may comprise a single lateral boundary structure, such as a single line of conductive cylinders, for both the coupling section 130 and the additional first antenna 410.

On a side of the additional first antenna 410 opposite the first antenna 300, two further additional first antennas 410 are placed next to each other on the antenna board 20. All first antennas 300, 410 are thereby separated by the distance 420 in the separation direction 24. Furthermore, all first antennas 300, 410 are centered with respect to each other perpendicular to the separation direction 24. With other embodiments of the first antenna system 1, the first antennas 300, 410 may also be shifted with respect to each other perpendicular to the separation direction 24. Additionally or alternatively, they may have unequal spacings among each other along the separation direction 24.

As far as no differences are disclosed, the further additional first antennas 410 are configured as it is disclosed for the additional first antenna 410 and vice versa.

The distance 420 in between the first antennas 300, 410 may amount to three halves the wavelength of electromagnetic radiation at the first and/or second frequency. Additionally alternatively, a distance between the centers of neighboring first antennas 300, 410 may amount to two times said wavelength.

Each individual additional first antenna 410 is connected together with an individual additional second antenna 430 to a separate additional guiding section 402 of the transmission line network 100. The individual second antennas 350, 430 are all separated by the distance 420 from each other along the separation direction 24 on the antenna board 20. Furthermore, they are all aligned with each other in the second transverse direction 552. With other embodiments, the individual second antennas 350, 430 may also be shifted with respect to each other along the second transverse direction 552 and/or they may have different spacings among each other.

The additional guiding sections 402 each are coupled to separate additional feed ports 103 of the first antenna system 1. The first antenna system 1 is connected to a radar circuit 60, whereby a first circuit port 61 of the radar circuit 60 is coupled to the feed port 102. A second circuit port 62, a third circuit port 63 and a fourth circuit port 64 of the radar circuit 60 each are coupled to a separate one of the additional feed ports 102 of the first antenna system 1.

The parts of the first antenna system 1 shown in FIG. 8 or FIG. 9 form an antenna subsystem of the first antenna system 1. As can be seen from FIG. 13, the first antenna system 1 comprises several of these antenna subsystems that are placed next to each other on the antenna board 20. Each of the antenna subsystems comprises one of the feed ports 102, 103, one of the first antennas 130, 410, one of the second antennas 350, 430 and the corresponding parts of the transmission line network 100 that couple the respective first and second antennas 130, 350, 410, 430 to the respective feed port 102, 103.

With other embodiments of the first antenna system 1 shown in FIG. 13, the second antennas 350 may be shifted with respect to each other in the second transverse direction 552 to allow to determine an angular position of a target object along the second transverse direction 552 or depending on the second angle 556. The second transverse direction 552 may be the elevation direction and/or the second angle 556 may be the elevation angle.

Figure 14:
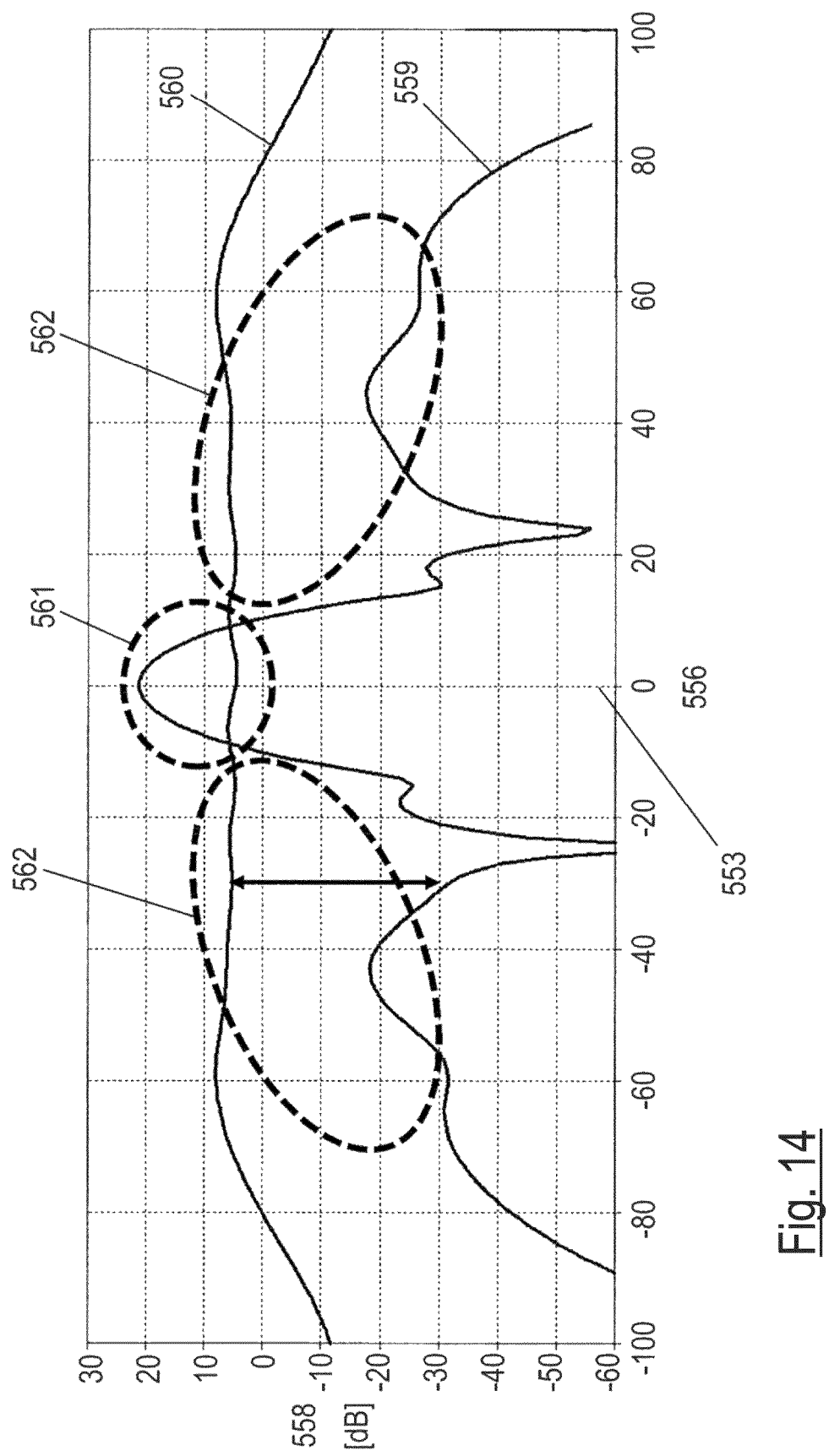
FIG. 14 is an illustration of the antenna gain of the first antenna system along the second transverse direction at the first frequency and at the second frequency with a first detection region and with second detection regions.

FIG. 14 depicts the first antenna gain 559 and the second antenna gain 560 of the first antenna system 1 as a function of the second angle 556 and for a first angle 555 of 0° together with a first detection region 561 and second detection regions 562 of the first antenna system 1 shown in FIG. 9.

The first detection region 561 is centered around the boresight direction 553 at a second angle 556 of 0° and a first angle 555 of also 0°. It roughly extends along the second transverse direction 552 between a second angle 556 of −15° and a second angle 556 of 15°. The second detection regions 562 are centered offset from the boresight direction 553 at second angles 556 of about −40° and 40°, respectively. A first one of the second detection regions 562 roughly extends between second angles 556 of −60° and −20° and a second one of the second detection regions 562 roughly extends between second angles 556 of 20° and 60°.

Within the second detection regions 562, the second antenna gain 560 is larger than the first antenna gain 559. An isolation between the first antennas 300 and the second antennas 350 thereby exemplarily is 36 dB. The first detection region 561 extends by at least 30 m, such as at least 50 m or at least 60 m in the boresight direction 553.

Detection of target objects within the first detection region 561 is exemplarily used for dual-polarization detections. The radar system 70 comprising the first antenna system 1 thereby is configured to detect the target objects both with the first antennas 300 and with the second antennas 350, the first antennas 300 and the second antennas 350 having differing polarization, exemplarily having orthogonal polarization. The radar system 70 then is configured to use target reflections of the target object having both polarizations to determine target properties of the target object. For example, the radar system 70 is configured to determine co-polarization reflections (HH and VV) of the target objects by evaluating transmit and receive signals transmitted and received only via the first antennas 300 or only via the second antennas 350 and thus having the same polarization.

The radar system 70 is configured to use the dual-polarized detections for target classification and street condition monitoring.

The radar system 70 is configured to use target reflections received from one of the second detection regions 562 that is located at negative elevation angles after mounting the antenna system 1 to a vehicle for parking aid, classification of over-drivable objects in the near range and/or on-road obstacle detection in the near range. The radar system 70 is configured to use target reflections received from the other one of the second detection regions 562 that is located at positive elevation angles after mounting the antenna system 1 to a vehicle for classification of under-drivable objects in the near range.

The two second detection regions 562 are symmetrically located with respect to the boresight direction 553 along the second transverse direction 552. The first antenna system 1 is configured to be mounted on either front corner of the vehicle with orientation that are rotated by 180° with respect to each other around the boresight direction 553.

The main antenna lobes of the antenna fields of the second antennas 350, 430 are centered with respect to the first angle 555 and symmetric with respect to the second angle 556.

Different from the embodiment shown in FIGS. 11 and 14, the directions of the main antenna lobes of the antenna field of the first antennas 300, 410 may also be tilted with respect to the boresight direction 553 along the first transverse direction 551 and around the second transverse direction 552. The main antenna lobes of the antenna fields of the first antennas 300, 410 then still may be centered with respect to the first angle 555. Said tilting may exemplarily result from the antenna elements 310 of the first antennas 300, 410 being asymmetrically distributed and formed within the individual first antennas 300, 410 along the first transverse direction 551.

The first antenna system 1 then is configured to be mounted on either side of the vehicle with respect to a forward direction of the vehicle with the directions of the main antenna lobes of the first antennas 300, 410 of the antenna system 1 being tilted towards a central longitudinal axis of the vehicle parallel to the forward direction. The first antenna system 1 thereby is mounted on either side of the vehicle in respective orientations relative to each other that result from a rotation of the antenna system 1 by 180° around the boresight direction 553. For either position, the first transverse direction 551 then is directed towards the central longitudinal axis of the vehicle.

If the first antenna system 1 is located at the front of the vehicle and to the right of the central longitudinal axis, it has the second transverse direction 552 pointing away from a surface over which the vehicle travels, that is, towards positive elevation angles, and if the first antenna system 1 is located at the front of the vehicle and to the left of the central longitudinal axis, it has the second transverse direction 552 pointing towards the surface over which the vehicle travels, that is towards negative elevation angles. In either orientation, the direction of the main lobe of the antenna field 500 of the first antennas 300, 410 is directed towards the central longitudinal axis of the vehicle.

With the radar system 70, two of the first antenna systems 1 are placed at either side of a vehicle with respect to the forward direction of the vehicle and the two first antenna systems 1 have respective relative orientations that are rotated by 180° with respect to each other around the boresight direction 553. Thereby, the first antenna system 1 that is located at the front of the vehicle and to the right of the central longitudinal axis has the second transverse direction 552 pointing away from a surface over which the vehicle travels, that is, towards positive elevation angles, and the first antenna system 1 that is located at the front of the vehicle and to the left of the central longitudinal axis, has the second transverse direction 552 pointing towards the surface over which the vehicle travels, that is towards negative elevation angles. Each first antenna system 1 has the direction of the main lobe of the antenna field of the first antennas 300, 410 directed towards the central longitudinal axis of the vehicle.

Figure 15:
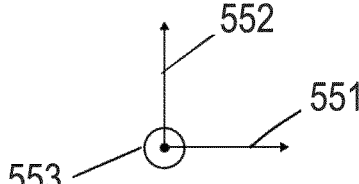
FIG. 15 is an illustration of a detailed view of a second antenna system according to the present disclosure.

FIG. 15 shows a detailed view of a second antenna system 2 according to the present disclosure. As far as no differences are disclosed, the second antenna system 2 is configured as it is disclosed for the first antenna system 1 shown in FIGS. 8, 9 and 13.

With the second antenna system 2, the coupling section 130 and the additional coupling section 160 turn in the opposite direction after branching from the branching sections 180, 200 compared to the coupling section 130 and the additional coupling section 160 of the first antenna system 1. Therefore, the bent segment of the filter section 132 of the coupling section 130 is located radially inward from the bent segment of the filter section 162 of the additional coupling section 160.

The parts of the second antenna system 2 shown in FIG. 15 form an antenna subsystem of the second antenna system 2 and several of these antenna subsystems are placed next to each other on the antenna board 20 in the same way as it is shown in FIG. 13 for the antenna subsystems of the first antenna system 1.

Figure 16:
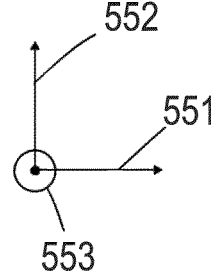
FIG. 16 is an illustration of a detailed view of a third antenna system according to the present disclosure.

FIG. 16 depicts a detailed view of a third antenna system 3 according to the present disclosure. As far as no differences are disclosed, the third antenna system 3 is configured as it is disclosed for the first antenna system 1 and vice versa.

With the third antenna system 3, the coupling section 130 is coupled to a port 104 and the additional coupling section 160 is coupled to an additional port 108.

The third antenna system 3 comprises a first antenna 300 and a second antenna 350. The second antenna 350 comprises a first antenna element 356 and a second antenna element 357. Both antenna elements 356, 357 are configured as transversely fed antenna elements, exemplarily as transversely fed slots. The antenna elements 356, 357 each are only fed at one longitudinal side. They are placed parallel to each other and are separated by a separating structure 358 that runs parallel to the antenna elements 356, 357. The separating structure 358 is configured as a boundary structure of the substrate integrated waveguides forming the coupling sections 130, 160.

The port 104 is directly coupled to the first antenna element 256 and the further port 108 is directly coupled to the second antenna element 257. The coupling sections 130, 160 are adapted to coherently transduce electromagnetic energy between an antenna field of the second antenna 350 and the transmission line network 100.

A main antenna lobe of the second antenna 350 has a direction that differs from the direction of the main antenna lobe of the first antenna 300. Furthermore, the main antenna lobe of the second antenna 350 is tilted with respect to the boresight direction 553 around the first transverse direction 552.

At the first frequency 258, the antenna field of the third antenna system 3 is dominated by the antenna field of the first antenna 300 with a main antenna lobe. A direction of the main antenna lobe is orientated parallel to the boresight direction 553 of the antenna board 20.

At the second frequency 259, the antenna field of the third antenna system 3 is dominated by an antenna field of the second antenna 350 with two main antenna lobes. Directions of the main antenna lobes are tilted with respect to the boresight direction 553 in a plane perpendicular to the first transverse direction 551. The main lobes of the antenna field of the second antenna 350 are therefore directed away from the boresight direction 553.

The third antenna system 3 is configured to shift the main antenna lobes of the second antenna 350 away from the boresight direction 533 by introducing a relative phase shift between the portions of the electromagnetic energy that arrive at the port 104 and the further port 108, respectively.

The phase shift thereby is adapted to a distance between the first and second antenna element 356, 357 in the second transverse direction 552.

Overall, a first antenna gain at the first frequency 258 is dominated by the antenna field of the first antenna 300 and provides a higher gain than a second antenna gain at the second frequency 259, which is dominated by the antenna field of the second antenna 350. A relative width of the antenna field of the first antenna 300 and a relative width of the antenna field of the second antenna 350 in the first transverse direction 551 are essentially equal.

In a cut plane perpendicular to the first transverse direction 551 the first antenna gain at the first frequency 258 has a first width and the second antenna gain at the second frequency 259 has a second width. The second width thereby is larger than the first width. Furthermore, the second antenna gain and the antenna field of the second antenna 350 are symmetric with respect to the boresight direction 553. The first width amounts to an angular range or field of view between −9° and 9°. The second width exemplarily extends between −75° and 80°. Generally, the second width may have a lower bound that is between −80° and −10°, such as between −60° and −20°. The second width generally may have an upper bound that is between 10° and 80°, such as between 20° and 60°.

In the cut plane perpendicular to the first transverse direction 551, maxima of the second antenna gain are located at angles of around +60° and thus away from the boresight direction 553 at an angle of 0°. This reflects the tilting of the directions of the main antenna lobes of the second antenna 350 away from the boresight direction 553.

A reflection of the third antenna system 3 at the feed port 102 located at the guiding section 110 is below −10 dB in a bandwidth of more than 6 GHz. The bandwidth comprises a frequency range from 76 GHz to 81 GHz.

The parts of the third antenna system 3 shown in FIG. 16 form an antenna subsystem of the third antenna system 3. Like with the first antenna system 1 shown in FIG. 13, also the third antenna system 3 comprises several of these antenna subsystems that are placed next to each other on the antenna board 20 in the same way as it is shown in FIG. 13 for the antenna subsystems of the first antenna system 1. With the radar system 70 comprising the third antenna system 3, the coupling sections 102 of the individual antenna subsystems are then coupled to separate circuit ports 61, 62, 63, 64 of the radar circuit 60 of the radar system 70.

Figure 17:
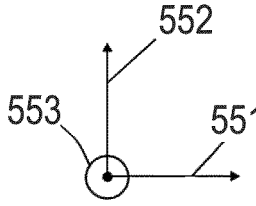
FIG. 17 is an illustration of a detailed view of a fourth antenna system according to the present disclosure.

FIG. 17 depicts a detailed view of a fourth antenna system 4 according to the present disclosure. As far as no differences are disclosed, the fourth antenna system 4 is configured as it is disclosed for the third antenna system 3 and vice versa.

With the fourth antenna system 4, the second antenna element 357 of the second antenna 350 is longitudinally fed by the additional coupling section 160. Like with the third antenna system 3, a length of the further feed section 166 and a length of the feed section 146 of the fourth antenna system 4 are adapted to generate an antenna field of the second antenna 350 that has a main antenna lobe having a direction that is parallel to the direction of the main lobe of the first antenna 300 and that is also parallel to the boresight direction 553.

With other embodiments of the fourth antenna system 4, the further feed section 166 and the feed section 146 may also be adapted to generate an antenna field of the second antenna 350 that has a main antenna lobe having a direction that differs from the direction of the main antenna lobe of the first antenna 300 and/or that deviates from the boresight direction 553.

Compared to the two transversely fed antenna elements 356, 357 of the third antenna system 3, the longitudinally fed antenna element 357 of the second antenna 350 of the fourth antenna system 4 increase the antenna gain of the second antenna 350.

A bandwidth of the fourth antenna system 4 at the feed port 102 amounts to more than 6 GHz and encompasses a frequency range between 76 GHz and 81 GHz.

In a cut plane perpendicular to the first transverse direction 551 a first antenna gain of the fourth antenna system 4 at the first frequency 258 is dominated by the antenna field of the first antenna 300 that has a main antenna lobe with a first width. A second antenna gain at the second frequency 259 is dominated by the antenna field of the second antenna 350 that has a main antenna lobe with a second width in the cut plane perpendicular to the first transverse direction 551. The second width thereby is larger than the first width. Furthermore, the second antenna gain and the antenna field of the second antenna 350 are symmetric with respect to the boresight direction 553, which corresponds to an angle of 0°. The first width amounts to an angular range or field of view of angles between −9° and 9°. The second width exemplarily extends between −50° and 40°. Generally, the second width may have a lower bound that is between −60° and −10°, such as between −50° and −25°. For example, the lower bound may be between −55° and −45°, such as −50°, or between −30° and −20°, such as −25°. The second width generally may have an upper bound that is between 45° and 55°, such as 50°, or between 25° and 30°, such as 25°.

The parts of the fourth antenna system 4 shown in FIG. 17 form an antenna subsystem of the fourth antenna system 4. Like with the other antenna systems according to the present disclosure, also the fourth antenna system 4 comprises several of these antenna subsystems that are placed next to each other on the antenna board 20 in the same way as it is shown in FIG. 13 for the antenna subsystems of the first antenna system 1. With the radar system 70 comprising the fourth antenna system 4, the coupling sections 102 of the individual antenna subsystems are then coupled to separate circuit ports 61, 62, 63, 64 of the radar circuit 60 of the radar system 70.

Figures 18, 19:
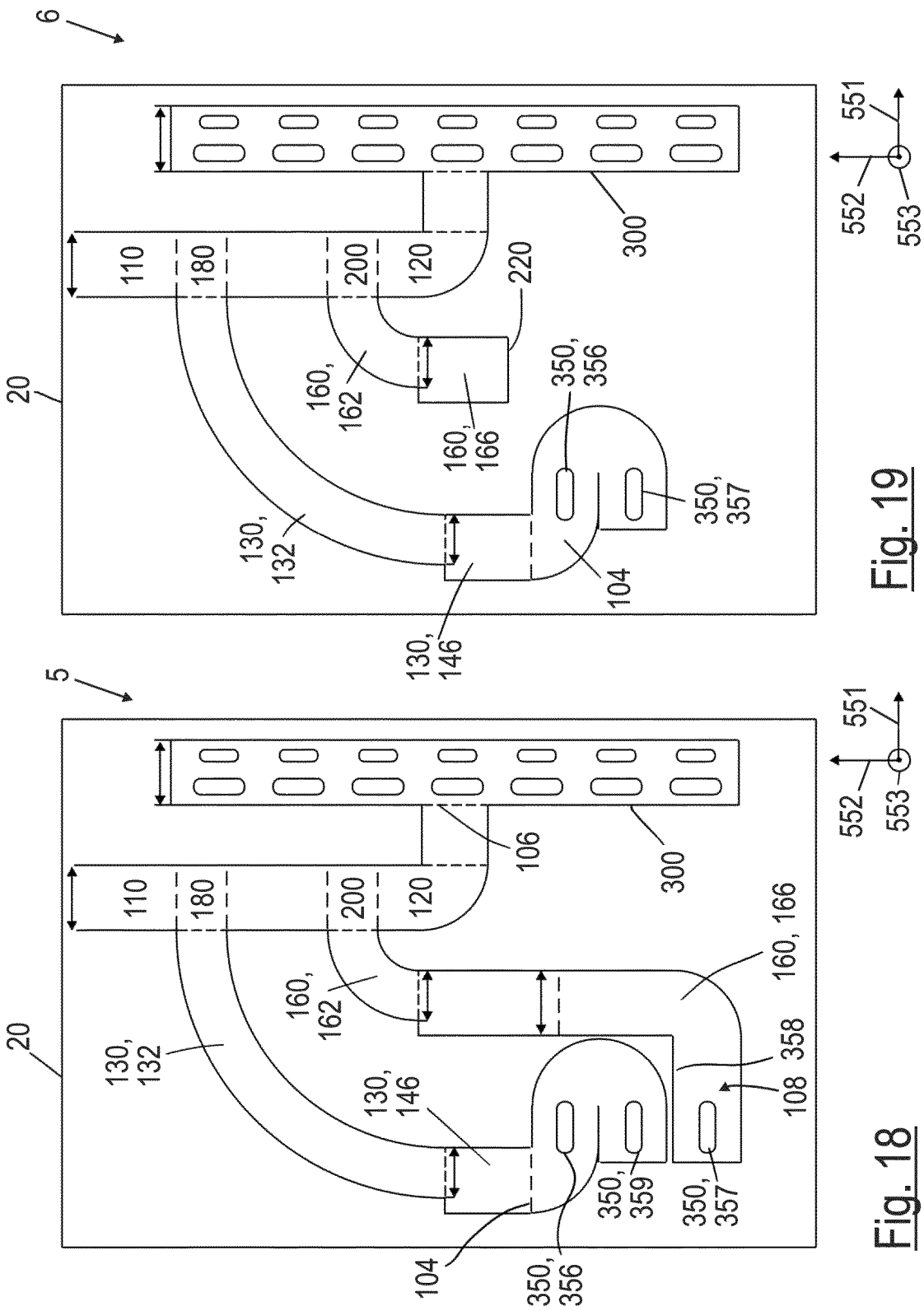
FIG. 18 is an illustration of a detailed view of a fifth antenna system according to the present disclosure.
FIG. 19 is an illustration of a detailed view of a sixth antenna system according to the present disclosure.

FIG. 18 shows a detailed view of a fifth antenna system 5 according to the present disclosure. As far as no differences are disclosed, the fifth antenna system 5 is configured as it is disclosed for the third antenna system 3 and vice versa.

With the fifth antenna system 5, the first antenna element 356 and the second antenna element 357 of the second antenna 350 are configured as longitudinally fed antenna elements. They are orientated parallel to the propagation path of the feed sections 146, 166.

Furthermore, the second antenna 350 of the fifth antenna system 5 comprises a third antenna element 359, which is configured as an additional opening, namely a longitudinal slot, within the feed section 146. The third antenna element 359 is also longitudinally fed.

The third antenna element 359 and the first antenna element 356 are serially coupled to the feed section 146. The feed section 146 comprises an end segment at the port 104 that is shaped as a meander and that couples to the first antenna element 356 and to the third antenna element 359. The first antenna element 356 and the third antenna element 359 have a distance along the longitudinal path of the feed section 146 that equals half the wavelength of the electromagnetic energy at the second frequency 259.

The first antenna element 356, the second antenna element 357 and the third antenna element 359 are aligned with respect to each other in the first transverse direction 551. Furthermore, they have equal distances with respect to each other along the second transverse direction 552.

With other embodiments of the fifth antenna system 5, the second antenna 350 may comprise additional antenna elements that are serially coupled to the feed section 146. All the antenna elements coupled to the feed section 146 may be spaced along the propagation path by half the wavelength of the electromagnetic energy at the second frequency 259. Additionally or alternatively, more than the second antenna element 357 may be serially coupled to the further feed section 166.

The parts of the fifth antenna system 5 shown in FIG. 18 form an antenna subsystem of the fifth antenna system 5. Like with the other antenna systems according to the present disclosure, also the fifth antenna system 5 comprises several of these antenna subsystems that are placed next to each other on the antenna board 20 in the same way as it is shown in FIG. 13 for the antenna subsystems of the first antenna system 1. With the radar system 70 comprising the fifth antenna system 5, the coupling sections 102 of the individual antenna subsystems are then coupled to separate circuit ports 61, 62, 63, 64 of the radar circuit 60 of the radar system 70.

FIG. 19 depicts a detailed view of a sixth antenna system 6 according to the present disclosure. As far as no differences are disclosed, the sixth antenna system 6 is configured as it is disclosed for the fifth antenna system 5 and vice versa.

With the sixth antenna system 6, the second antenna 350 comprises a first and second antenna element 556, 557, both of which are longitudinally fed and serially coupled to the feed section 146. The further feed section 166 couples the additional branching section 200 to a termination 220. The termination 220 creates a standing wave of the electromagnetic energy within the additional coupling section 160. It thereby isolates the first antenna 300 from the guiding section 110 at the second frequency 259 without feeding an antenna of the sixth antenna system 6. The termination is exemplarily configured as a standing wave termination. In the embodiment shown, the standing wave termination is configured as a short-circuited end of the further feed section 166.

In general, all antenna systems 1, 2, 3, 4, 5, 6 according to the present disclosure may comprise such a termination 220 coupled to one of the branching sections 130, 160, such as coupled to the additional branching section 160.

The parts of the sixth antenna system 6 shown in FIG. 19 form an antenna subsystem of the sixth antenna system 6. Like with the other antenna systems according to the present disclosure, also the sixth antenna system 6 comprises several of these antenna subsystems that are placed next to each other on the antenna board 20 in the same way as it is shown in FIG. 13 for the antenna subsystems of the first antenna system 1. With the radar system 70 comprising the sixth antenna system 6, the coupling sections 102 of the individual antenna subsystems are then coupled to separate circuit ports 61, 62, 63, 64 of the radar circuit 60 of the radar system 70.

A first antenna gain of the sixths antenna system 6 at the first frequency 258 is dominated by the antenna field of the first antenna 300 that has a main antenna lobe with a first width in a cut plane perpendicular to the first transverse direction 551. A second antenna gain at the second frequency 259 is dominated by the antenna field of the second antenna 350 that has a main antenna lobe with a second width in the cut plane perpendicular to the first transverse direction 551. The second width thereby is larger than the first width. Furthermore, the second antenna gain and the antenna field of the second antenna 350 are symmetric with respect to the boresight direction in the cut plane perpendicular to the first transverse direction 551, which boresight direction corresponds to an angle of 0°. The first width amounts to an angular range or field of view of angles between −9° and 9°. The second width exemplarily extends between −50° and 50°. Generally, the second width may have a lower bound that is between −80° and −10°, such as between −60° and −20°. The second width generally may have an upper bound that is between 10° and 80°, such as between 20° and 60°.

Figure 20:
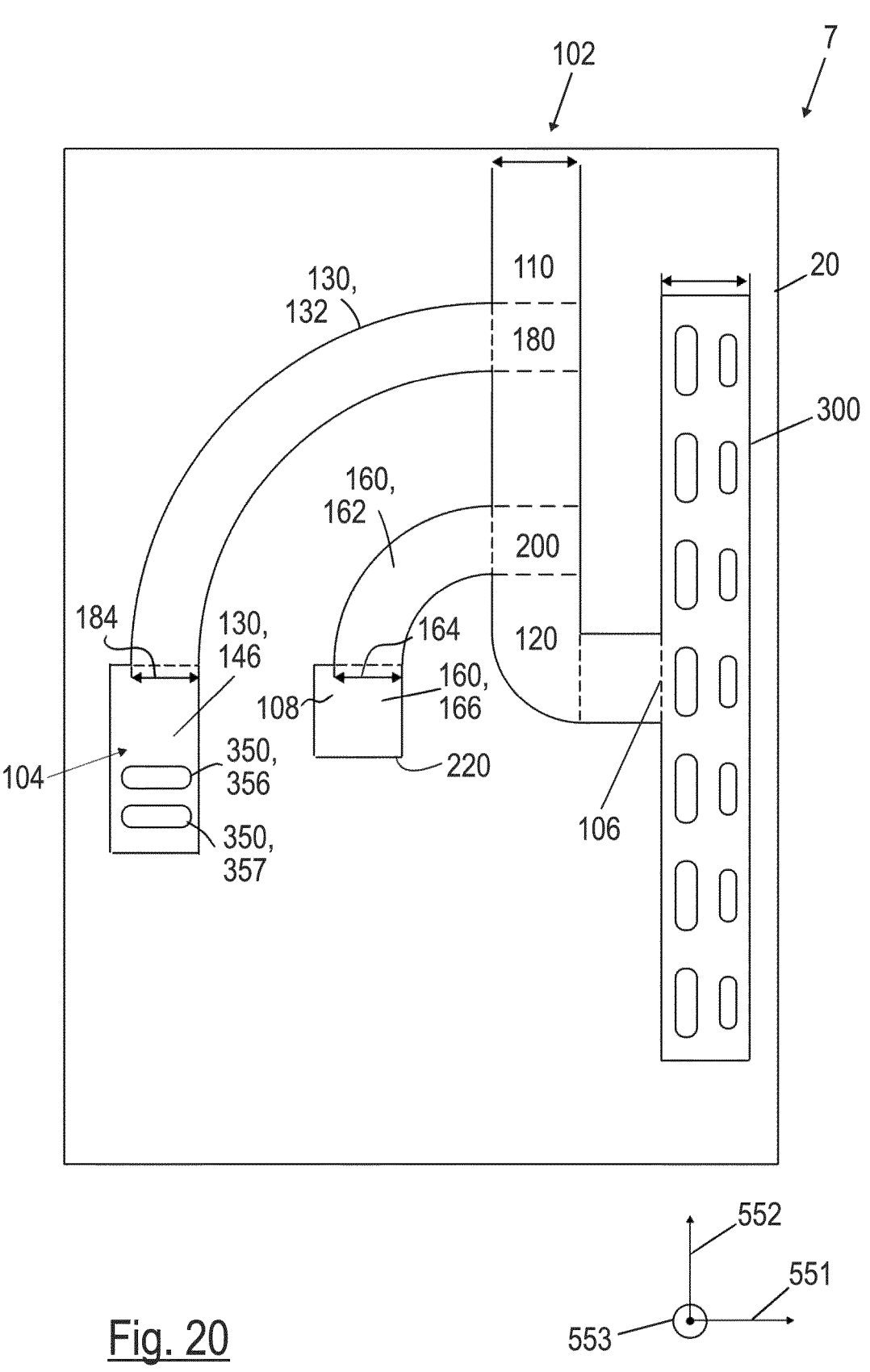
FIG. 20 is an illustration of a detailed view of a seventh antenna system according to the present disclosure.

FIG. 20 depicts a detailed view of a seventh antenna system 7 according to the present disclosure. As far as no differences are disclosed, the seventh antenna system 7 is configured as it is disclosed for the sixth antenna system 6 and vice versa.

The feed section 146 of the seventh antenna system 7 is coupled to the second antenna 350, which comprises the first antenna element 356 and the second antenna element 357. The first and second antenna element 356, 357 are serially coupled to the feed section 146 at the port 104. Both the first antenna element 356 and the second antenna element 357 are configured as transversely fed antenna elements. They are configured as longitudinal openings within the feed section 146 at the port 104. The first and second antenna element 356, 357 are oriented parallel to the first transverse direction 551. They are centered with respect to each other in the first transverse direction 551. The further feed section 166 is coupled to a termination 220.

A bandwidth of the fourth antenna system 4 at the feed port 102 amounts to more than 6 GHz and encompasses a frequency range between 76 GHz and 81 GHz.

A distance between the first antenna element 356 and the second antenna element 357 of the second antenna 350 is adapted to orientate a direction of a main antenna lobe of the second antenna 350 in a predetermined direction, such as the boresight direction 553 or deviating from the boresight direction 553.

Figure 21:
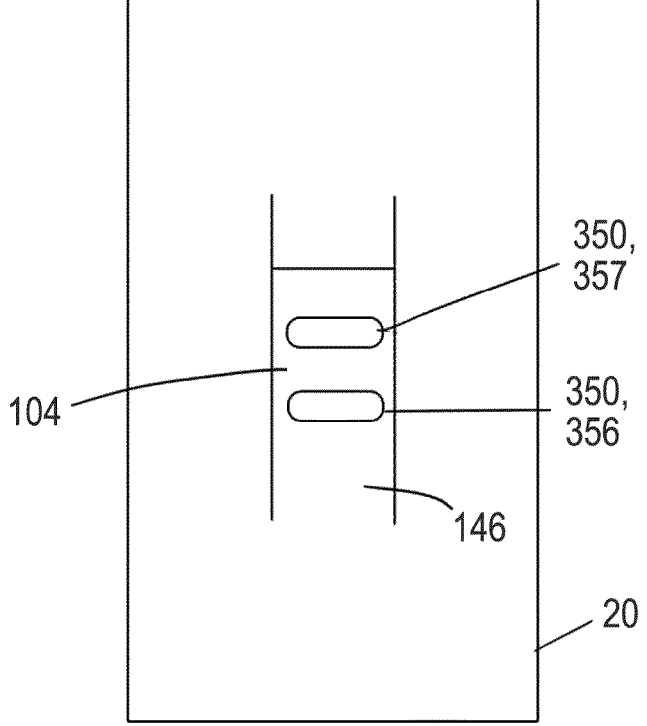
FIG. 21 is an illustration of a detailed view of a second antenna of the seventh antenna system.

FIG. 21 shows a detailed view of a configuration of the first and second antenna element 356, 357 of the second antenna 350, for which the predetermined direction is tilted with respect to the boresight direction 553. Exemplarily, the predetermined direction is tilted along the second transverse direction 552 and around the first transverse direction 551.

The distance between the first antenna element 356 and the second antenna element 357 amounts to at least 0.5 times, such as at least 0.6 times, at least 0.8 times or at least one time the wavelength of the electromagnetic energy at the second frequency 259. For example, the distance may equal 0.6 times, 0.8 times or 1 time the wavelength of the electromagnetic energy at the second frequency 259.

An antenna field of the second antenna 350 shown in FIG. 21 has two main antenna lobes. Each antenna lobe has a direction that is tilted with respect to boresight direction 553 along the second transverse direction 552 and around the first transverse direction 551.

Figure 22:
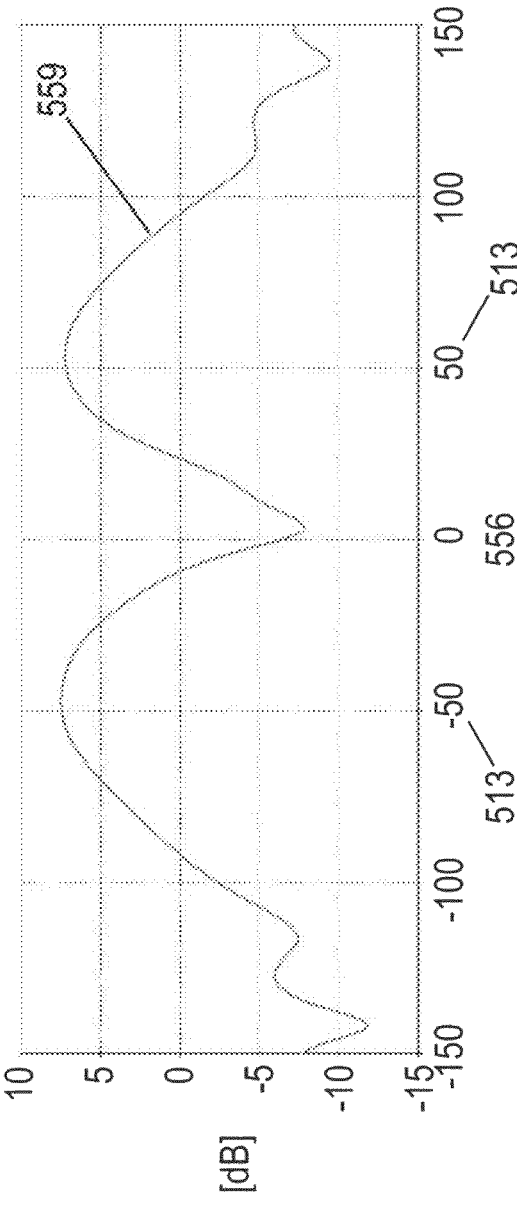
FIG. 22 is an illustration of an antenna gain of the second antenna shown in FIG. 21 along a second transverse direction at a second frequency.

FIG. 22 shows the antenna gain 559 of the second antenna 350 at the second frequency 259 as a function of the second angle 556 around the first transverse direction 551 in a cut plane that is orientated perpendicular to the first transverse direction 551. Maxima of the antenna gain 558 are located at the directions 513 that amount to +50°. These directions 513 correspond to the directions of the antenna lobes of the antenna field of the second antenna 350.

A reflection of the second antenna 350 is minimized for the second frequency 259.

FIG. 23 shows a detailed view of another embodiment of the second antenna 350 of the seventh antenna system 7. As far as no differences are disclosed, this embodiment of the second antenna 350 is configured as it is disclosed for the embodiment shown in FIG. 21 and vice versa.

The distance between the first and second antenna element 356, 357 shown in FIG. 23 is smaller than the distance between the first and second antenna element 356, 357 shown in FIG. 21. It exemplarily amounts to less than one half, such as at most 0.4 times, at most 0.2 times or at most 0.1 times the wavelength of the electromagnetic energy at the second frequency 259. The distance is adapted to orientate the direction 513 of the main antenna lobe of the antenna field of the second antenna 350 parallel to the boresight direction 553. With other embodiments, the distance may also equal the wavelength of the electromagnetic energy at the second frequency 259.

The antenna field of the second antenna 350 shown in FIG. 23 has a single main lobe that has a direction that is orientated parallel to the boresight direction 553.

Figure 24:
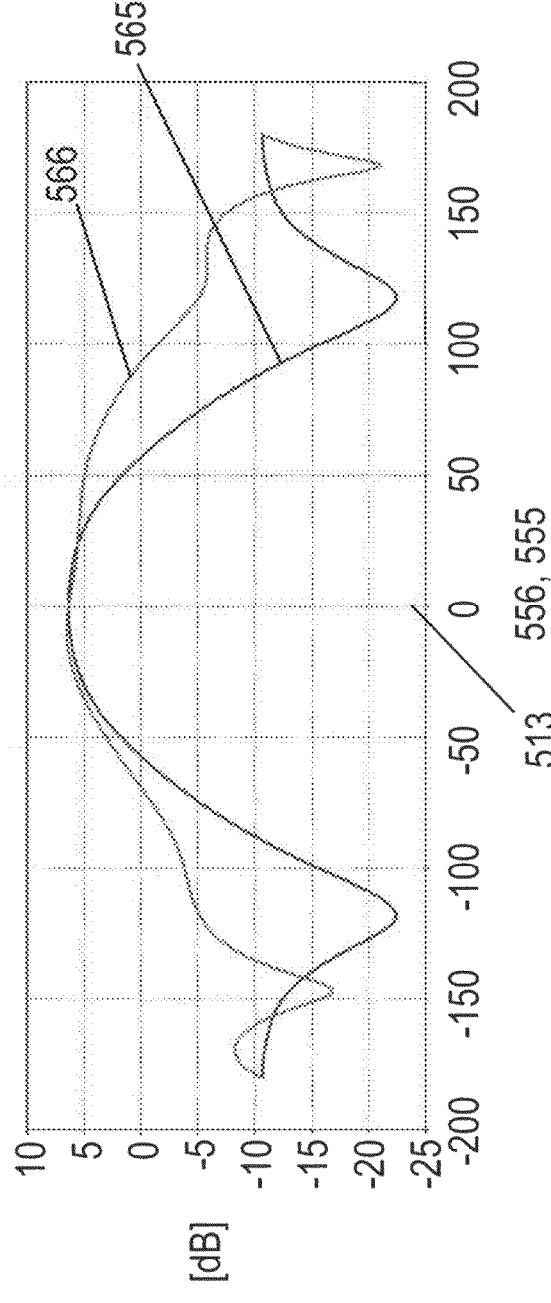
FIG. 24 is an illustration of an antenna gain of the second antenna shown in FIG. 23.

FIG. 24 shows an antenna gain 565 of the second antenna 350 shown in FIG. 23 along the first transverse direction 551 as a function of the rotation by the first angle 555 and an antenna gain 566 of the second antenna 350 shown in FIG. 23 along the second transverse direction 552 as a function of a rotation by the second angle 556. Both antenna gains 565, 566 have their maximum at first and second angles 555, 556 of 0°, which corresponds to the direction of the main antenna lobe. The first and second gain 565, 566 each are essentially symmetric with respect to the angles 555, 556.

The parts of the seventh antenna system 7 shown in FIG. 20 form an antenna subsystem of the seventh antenna system 7. Like with the other antenna systems according to the present disclosure, also the seventh antenna system 7 comprises several of these antenna subsystems that are placed next to each other on the antenna board 20 in the same way as it is shown in FIG. 13 for the antenna subsystems of the first antenna system 1. With the radar system 70 comprising the seventh antenna system 7, the coupling sections 102 of the individual antenna subsystems are then coupled to separate circuit ports 61, 62, 63, 64 of the radar circuit 60 of the radar system 70.

Figure 25:
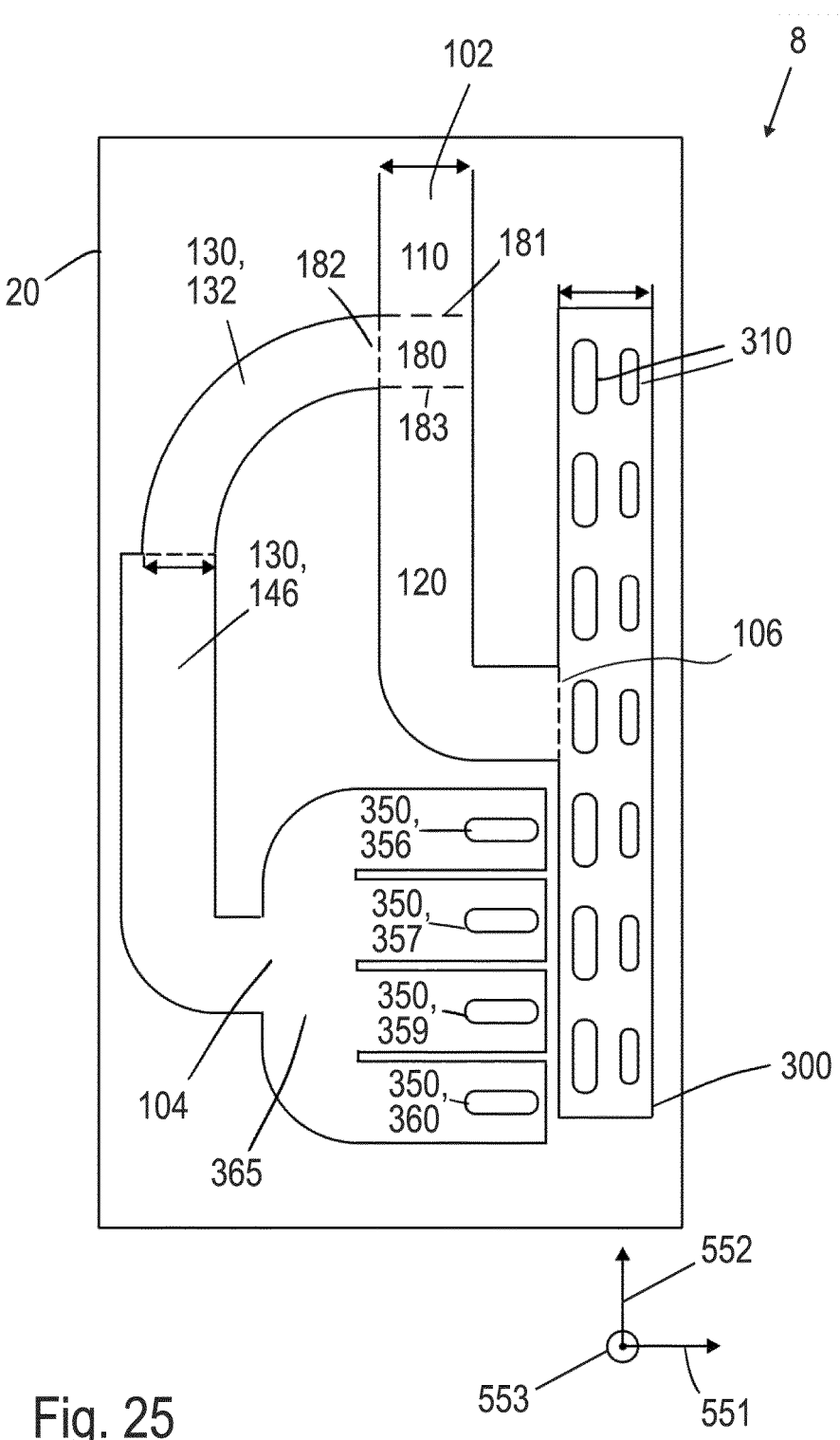
FIG. 25 is an illustration of a detailed view of an eighth antenna system according to the present disclosure.

FIG. 25 shows a detailed view of an eighth antenna system 8 according to the present disclosure. As far as no differences are disclosed, the eighth antenna system 8 is configured as it is disclosed for the first antenna system 1 and vice versa.

The eighth antenna system 8 does not feature the additional branching section 200 and the additional feed section 120 is directly coupled to the third end 183 of the branching section 180. The feed section 146 is coupled via the port 104 to a power divider 365 that couples the port 104 to a first antenna element 356, a second antenna element 357, a third antenna element 359 and a fourth antenna element 360 of the second antenna 350.

The antenna elements 356, 357, 359, 360 are configured as longitudinally fed antenna elements. They are centered with respect to each other along the first transverse direction 551. The antenna elements 356, 357, 359, 360 are coupled in parallel to the port 104 via the power divider 365.

A reflection of the second antenna 350 shown in FIG. 25 at the port 104 into the feed section 146 has a minimum at the second frequency 259 and a bandwidth 320 of more than 2.5 GHz, namely 2.8 GHz.

With the second antenna 350 of the eighth antenna system 8 shown in FIG. 25, the antenna elements 356, 357, 359, 360 have equal distances along the second transverse direction 552. The distances are adapted to direct a main antenna lobe of the antenna field of the second antenna 350 parallel to the boresight direction 553 of the antenna board 20. The distances exemplarily amount to half the wavelength of the electromagnetic energy at the second frequency 259.

Figure 26:
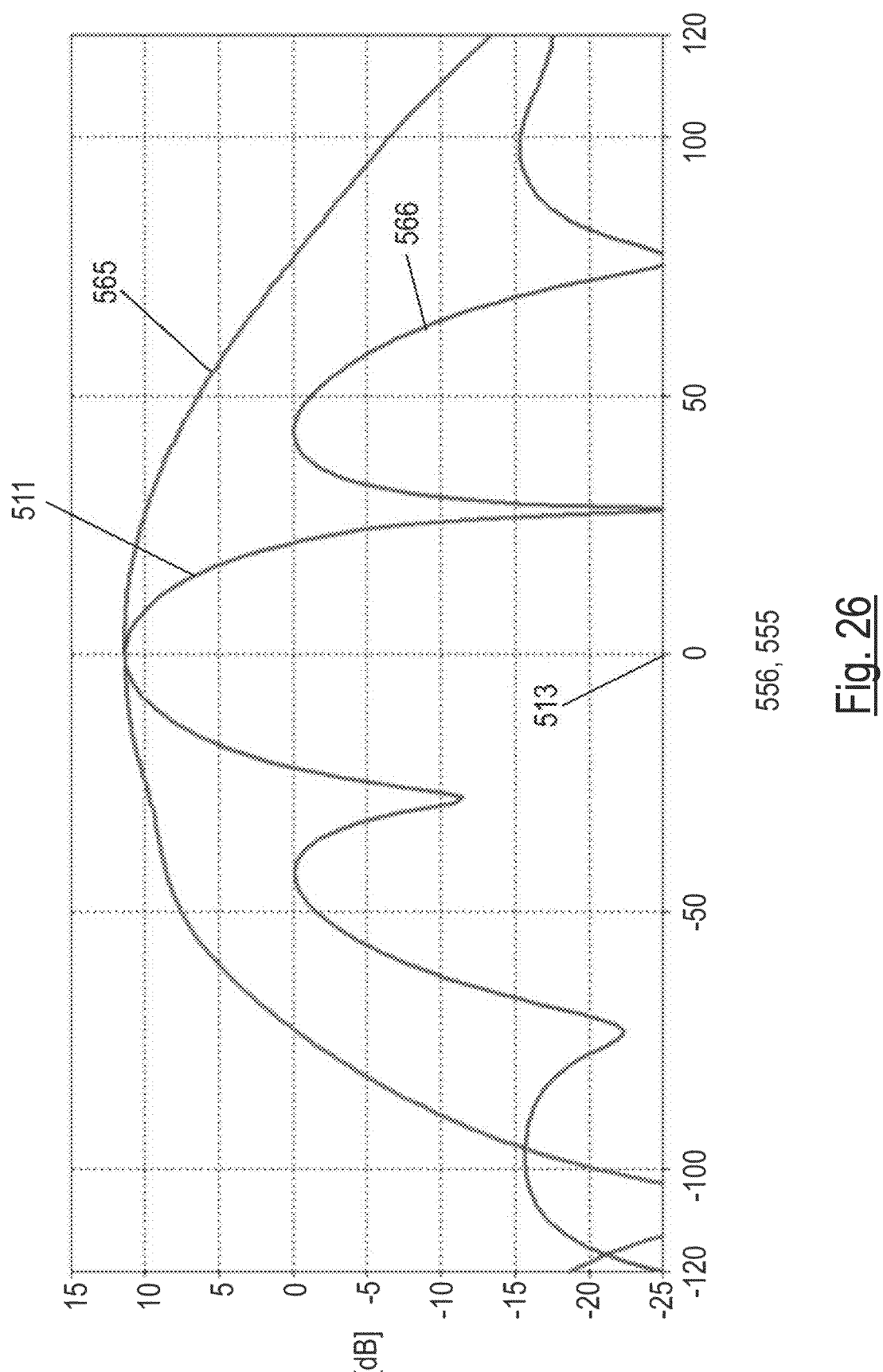
FIG. 26 is an illustration of an antenna gain of the second antenna of the eighth antenna system.

FIG. 26 shows an antenna gain 565 of the second antenna 350 shown in FIG. 25 along the first transverse direction 551 and an antenna gain 566 of the second antenna 350 shown in FIG. 25 along the second transverse direction 552. The antenna gain 565 along the first transverse direction 551 is depicted as a function of the first angle 555 that specifies a rotation about the second transverse direction 552 and the antenna gain 566 along the second transverse direction 552 is depicted as a function of the second angle 556 that specifies a rotation about the first transverse direction 551.

The main antenna lobe 511 of the second antenna 350 is symmetric with respect to the boresight direction 553 at a second angle 556 of 0° and the direction of the main antenna lobe 511 also equals the boresight direction 553. The gain of the second antenna 350 at the second frequency 259 is larger than 10 dB, namely 11 dB.

The parts of the eighth antenna system 8 shown in FIG. 25 form an antenna subsystem of the eighth antenna system 8. Like with the other antenna systems according to the present disclosure, also the eighth antenna system 8 comprises several of these antenna subsystems that are placed next to each other on the antenna board 20 in the same way as it is shown in FIG. 13 for the antenna subsystems of the first antenna system 1. With the radar system 70 comprising the eighth antenna system 8, the coupling sections 102 of the individual antenna subsystems are then coupled to separate circuit ports 61, 62, 63, 64 of the radar circuit 60 of the radar system 70.

Figure 27:
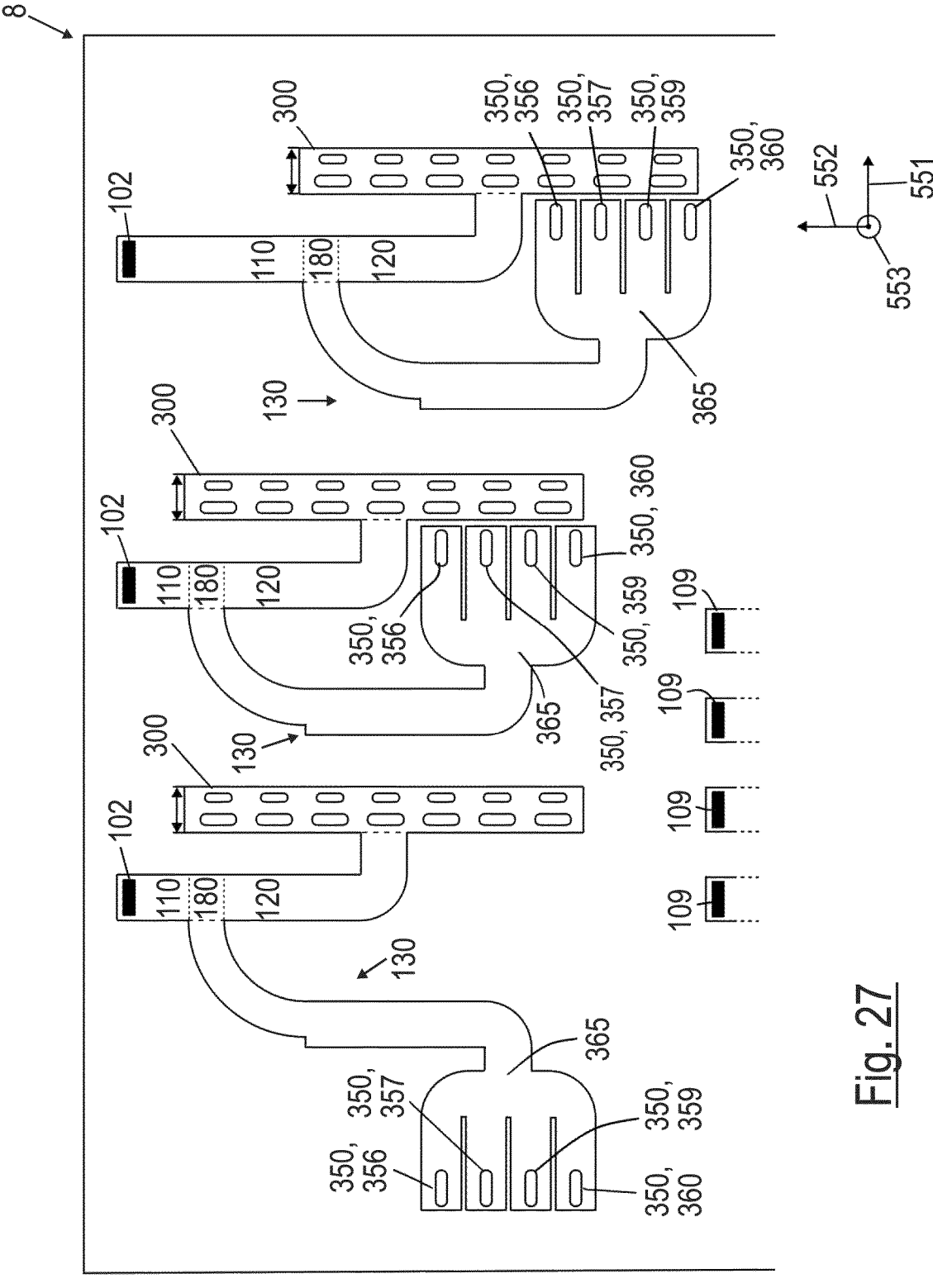
FIG. 27 is an illustration of another detailed view of the eighth antenna system.

FIG. 27 shows another detailed view of the eighth antenna system 8 with three of the antenna subsystems placed next to each other on the antenna board 20. Each individual subsystem is coupled to a separate feed port 102 of the eighth antenna system 8. The feed ports 102 are configured to be coupled to an integrated radar circuit and are located centered to each other along the second transverse direction 552 and equally spaced along the first transverse direction 551.

The individual ports 102 that are coupled to the antenna subsystem shown in FIG. 27 are configured to connect to transmission ports of the radar circuit. Therefore, the first and second antennas 300, 350 are configured to act as transmission antennas of the eighth antenna system 8.

The eighth antenna system 8 further comprises four further feed ports 109. They are equally spaced along the first transverse direction 551 and centered with respect to each other along the second transverse direction 552. The further feed ports 109 are configured to connect to individual circuit ports of the radar circuit. Thereby, the further feed ports 109 are configured to connect to receive ports of the radar circuit.

Each individual further feed port 109 is connected to a separate antenna subsystem and the individual antenna subsystems are placed next to each other on the antenna board 20. Thereby, each individual further feed port 109 is exemplarily connected to the antenna subsystem of the first antenna system 1, which antenna subsystem is shown in FIG. 8. The arrangement of the antenna subsystems thereby equals the arrangement shown in FIG. 13 for the first antenna system 1 according to the present disclosure. Therefore, the detailed view of the antenna board 20 shown in FIG. 13 is also a detailed view of the eighth antenna system 8 according to the present disclosure and shows the antenna subsystems coupled to the receive ports 109 of the radar circuit 60.

Figure 28:
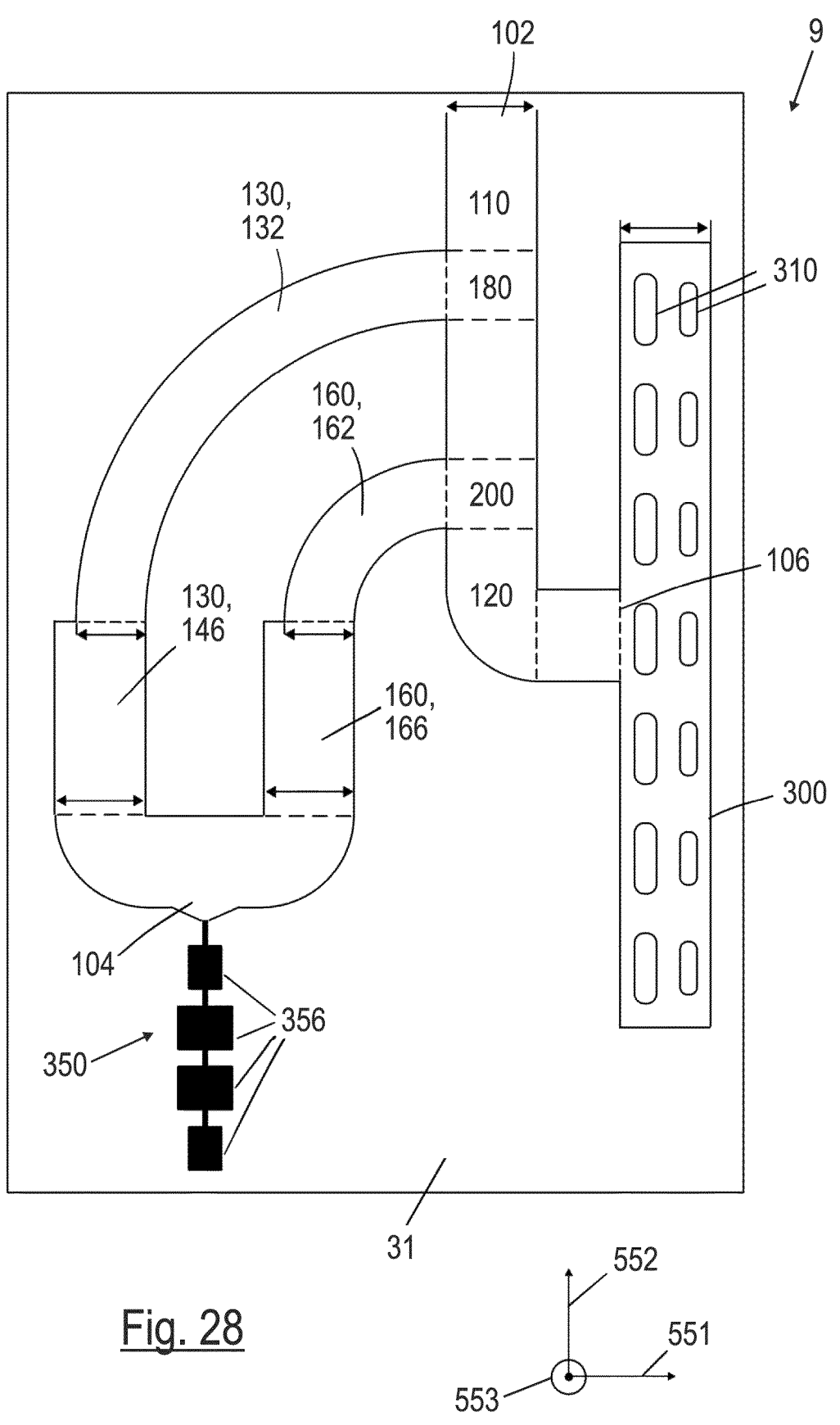
FIG. 28 is an illustration of a detailed view of a ninth antenna system according to the present disclosure.

FIG. 28 shows a detailed view of a ninth antenna system 9 according to the present disclosure. As far as no differences are disclosed, the ninth antenna system 9 is configured as it is disclosed for the first antenna system 1 and vice versa.

With the ninth antenna system 9, the second antenna 350 is coupled via the port 104 to both the coupling section 130 and the additional coupling section 160. The second antenna 350 is a substrate integrated antenna and is configured as a patch array antenna. It is elongated along the second transverse direction 552. The individual antenna elements 356 of the second antenna 350 are configured as conducting patches located on the top plate 31 of the antenna board 20 and are serially connected to the port 104. The individual patches are designed to direct a direction of the main antenna lobe of the antenna field of the second antenna 350 to negative second angles 556. The second antenna 350 is therefore adapted to illuminate target objects towards a bottom from the ninth antenna system 9 when orientating the second transverse direction 552 parallel to the elevation direction on a vehicle.

The second antenna 350 is designed for operation at a center frequency that equals the second frequency 259. The second antenna 350 has a limited bandwidth that allows it to operate in isolation from the first antenna 300.

The parts of the ninth antenna system 9 shown in FIG. 28 form an antenna subsystem of the ninth antenna system 9. Like with the other antenna systems according to the present disclosure, also the ninth antenna system 9 comprises several of these antenna subsystems that are placed next to each other on the antenna board 20 in the same way as it is shown in FIG. 13 for the antenna subsystems of the first antenna system 1. With the radar system 70 comprising the ninth antenna system 9, the coupling sections 102 of the individual antenna subsystems are then coupled to separate circuit ports 61, 62, 63, 64 of the radar circuit 60 of the radar system 70.

Figure 29:
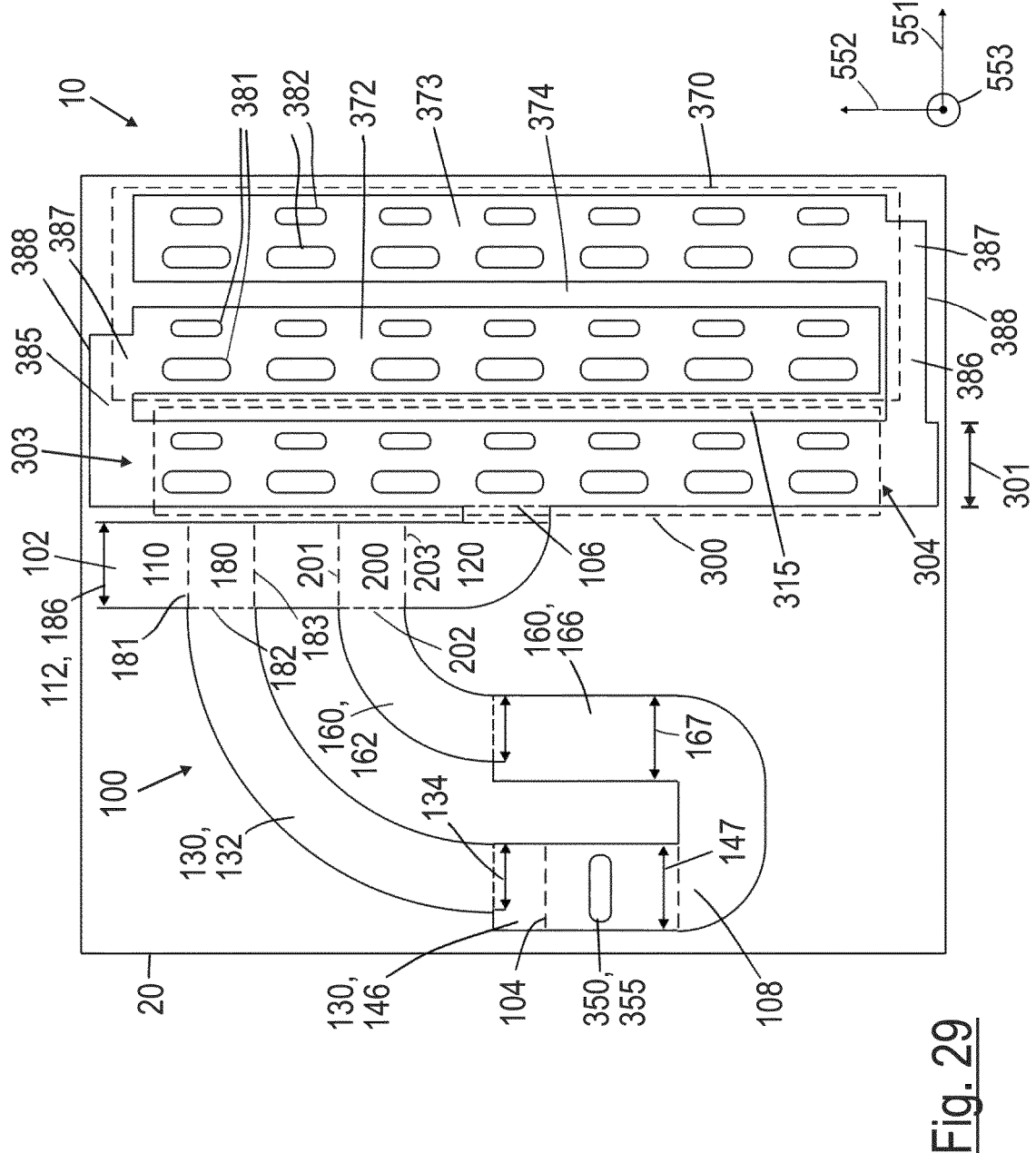
FIG. 29 is an illustration of a detailed view of a first variant of a tenth antenna system according to the present disclosure.

FIG. 29 shows a detailed view of a tenth antenna system 10 according to present disclosure. As far as no differences are disclosed, the tenth antenna system 10 is configured as it is disclosed for the first antenna system 1 and vice versa.

The tenth antenna system 10 comprises a third antenna 370. The third antenna 370 is configured as a waveguide antenna, exemplarily as a substrate integrated waveguide antenna. The third antenna 370 is configured as a slotted waveguide antenna. Furthermore, the third antenna 370 is a horn antenna. It is located directly adjacent to the first antenna 300 on the opposite side as the guiding section 110 on the antenna board 20. It is elongated along the second transverse direction 552.

The third antenna 370 comprises a first segment 372 and a second segment 373. The segments 372, 373 are elongated along the second transverse direction 552 and placed parallel and directly adjacent to each other along the first transverse direction 551. They share a common sidewall 374 that runs parallel to the second transverse direction 552. The common sidewall 374 forms a lateral boundary structure of the first segment 372 and a lateral boundary structure of the second segment 373. The first segment 372 comprises first antenna elements 381 of the third antenna 370 and the second segment 373 comprises second antenna elements 382 of the third antenna 370.

The common sidewall 374 may comprise a single boundary structure, such as a single boundary element or a single line of boundary elements, such as a single line of conductive cylinders. The single boundary structure may form a boundary structure of both the first segment 372 and the second segment 373.

The third antenna 370 is coupled to the guiding section 110 via the first antenna 300. The first segment 372 is coupled to a first end 303 of the first antenna 300 along the second transverse direction 552 and the second segment 373 is coupled to a second end 304 of the first antenna 300 along the second transverse direction 552. The first end 303 and the second end 304 are located at opposite sides of the first antenna 300. A further filter section 385 is coupled between the first end 303 of the first antenna 300 and the first segment 372 of the third antenna 370 and an additional further filter section 386 is coupled between the second end 304 of the first antenna 300 and the second segment 373.

The filter sections 385, 386 are configured as inline stepped impedance filters that are implemented in waveguide routing lines of the transmission line network 110. Exemplarily, the waveguide routing lines are configured as substrate integrated waveguide routing lines. As far as no differences are disclosed, the filter sections 385, 386 coupled to the first antenna 300 are configured as it is disclosed for the filter section 132 and the additional filter section 162 that are coupled to the second ends 182, 202 of the branching sections 180, 200 and vice versa. The filter sections 385, 386 each have a lateral iris wall 388 that reduces the transverse width of the filter sections 385, 386 compared to the lateral width 301 of the first antenna 300 and/or the lateral with 112 of the guiding section 110. The filter sections 385, 386 each have a bent section 387 and the lateral iris walls 388 are exemplarily located within the bent sections 387, such as at the radially outer side of the bent sections 387.

The third antenna 370 is configured to transduce electromagnetic energy within a third frequency band 252, which is depicted in FIG. 7 and which forms a sub band of the first frequency band 245. The third frequency band 252 comprises a lower bound and an upper bound that is equal to the upper bound of the first frequency band 245. The lower bound amounts to 77.75 GHz and the upper bound amounts to 78 GHz.

The filter sections 385, 386 are configured to pass electromagnetic energy within the third frequency band 252 and to block electromagnetic energy within a reduced first frequency band 250, which is also depicted in FIG. 7. The reduced first frequency band 250 has a lower bound that equals the lower bound of the first frequency band 245 and an upper bound that is smaller than the lower bound of the third frequency band 252 and that is separated from the lower bound of the third frequency band 252 by a frequency gap. The lower bound of the reduced first frequency band 250 amounts to 76 GHz and the upper bound of the reduced first frequency band 250 amounts to 76.75 GHz. The frequency gap amounts to 0.75 GHz.

Since the first antenna 300 is configured to transduce within the entire first frequency band 245, both the first antenna 300 and the third antenna 370 transduce at an operating frequency within the third frequency band 252. At an operating frequency within the reduced first frequency band 250, only the first antenna 300 but not the third antenna 370 transduces since the filter sections 385, 386 block the electromagnetic energy within the reduced first frequency band 250.

The first antenna 300 and the third antenna 370 have a common antenna field when operating within the third frequency band 252, whereby the common antenna field has a main antenna lobe with a direction that is tilted with respect to the boresight direction 553 of the antenna board 20. Thereby, the direction of the main antenna lobe is tilted along the first transverse direction 551 and around the second transverse direction 552. A tilting angle is between 40° and 80°, such as between 50° and 70°. For example, the tilting angle amounts to 60°. This allows to place the antenna board 20 at a corner of a vehicle and to direct the antenna field towards a longitudinal center axis of the vehicle parallel to the boresight direction 553.

The present disclosure is also directed at a placement of the tenth antenna system 10 off the longitudinal center axis of the vehicle, such as at a corner of the vehicle. In some embodiments, an additional tenth antenna system 10 is located at the opposite position with respect to the longitudinal center axis of the vehicle, for example at an opposite corner of the vehicle. This additional tenth antenna system 10 is rotated by 180° with respect to the tenth antenna system 10 located at the opposite position so that both tenth antenna systems 10 have an antenna field within the third frequency band 252 that is directed towards the longitudinal center axis of the vehicle.

A radar system that comprises the tenth antenna system 10 comprises a radar circuit having a circuit board that is connected to the feed port 102 of the tenth antenna system 10. The radar circuit is operated in a first mode, in which it operates at frequencies within the reduced first frequency band 250. In this first mode, only the first antenna 300 transduces electromagnetic energy. In a second mode, the radar circuit operates at frequencies within the second frequency band 251 so that only the second antenna 350 transduces electromagnetic energy. In a third mode, the radar circuit operates in the third frequency band 252, in which both the first antenna 300 and the third antenna 370 transduce electromagnetic energy.

The parts of the tenth antenna system 10 shown in FIG. 29 form an antenna subsystem of the tenth antenna system 10. Like with the other antenna systems according to the present disclosure, also the tenth antenna system 10 comprises several of these antenna subsystems that are placed next to each other on the antenna board 20 in the same way as it is shown in FIG. 13 for the antenna subsystems of the first antenna system 1. With the radar system 70 comprising the tenth antenna system 10, the coupling sections 102 of the individual antenna subsystems are then coupled to separate circuit ports 61, 62, 63, 64 of the radar circuit 60 of the radar system 70.

Figure 30:
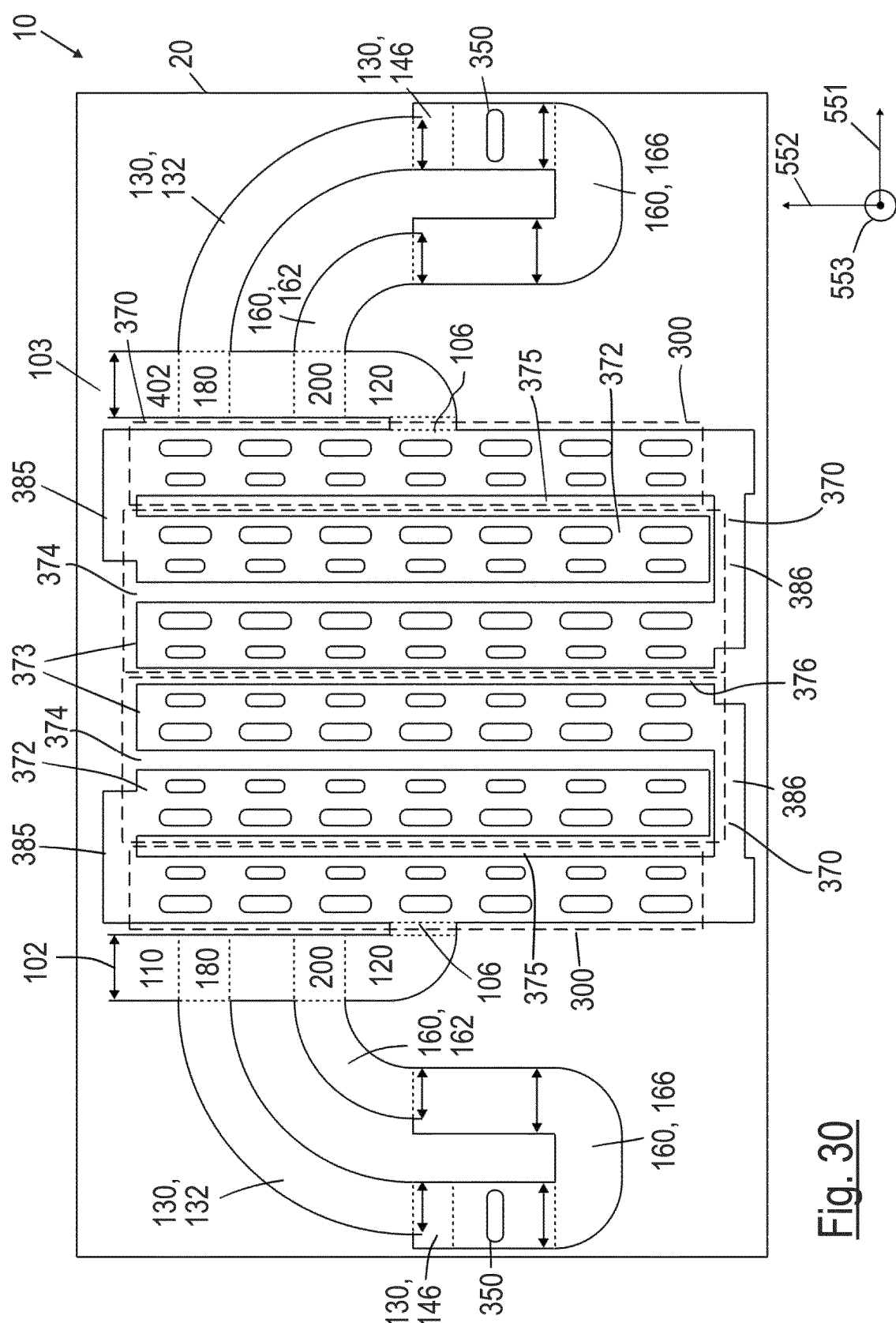
FIG. 30 is an illustration of a further detailed view of the tenth antenna system according to the present disclosure.

FIG. 30 shows a further detailed view of an embodiment of the tenth antenna system 10 according to the present disclosure. As can be seen from this Figure, the tenth antenna system 10 comprises an additional antenna subsystem that is placed next to the antenna subsystem shown in FIG. 29. As far as no differences are disclosed, the additional antenna subsystem is configured as it is disclosed for the antenna subsystem shown in FIG. 29 and vice versa. The antenna subsystems are placed next to each other on the antenna board 20. They thereby are placed directly adjacent to each other so that they share a common sidewall 376 parallel to the second transverse direction 552. The two antenna subsystems are mirrored with respect to each other parallel to the second transverse direction 552.

The respective third antennas 370 of the antenna subsystems are located next to each other. Therefore, the common sidewall 376 forms a common sidewall of the second segments 373 of both third antennas 370.

The common sidewall 376 may comprise a single boundary structure, such as a single boundary element or a single line of boundary elements, such as a single line of conductive cylinders. The single boundary structure may form a boundary structure of both second segments 373 of the third antennas 370 of the neighboring antenna subsystems.

Each third antenna 370 has a first sidewall 375 and a second sidewall that is formed by the common sidewall 376. The respective first sidewalls 375 are located next to the first antenna 300 of the respective antenna subsystem and form a common sidewall between the first antenna 300 and the third antenna 370 of the respective antenna subsystem. The second sidewalls 376 each are located next to the third antenna 370 of the respective adjacent antenna subsystem so that they form the common sidewall in between the third antennas 370.

The common sidewalls 375 may comprise a single boundary structure, such as a single boundary element or a single line of boundary elements, such as a single line of conductive cylinders. The single boundary structure may form a boundary structure of both the respective first antenna 300 and the respective third antenna 370 of the individual antenna subsystems.

One of the antenna subsystems has the guiding section 110 that is coupled to the feed port 102 and the other one of the antenna subsystems has an additional guiding section 402 that is coupled to an additional feed port 103. The two feet ports 102, 103 connect to separate circuit ports of a radar circuit coupled to the tenth antenna system 10.

The radar system simultaneously operates both feed ports 102, 103 at frequencies within the third frequency band 252. It thereby coherently transduces electromagnetic energy via the first and third antennas 300, 370 of both radar antenna subsystems. The first and third antennas 300, 370 of neighboring radar antenna subsystems therefore form a single common antenna that is fed via two separate feed ports 102, 103 and via two separate circuit ports of the radar circuit. When transmitting via the first and third antenna 300, 370, the radar circuit transduces radar signals that have the same frequency and also the same coding, such as the same phase coding, via both ports 102, 103.

With other embodiments of the tenth antenna system 10 shown in FIGS. 29 and 30, the first segment 372 and the second segment 373 of the antenna 370 may also act as individual antennas that are configured to transduce electromagnetic radiation independently from each other.

With one embodiment, the first antenna segment 372 may be configured as a first additional antenna and the second antenna segment 373 may be configured as a second additional antenna. The tenth antenna system 10 then may be configured to transduce electromagnetic energy within a frequency band only via the first antenna 300 and to block the electromagnetic energy within said frequency band from being transduced via the first and second additional antenna. Electromagnetic energy within a first additional frequency band may only be transduced via the first additional antenna exemplarily formed by the first antenna segment 372 and be blocked from being transduced via the first antenna 300 and the second additional antenna exemplarily formed by the second antenna segment 373. Electromagnetic energy within a second additional frequency band may only be transduced via the second additional antenna and be blocked from being transduced via the first antenna 300 and the first additional antenna.

A radar circuit connected to the feed port 102 then may be configured to activate the first antenna 300 by transducing within the frequency band, to activate the first additional antenna that is exemplarily formed by the first segment 372 by transducing within the first additional frequency band and to activate the second additional antenna that is exemplarily formed by the second segment 373 by transducing within the second additional frequency band.

With another embodiment, the tenth antenna system 10 may be configured to transduce electromagnetic energy within the frequency band only via the first antenna 300 and to block the electromagnetic energy within said frequency band from being transduced via the first and second additional antenna. Electromagnetic energy within the first additional frequency band may be transduced via both the first antenna 300 and the first additional antenna and be blocked from being transduced via the second additional antenna. Electromagnetic energy within the second additional frequency band may be transduced via the first antenna 300, the first additional antenna and the second additional antenna.

A radar circuit connected to the feed port 102 then may be configured to activate the first antenna 300 by transducing within the frequency band, to activate the first antenna 300 and the first additional antenna that is exemplarily formed by the first segment 372 by transducing within the first additional frequency band and to activate the first antenna 300, the first additional antenna and the second additional antenna that is exemplarily formed by the second segment 373 by transducing within the second additional frequency band.

In general, the radar circuit may be configured to only activate the first antenna 300 by transducing within the frequency band, to activate at least the first additional antenna by transducing within the first additional frequency band and to activate at least the second additional antenna by transducing within the second additional frequency band.

With other embodiments, the tenth antenna system 10 may only comprise one of the additional antennas.

The radar circuit may be configured to operate the first antenna 300 within the frequency band as an antenna of a MIMO configuration. Additionally or alternatively, the radar circuit may be configured to operate within an additional frequency band, such as the second additional frequency band, at least one of the additional antennas, such as the second additional antenna, as a common antenna together with at least one of additional antennas of an adjacent antenna subsystem, such as together with a second additional antenna of the adjacent antenna subsystem. Additionally or alternatively, the radar circuit may be configured to operate within a further additional frequency band, such as within the first additional frequency band, another one of the additional antennas, such as the first additional antenna, as an antenna of a MIMO configuration.

With two adjacent antenna subsystems, the antennas of the individual subsystems that are operated as a single common antenna may be located directly adjacent to each other, as it is exemplarily shown for the third antennas 370 in FIG. 30.

Referring to the embodiment shown in FIG. 30, the radar circuit may be configured to operate, in a separated operation mode, one of the first antennas 300 as an antenna of a MIMO configuration and to operate the other one of the first antennas 300 as another antenna of the MIMO configuration. Furthermore, the radar circuit may be configured to operate, in a combined operation mode, at least both third antennas 370 as a single combined antenna by routing radar signals having the same frequency and the same coding via both feed ports 102, 103. When using the embodiment of the tenth antenna system 10 shown in FIG. 30, the radar circuit exemplarily operates the first antennas 300 and the third antennas 370 as the single combined antenna. With other embodiments, the radar circuit may only operate the third antennas 370 as the single combined antenna, for example with embodiments of the tenth antenna system 10 in which electromagnetic energy within the third frequency band 252 is only transduced via the third antennas 370 and blocked from being transduced via the first antenna 300.

With embodiments of the tenth antenna system 10, in which the first segment 372 and the second segment 373 of each third antenna 370 shown in FIG. 30 is operated as a separate antenna, the radar circuit may be configured to operate the first antennas 300 as two separate antennas of a MIMO configuration.

Furthermore, the radar circuit may be configured to operate at least the first additional antennas formed by the respective first segments 372 of the antenna subsystems as two separate antennas of a MIMO configuration that may differ from the MIMO configuration including the first antennas 300. For example, the respective first antenna 300 and the respective first additional antenna of each antenna subsystem may be configured to be operated together as a single antenna of the MIMO configuration so that the first antenna 300 and the first additional antenna coupled to one of the feed ports 102, 103 together form one antenna of the MIMO configuration and the first antenna 300 and the first additional antenna coupled to the other one of the feed ports 102, 103 together form another antenna of the MIMO configuration. Alternatively, the radar circuit may also be configured to only operate the first additional antennas of the two subsystems as two separate antennas of the MIMO configuration.

The radar circuit may also be configured to operate at least the second additional antennas formed by the respective second segments 373 of the antenna subsystems as a single common antenna. Thereby, only the second additional antennas but none of the other antennas may be operated as the single common antenna. Alternatively, the first antennas 300, the first additional antennas and the second additional antennas of both subsystems may be operated together as the single common antenna.

Alternative embodiments of the tenth antenna system 10 shown in FIGS. 29 and 30 may not comprise the second antennas 350 and/or the branching sections 180, 200 and coupling sections 130, 160.

The variant of the tenth antenna system 10 shown in FIGS. 29 and 30 constitutes a first variant of the tenth antenna system 10.

Figure 31:
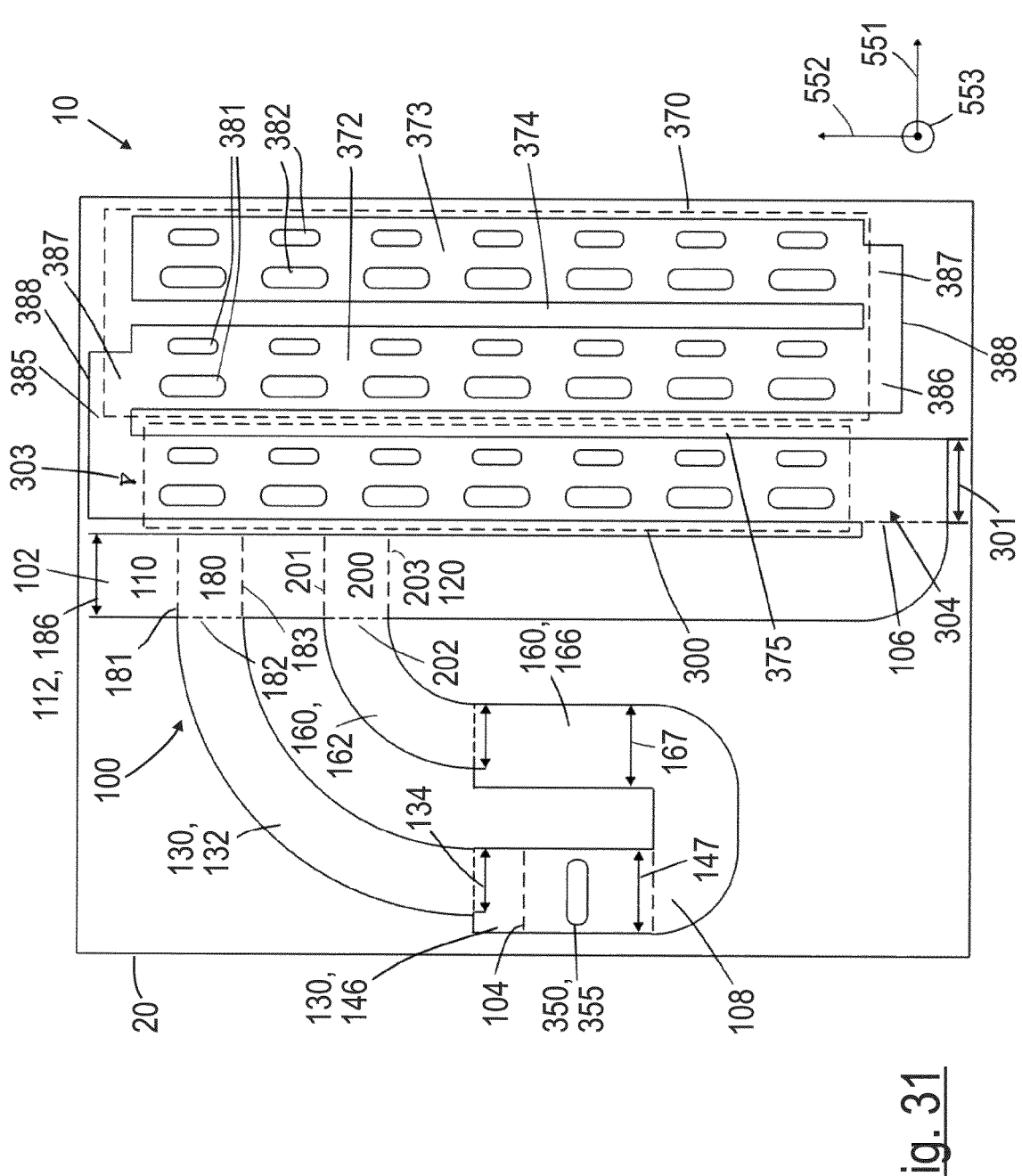
FIG. 31 is an illustration of a detailed view of a second variant of the tenth antenna system according to the present disclosure.

FIG. 31 depicts a detailed view of a second variant of the tenth antenna system 10 according to the present disclosure. As far as no differences are disclosed, the second variant of the tenth antenna system 10 is configured as it is disclosed for the first variant shown in FIGS. 29 and 30 and vice versa.

With the second variant of the tenth antenna system 10, the first antenna 300 is coupled to the guiding section 110 at one longitudinal end 303, 304 and it is coupled to the third antenna 370 at the other longitudinal end 303, 304. Exemplarily, the first antenna 300 is coupled to the third antenna 370 at the first longitudinal end 303 and to the guiding section 110 at the second longitudinal end 304.

In addition, the first segment 372 and the second segment 373 of the third antenna 370 are coupled in series to the first antenna 300. Thereby, the further filter section 385 is coupled in between the first antenna 300 and the first segment 372 of the third antenna 370 and the additional further filter section 386 is coupled in between the first segment 372 and the second segment 373 of the third antenna 370. With the embodiment shown in FIG. 31, all antenna segments 300, 372, 373 are end-fed antennas. These end-fed antennas are connected to the transmission line network 100, such as to the guiding section 110, at one of their longitudinal ends.

With the second variant of the tenth antenna system 10, the same modes of operation that have been described in connection with the first variant shown in FIGS. 29 and 30 may be realized. In particular, each one of the segments 372, 373 of the third antenna 370 may be operated as separate antennas either alone or in combination with additional antennas.

Figure 32:
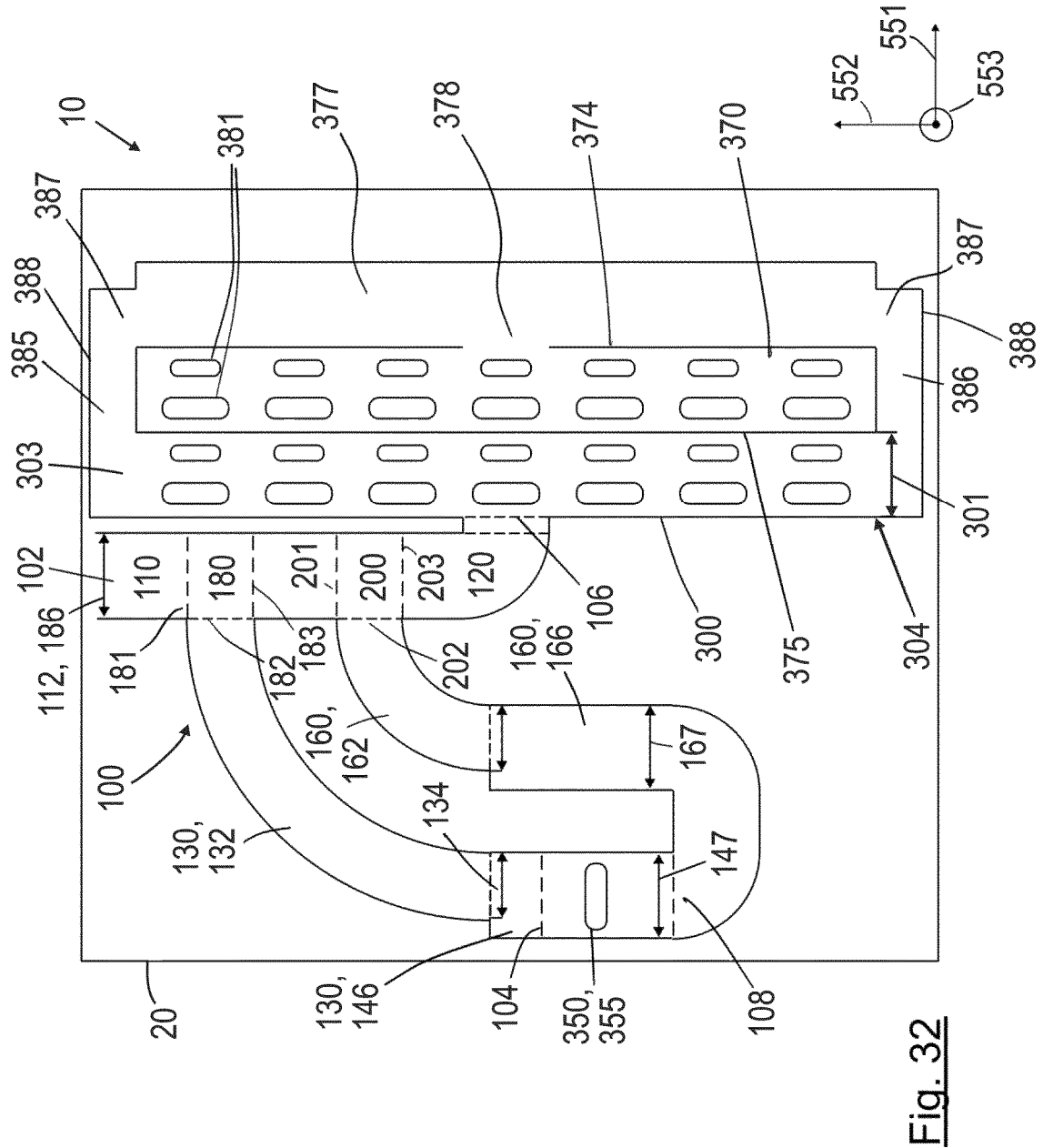
FIG. 32 is an illustration of a detailed view of a third variant of the tenth antenna system according to the present disclosure.

FIG. 32 depicts a detailed view of a third variant of the tenth antenna system according to the present disclosure. As far as no differences are disclosed, the third variant of the tenth antenna system 10 is configured as it is disclosed for the first variant shown in FIGS. 29 and 30 and vice versa.

Like with the first variant, the first antenna 300 of the third variant of the tenth antenna system 10 is center-fed. It has a feed port that is located at the center of one of its longitudinal sidewalls.

The third variant of the tenth antenna system 10 has a third antenna 370 that is coupled to the guiding section 110 via the first antenna 300. The third antenna 370 comprises a single segment.

The third antenna 370 is also center-fed. It is connected to the guiding section 110 and to the first antenna 300 via a feed section 377. The feed section 377 runs parallel to the first antenna 300 and the third antenna 370. It is located at an opposite side from the third antenna 370 as the first antenna 300.

The first antenna 300 and the third antenna 370 share a common sidewall 375. The common sidewall 375 is a longitudinal sidewall. It is exemplarily configured as a single boundary structure that forms both a boundary structure of the first antenna 300 and a boundary structure of the third antenna 370.

The third antenna 370 and the feed section 377 also share a common sidewall 374. This common sidewall 374 is also a longitudinal sidewall. It is also exemplarily configured as a single boundary structure that forms both a boundary structure of the third antenna 370 and a boundary structure of the feed section 377.

The third antenna 370 is connected to the feed section 377 via a port 378 that is located at the common sidewall 374. The port 378 connects the feed section 377 at the center of the third antenna 370 along its longitudinal direction parallel to the second transverse direction 552.

The feed section 377 is connected to the first antenna 300 at both longitudinal ends, whereby the further filter section 385 connects the feed section 377 to the first end 303 of the first antenna 300 and the additional further filter section 386 connects the feed section 377 to the second end 304 of the first antenna 300. The further filter section 385 and the additional further filter section 386 are configured to block electromagnetic energy within respective same frequency bands and to pass electromagnetic energy within respective same frequency bands.

A radar circuit coupled to the third variant of the tenth antenna system 10 may be configured to operate the third variant of the tenth antenna system 10 analogously to the operation disclosed for the first variant shown in FIGS. 29 and 30.

With all variants of the tenth antenna system 10, respective distances between the centers of the individual antennas 300, 370, 372, 373 and also between neighboring antennas 370, 373 of the two subsystems may amount to half the wavelength at an operating frequency of the antennas 300, 370, 372, 373.

Figure 33:
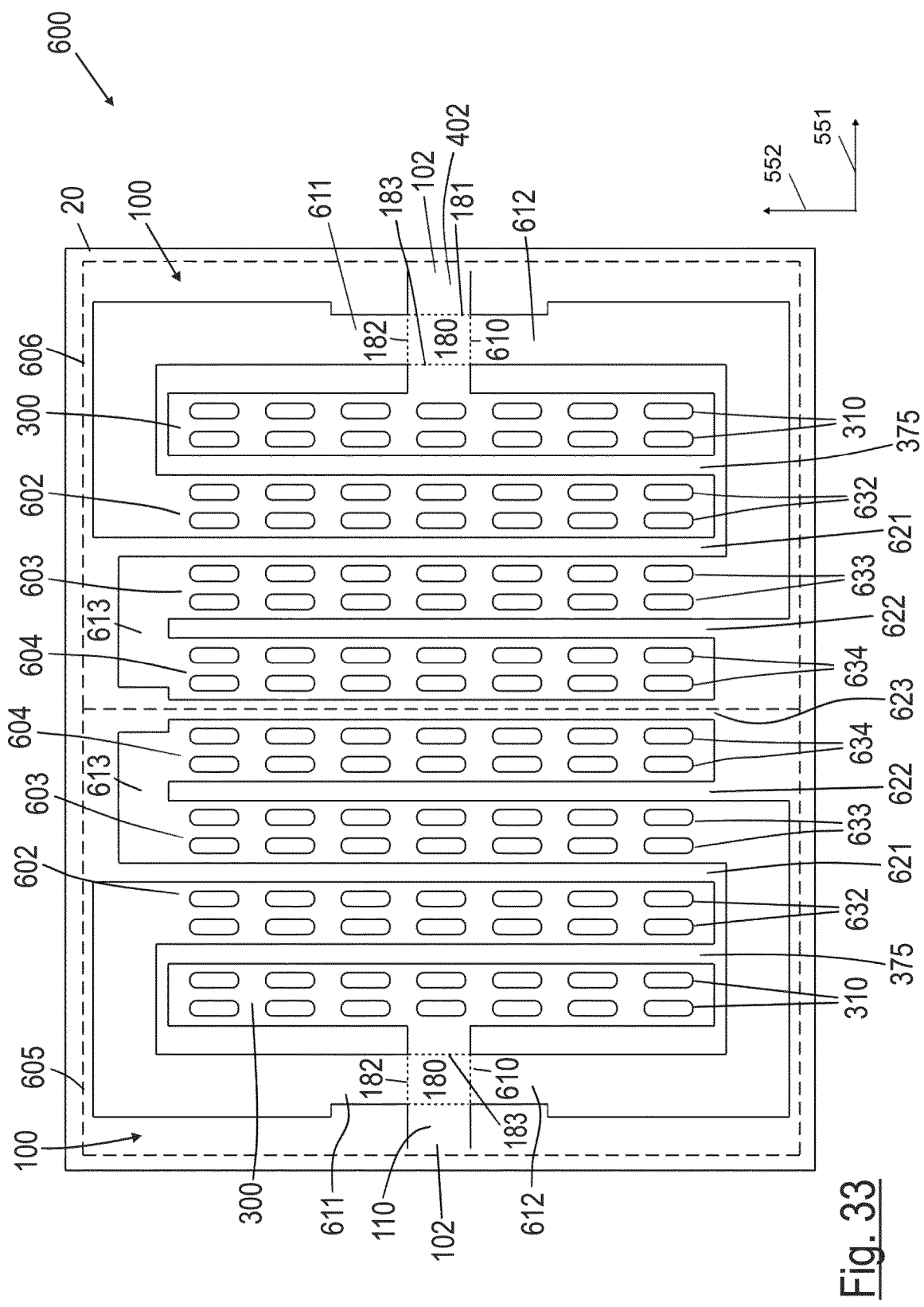
FIG. 33 is an illustration of a detailed view of an eleventh antenna system according to the present disclosure.

FIG. 33 depicts an eleventh antenna system 600 according to the present disclosure. As far as no differences are disclosed, the eleventh antenna system 600 is configured as it is disclosed for the tenth antenna system 10 and vice versa.

The eleventh antenna system 600 comprises a first antenna subsystem 605 and a second antenna subsystem 606 that are placed next to each other on an antenna board 20. As far as no differences are disclosed, the second antenna subsystem 606 is configured as it is described for the first antenna subsystem 605 and vice versa. The first and second antenna subsystem 605, 606 are identical in construction and mirrored with respect to each other along the second transverse direction 552.

Each antenna subsystem 605, 606 comprises a respective first antenna 300, a respective second antenna 602, a respective third antenna 603 and a respective fourth antenna 604. The antennas 300, 602, 603, 604 are placed next to each other and directly adjacent to each other on the antenna board 20. They extend along the second transverse direction 552 which is orientated parallel to respective longitudinally directions of the individual antennas 300, 602, 603, 604.

Each set of neighboring antennas 300, 602, 603, 604 shares a respective common sidewall that is placed in between the respective two antennas 300, 602, 603, 604. A first sidewall 375 forms a common sidewall between the first antenna 300 and the second antenna 602, a second sidewall 621 forms a common sidewall between the second antenna 602 and the third antenna 603 and a third sidewall 622 forms a common sidewall between the third antenna 603 and the fourth antenna 604. Furthermore, a fourth sidewall 623 forms a common sidewall between the fourth antenna 604 of the first antenna subsystem 605 and the fourth antenna 604 of the second antenna subsystem 606. All sidewalls 375, 621, 622, 623 are orientated parallel to each other and parallel to the second transverse direction 552.

The antennas 300, 602, 603, 604 exemplarily form waveguide antennas, namely slotted waveguide antennas. In addition, the antennas 300, 602, 603, 604 are horn antennas. The antennas 300, 602, 603, 604 are polarized parallel to each other and parallel to the first transverse direction 551. The first antennas 300 comprise a set of antenna elements 310, the second antennas 602 comprise a set of antenna elements 632, the third antennas 603 comprise a set of antenna elements 633 and the fourth antennas 604 comprise set of antenna elements 634. Each antenna element 310, 632, 633, 634 is configured as an elongated antenna element elongated parallel to the longitudinal direction of its respective antenna and parallel to the second transverse direction 552. The antenna elements 310, 632, 633, 634 are configured as slots within the antennas 300, 602, 603, 604 and the antenna board 20.

The first antenna subsystem 605 comprises a guiding section 110 that is coupled to a feed port 102 and the second antenna subsystem 606 comprises an additional guiding section 402 that is coupled to an additional feed port 103 of the eleventh antenna system 600.

With each antenna subsystem 605, 606, the respective first antenna 300 is coupled in parallel with the respective second antenna 602 to the respective guiding section 110, 402. Furthermore, the respective first antenna 300 is coupled in parallel with the respective third antenna 603 to the respective guiding section 110, 402. The respective first antenna 300 is also coupled in parallel with the respective fourth antenna 604 to the respective guiding section 110, 402. In total, the respective first antenna 300 and the respective second antenna 602 are coupled in parallel with the respective third and fourth antenna 603, 604 to the respective guiding section 110, 402. With each antenna subsystem 605, 606, the respective fourth antenna 604 is coupled in series with the respective third antenna 603.

Each antenna subsystem 605, 606 is configured to transduce electromagnetic energy within a multitude of frequency bands over the respective first antenna 300. Thereby, the antenna subsystems 605, 606 are configured to route electromagnetic energy within a first frequency band solely over the first antenna 300 and not over the additional antennas 602, 603, 604. With each additional frequency band, the electromagnetic energy is additionally transduced via a further one of the additional antennas 602, 603, 604. This results in a series of frequency bands, whereby for each frequency band one of the remaining antennas 602, 603, 604 is added to the antennas 300, 602, 603, 604 that transduce electromagnetic energy in comparison to the respective preceding frequency band. Starting from the first frequency band, the individual frequency bands of the consecutive frequency bands exemplarily are located at increasing frequencies.

Within one of the frequency bands, only the first antenna 300 transduces and within another one of the frequency bands, all antennas, 300, 602, 603, 604 transduce.

With the eleventh antenna system 600, the second antennas 602 and the first antenna 300 transduce electromagnetic energy within a second frequency band, the third antenna 603, the second antenna 602 and the first antenna 300 transduce electromagnetic energy within a third frequency band and the fourth antenna 604, the third antenna 603, the second antenna 602 and the first antenna 300 transduce electromagnetic energy within a fourth frequency band.

With each antenna subsystem 605, 606, the respective transmission line network 100 is configured to pass electromagnetic energy within the first frequency band between the respective guiding section 110, 402 and the respective first antenna 300 and to block electromagnetic energy within the first frequency band from being transduced via the respective second, third and fourth antenna 602, 603, 604. The respective transmission line network 100 thereby is configured to block electromagnetic energy within the first frequency band between the respective guiding section 110, 402 and the respective second, third and fourth antenna 602, 603, 604.

With each antenna subsystem 605, 606, the respective transmission line network 100 further is configured to pass electromagnetic energy within the second frequency band between the respective guiding section 110, 402 and the respective first and second antennas 300, 602 and to block electromagnetic energy within the second frequency band from being transduced via the respective third and fourth antennas 603, 604. The respective transmission line network 100 thereby is configured to block electromagnetic energy within the second frequency band between the respective guiding section 110, 402 and the respective third and fourth antennas 603, 604.

With each antenna subsystem 605, 606, the respective transmission line network 100 further is configured to pass electromagnetic energy within the third frequency band between the respective guiding section 110, 402 and the respective first, second and third antennas 300, 602, 603 and to block electromagnetic energy within the third frequency band from being transduced via the respective fourth antenna 604. The respective transmission line network 100 thereby is configured to block electromagnetic energy within the third frequency band between the respective guiding section 110, 402 and the respective fourth antenna 603, 604.

Furthermore, the respective transmission line networks 100 of the individual antenna subsystem 605, 606 are configured to pass electromagnetic energy within the fourth frequency band between the respective guiding section 110, 402 and all antennas 300, 602, 603, 604 of the respective antenna subsystem 605, 606.

The individual transmission line networks 100 exemplary comprise a branching section 180 that is coupled in between the respective guiding section 110, 403 and the respective antennas 300, 602, 603, 604. The branching sections 180 have a respective first end 181 coupled to the respective guiding section 110, 402. A respective second end 182 of the branching sections 180 couples the second antennas 602 to their respective branching section 180 via a respective first filter section 611, a respective third end 183 of the branching sections 180 couples the first antennas 300 to their respective branching section 180 and a respective fourth end 610 of the branching sections 180 couples the third and fourth antennas 603, 604 to their respective branching section 180 via a respective second filter section 612.

With each antenna subsystem 605, 606, a third filter section 613 is coupled in between the respective third antenna 603 and the respective fourth antenna 604.

With each antenna subsystem 605, 606, the respective first antenna 300 is coupled to the respective guiding section 110, 402 and the respective branching section 180 via sections of the transmission line network 100 that are configured to pass electromagnetic energy within the first, second, third and fourth frequency band. The first filter section 611 is configured to block electromagnetic energy within the first frequency band and to pass electromagnetic energy within the second, third and fourth frequency band. The second filter section 612 is configured to block electromagnetic energy within the first and second frequency band and to pass electromagnetic energy within the third and fourth frequency band. The third filter section 613 is configured to block electromagnetic energy within the third frequency band and to pass electromagnetic energy within the fourth frequency band.

The individual filters sections 611, 612, 613 are, as far as no differences are disclosed, configured as it is described for the filter sections of the other antenna systems 1, 2, 3, 4, 5, 6, 7, 8, 9, 10 according to the present disclosure. For example, they are configured as stepped impedance filters of a waveguide, exemplarily as stepped impedance filters of a substrate integrated waveguide. The first and second filter section 611, 612 are placed directly at the second and fourth end 182, 610 of the branching sections 180. The third filter section 613 is placed in a bending section of the transmission line network 100 in between the third antenna 603 and the fourth antenna 604.

The feed port 102 coupled to the guiding section 110 of the first antenna subsystem 605 and the additional feed port 103 coupled to the additional guiding section 402 of the second subsystem 606 are coupled to separate circuit ports of a radar circuit coupled to the eleventh antenna system 600.

The radar circuit is configured to simultaneously and coherently transduce electromagnetic energy within the individual frequency bands of the first, second, third and fourth frequency band via the respective antennas 300, 602, 603, 604 of both antenna subsystems 605, 606. Within the first frequency band, the electromagnetic energy is simultaneously and coherently transduced via the first antennas 300 of both antenna subsystems 605, 606, within the second frequency band, the electromagnetic energy is simultaneously and coherently transduced via the first and second antennas 300, 602 of both antenna subsystem 605, 606, within the third frequency band, the electromagnetic energy is simultaneously and coherently transduced via the first, second and third antennas 300, 602, 603 of both antenna subsystem 605, 606 and, within the fourth frequency band, the electromagnetic energy is simultaneously and coherently transduced via the first, second, third and fourth antennas 300, 602, 603, 604 of both antenna subsystem 605, 606.

Within each frequency band, the antenna signals that are simultaneously routed via the feed ports 102, 103 of the first and second antenna subsystem 605, 605 exhibit the same frequency and the same coding, such as the same phase coding. Furthermore, the first and second antenna subsystem 605, 606 are configured to transduce the antenna signals that are simultaneously routed via the feed ports 102, 103 of the first and second antenna subsystem 605, 606 with the same polarization, that is, with a polarization perpendicular to the second transverse direction 552.

In other modes of operation, the radar circuit is configured to only transduce the electromagnetic energy simultaneously and coherently via the antennas 300, 602, 603, 604 of one of the antenna subsystems 605, 606 and not via the antennas 300, 602, 603, 604 of the other one of the antenna subsystems 605, 606.

For example, the radar circuit may be configured to operate, in a separated operation mode, the individual first antennas 310 of the two antenna subsystems 605, 606 within the first frequency band as separate antennas of a MIMO configuration. Furthermore, the radar circuit may be configured to operate in the separated operation mode the first and second antennas 310, 602 that are coupled to one of the feed ports 102, 103 as a single common antenna of a MIMO configuration within the second frequency band and to operate the first and second antennas 310, 602 that are coupled to the other one of the feed ports 102, 103 as another single common antenna of the MIMO configuration within the second frequency band. The radar circuit may additionally be configured to operate in the separated operation mode the first, second and third antennas 310, 602, 603 coupled to one of the feed ports 102, 103 as a single common antenna of a MIMO configuration within the third frequency band and to operate the first, second and third antennas 310, 602, 603 coupled to the other one of the feed ports 102, 103 as another single common antenna of the MIMO configuration within the second frequency band. The radar circuit may then also be configured to operate, in a combined mode of operation, all antennas 310, 602, 603, 604 coupled to one of the feed ports 102, 103 together with all antennas 310, 602, 603, 604 coupled to the other one of the feed ports 102,103 as a single common antenna within the fourth frequency band.

With other embodiments of the elevenths antenna system 600, the first and/or second antenna subsystem 605, 606 may have a different number of antennas, for example one antenna, two antennas, three antennas, five antennas or more than five antennas.

With other embodiments of the eleventh antenna system 600, one or more of the second, third and fourth antennas 602, 603, 604 of the individual antenna subsystems 605, 606 may be configured to transduce individually without other antennas of the respective subsystem 605, 606 transducing simultaneously and coherently. For example, only a single antenna 300, 602, 603, 604 of the individual antenna subsystems 605, 606 may transduce within each individual frequency band. Thereby, a different one of the antenna 300, 602, 603, 604 may transduce for each individual frequency band.

Other embodiments of the eleventh antenna system 600 may comprise only end-fed antennas 300, 602, 603, 604. The end-fed antennas may be coupled in series one after the other at their respective longitudinal ends, as it is exemplarily shown in FIG. 31. Alternative embodiments may only comprise center-fed antennas 300, 602, 603, 604, as it is exemplarily shown in FIG. 32.

With all antenna systems 1, 2, 3, 4, 5, 6, 7, 8, 9, 10, 600 according to the present disclosure, the first transverse direction 551 may be the azimuthal direction and the second direction 552 may be the elevation direction. The first angle 555 then amounts to the azimuthal angle and the second angle 556 then amounts to the elevation angle.

In general, all antenna systems 1, 2, 3, 4, 5, 6, 7, 8, 9, 10, 600 according to the present disclosure may comprise antenna subsystems connected to the transmission ports of the radar circuit that are different from the antenna subsystems connected to the receive ports of the radar circuit. The antenna subsystems connected to the transmission ports of the radar circuit may be any type of antenna subsystem disclosed for the antenna systems 1, 2, 3, 4, 5, 6, 7, 8, 9, 10, 600 according to the present disclosure and the antenna subsystems connected to the receive ports of the radar circuit may be another one of the types of antenna systems disclosed for the antenna systems 1, 2, 3, 4, 5, 6, 7, 8, 9, 10, 600 according to the present disclosure.

The present disclosure is also directed at a radar system comprising one of the antenna systems 1, 2, 3, 4, 5, 6, 7, 8, 9, 10, 600 according to the present disclosure, whereby the radar system has a processing unit that is configured to process target detections made by the antenna system 1, 2, 3, 4, 5, 6, 7, 8, 9, 10, 600 and to determine positions of target objects both at negative and positive values of the second angle 556 along the second transverse direction with the second antennas 250. The antenna system 1, 2, 3, 4, 5, 6, 7, 8, 9, 10, 600 is mounted on a vehicle with the second transverse direction 552 orientated parallel to the elevation direction. The processing unit then is configured to determine positions of target objects both in the negative and positive elevation direction.

Furthermore, the present disclosure is also directed at a vehicle that comprises two of the antenna systems 1, 2, 3, 4, 5, 6, 7, 8, 9, 10, 600. The two antenna systems 1, 2, 3, 4, 5, 6, 7, 8, 9, 10, 600 are mounted in opposite orientations so that the second transverse direction 552 of one of the antenna systems 1, 2, 3, 4, 5, 6, 7, 8, 9, 10 is orientated opposite to the second transverse direction 552 of the other one of the antenna systems 1, 2, 3, 4, 5, 6, 7, 8, 9, 10, 600. For example, the antenna systems 1, 2, 3, 4, 5, 6, 7, 8, 9, 10, 600 may be mounted at opposite corners of the vehicle.

Figure 34:
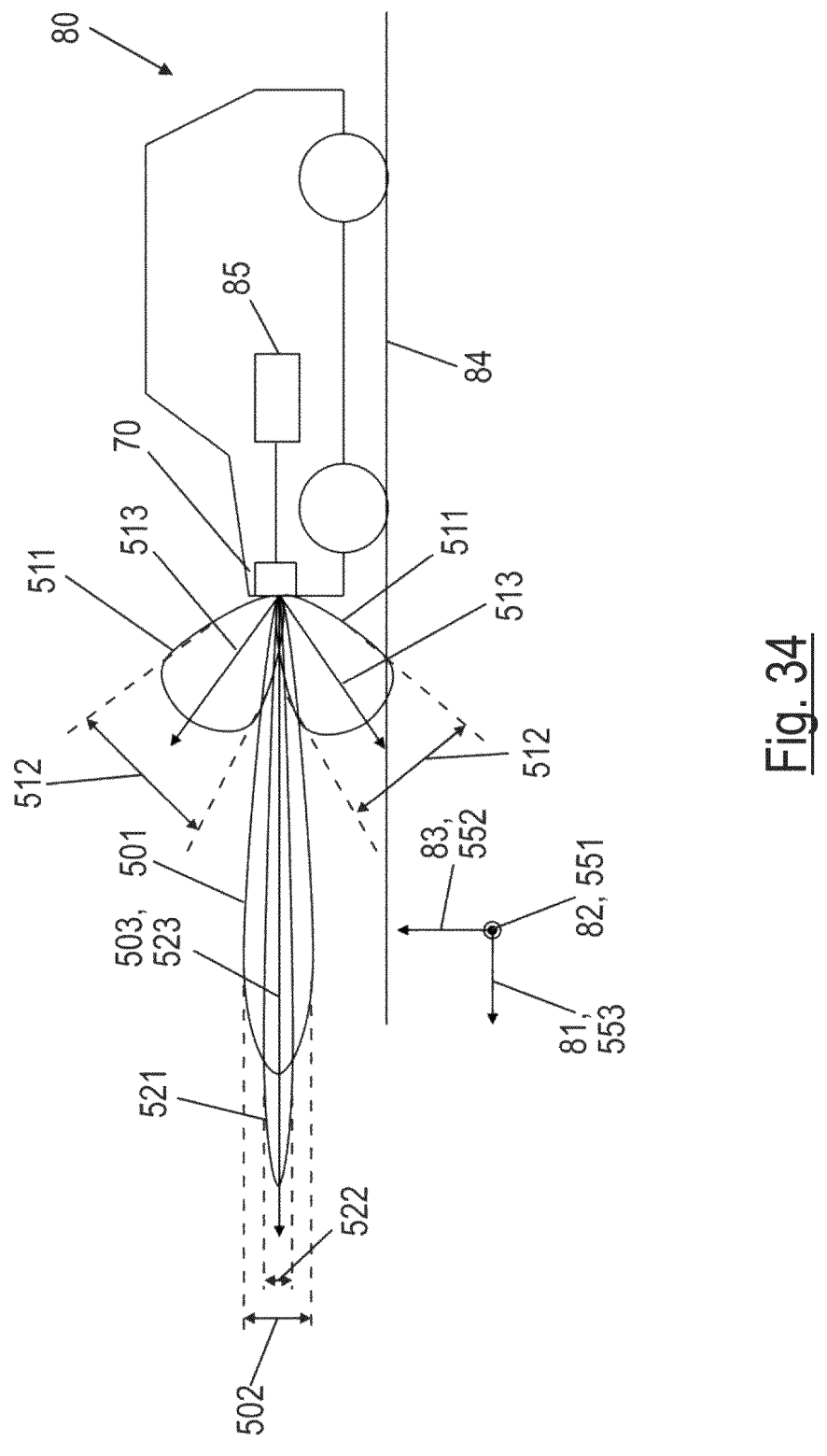
FIG. 34 is an illustration of a vehicle comprising the tenth antenna system according to the present disclosure.

FIG. 34 depicts an automotive vehicle 80 having a radar system 70 according to the present disclosure. The radar system 70 is coupled to a vehicle control system 85. The vehicle control system 85 receives from the radar system 70 information on target objects that are located in the environment of the vehicle 80 and that are detected by the radar system 70. Based on the information, the vehicle control system 85 performs vehicle control functions, such as steering, braking, accelerating or the like.

The radar system 70 exemplarily comprises the tenth antenna system 10 and a radar circuit having circuit ports that are coupled to the individual feed ports 102, 103 of the tenth antenna system 10. The tenth antenna system 10 is mounted to the vehicle 18 in an orientation in which the boresight direction 553 is parallel to a ground 84 over which the vehicle 80 navigates and in which the boresight direction 553 is parallel to a longitudinal axis of the vehicle 80 and the forward direction 81. The first transverse direction 551 is orientated parallel to the ground 84 and perpendicular to the longitudinal center axis. It therefore corresponds to an azimuthal direction 82. The second transverse direction 552 is orientated parallel to the elevation direction 83.

When being operated in the first mode, the antenna system 70 transduces only via the first antennas 300. The main antenna lobes 501 then have a direction 503 that is parallel to the boresight direction and a width 502 in the elevation direction 83. In the second mode, the antenna system 70 transduces only via the second antenna 350. The main antenna lobes 511 then have a direction 513 that has an angle with the boresight direction 553. One of the main antenna lobes 511 of each individual second antenna 350 is tilted towards the ground 84 and the other one is tilted away from the ground 84. The main antenna lobes 511 have a width 512 that is larger than the width 502 of the main antenna lobes 501 of the first antennas 300.

When operating in the third mode, the antenna system 70 transduces via both the first and third antennas 300, 370. The main antenna lobes 521 are then orientated parallel to the ground 84 and have a width 522 that is smaller than the width 502 of the main antenna lobes 501 of the first antennas 300.

With other embodiments of the vehicle 80, the radar system 70 comprises another one of the antenna systems 1, 2, 3, 4, 5, 6, 7, 8, 9, 600 according to the present disclosure that does not feature the third antennas 370. The radar system 70 then only operates in the first and second mode. Depending on the exact configuration of the second antennas 350, the direction 513 of the main antenna lobes 511 of the second antennas 350 may either have an angle with the boresight direction 553 and therefore be directed towards or away from the ground 84 or they may be parallel to the boresight direction 553.

Figure 35:
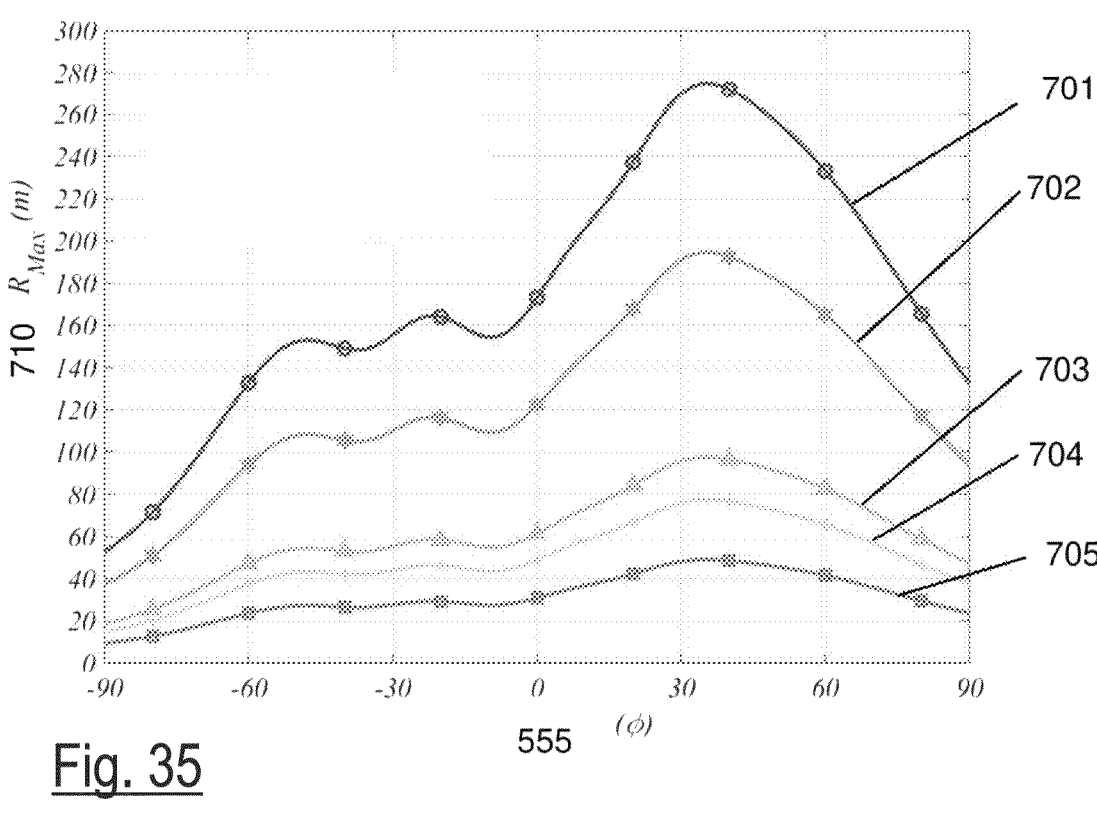
FIG. 35 is an illustration of detection ranges realized with antenna systems according to the present disclosure at a first frequency as a function of a first angle.
Figure 36:
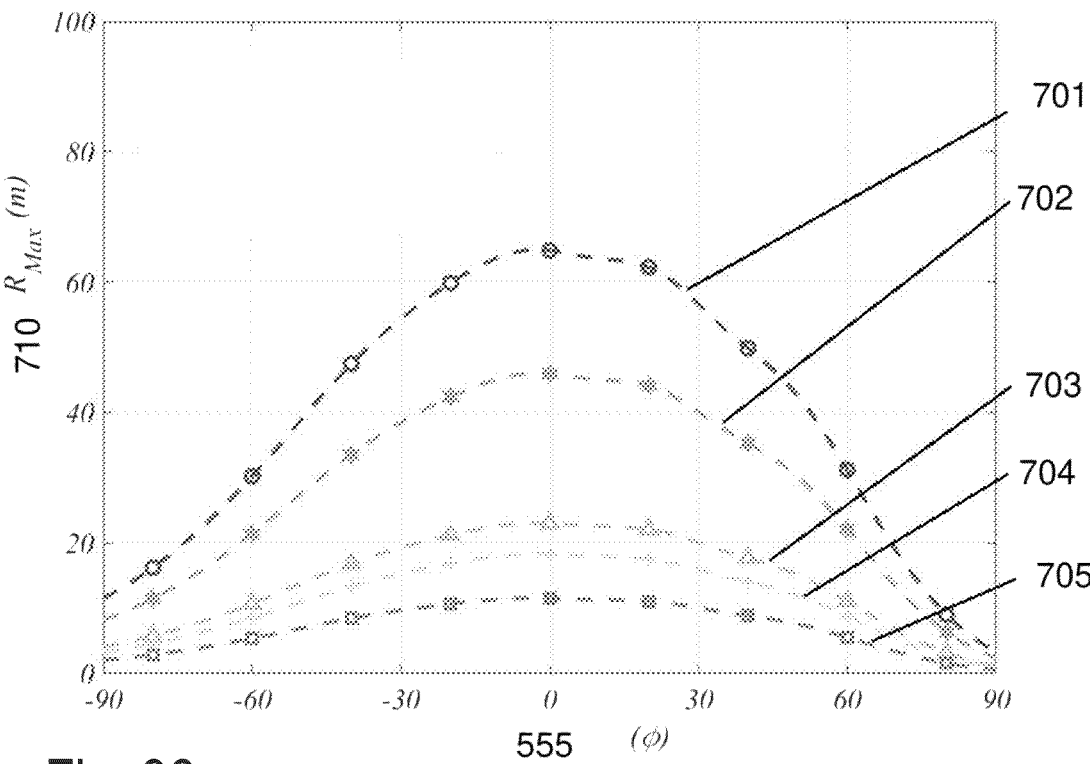
FIG. 36 is an illustration of detection ranges realized with the antenna systems according to the present disclosure at a second frequency as a function of a second angle.

FIG. 35 depicts detection ranges 710 that are realized with the antenna systems 1, 2, 3, 4, 5, 6, 7, 8, 9, 10, 600 according to the present disclosure at the first frequency 258 of 76.5 GHz as a function of the first angle 555, which corresponds to the azimuthal angle. FIG. 36 depicts detection ranges 710 that are realized with the antenna systems 1, 2, 3, 4, 5, 6, 7, 8, 9, 10, 600 according to the present disclosure at the second frequency 259 of 80.5 GHz as a function of the first angle 555, which corresponds to the azimuthal angle.

FIGS. 35 and 36 show a first detection range 701 for a target object formed by a car having a radar cross section (RCS) of 10 dBsm, a second detection range 702 for a target object formed by a motorbike having a radar cross section (RCS) of 4 dBsm, a third detection range 703 for a target object formed by a pedestrian having a radar cross section (RCS) of −8 dBsm, a fourth detection range 704 for a target object formed by grass having a radar cross section (RCS) of −12 dBsm and a fifth detection range 705 for a target object formed by a curb having a radar cross section (RCS) of −20 dBsm. The detection ranges 701, 702, 703, 704, 705 each depict the maximum range 710 in meter at which the antenna systems 1, 2, 3, 4, 5, 6, 7, 8, 9, 10, 600 are configured to detect the respective target object as a function of the first angle 552 in degree.

At the first frequency 258 of 76.5 GHz, the first antennas 300, 410 and, optionally, the third antennas 370, 440, 603 and/or the fourth antennas 604 all transduce the electromagnetic radiation with the first polarization, exemplarily with the polarization along the first transverse direction 551 and/or horizontal polarization, and, at the second frequency 259 of 80.5 GHz, the second antennas 350, 430 transduce the electromagnetic radiation with the second polarization orthogonal to the first polarization, exemplarily with the polarization along the second transverse direction 552 and/or vertical polarization.

The radar system 70 is configured to perform target classification based on the dual-polarized detections obtained at different frequencies, namely at the first and second frequency. Thereby, first radar signals having the first frequency and the first polarization are transduced via the first antennas 300, 410 and, optionally, the third antennas 370, 440, 603 and/or the fourth antennas 604 and second radar signals having the second frequency and the second polarization are transduced via the second antennas 350, 430. The radar system 70 is configured to classify the target objects based on both the first radar signals and the second radar signals. Thereby, the radar system 70 is configured to classify the target objects as different object types, such as cars, motorbikes, cycles, pedestrians, grass, curbs or the like. In particular, the radar system 70 is configured to classify the target objects based on radar signals having different frequencies.

The radar system 70 comprising one of the antenna systems 1, 2, 3, 4, 5, 6, 7, 8, 9, 10, 600 according to the present disclosure is configured to perform dual-polarized target classification for target objects. Those target objects are located in the overlapping antenna fields 500, 510 of the first antennas 300, 410, of the second antennas 350, 430 and, optionally, of the third antennas 370, 440, 603 and/or the fourth antennas 604.

As can be seen from FIGS. 35 and 36, the radar system 70 comprising one of the antenna systems 1, 2, 3, 4, 5, 6, 7, 8, 9, 10, 600 according to the present disclosure is configured to perform dual-polarized target classification for target objects having a distance up to 60 m, which also includes distances up to 30 m, 40 m and 50 m. The distance is thereby limited by the detection range 710 of the second antennas 350, 430 shown in FIG. 36.

Figure 37:
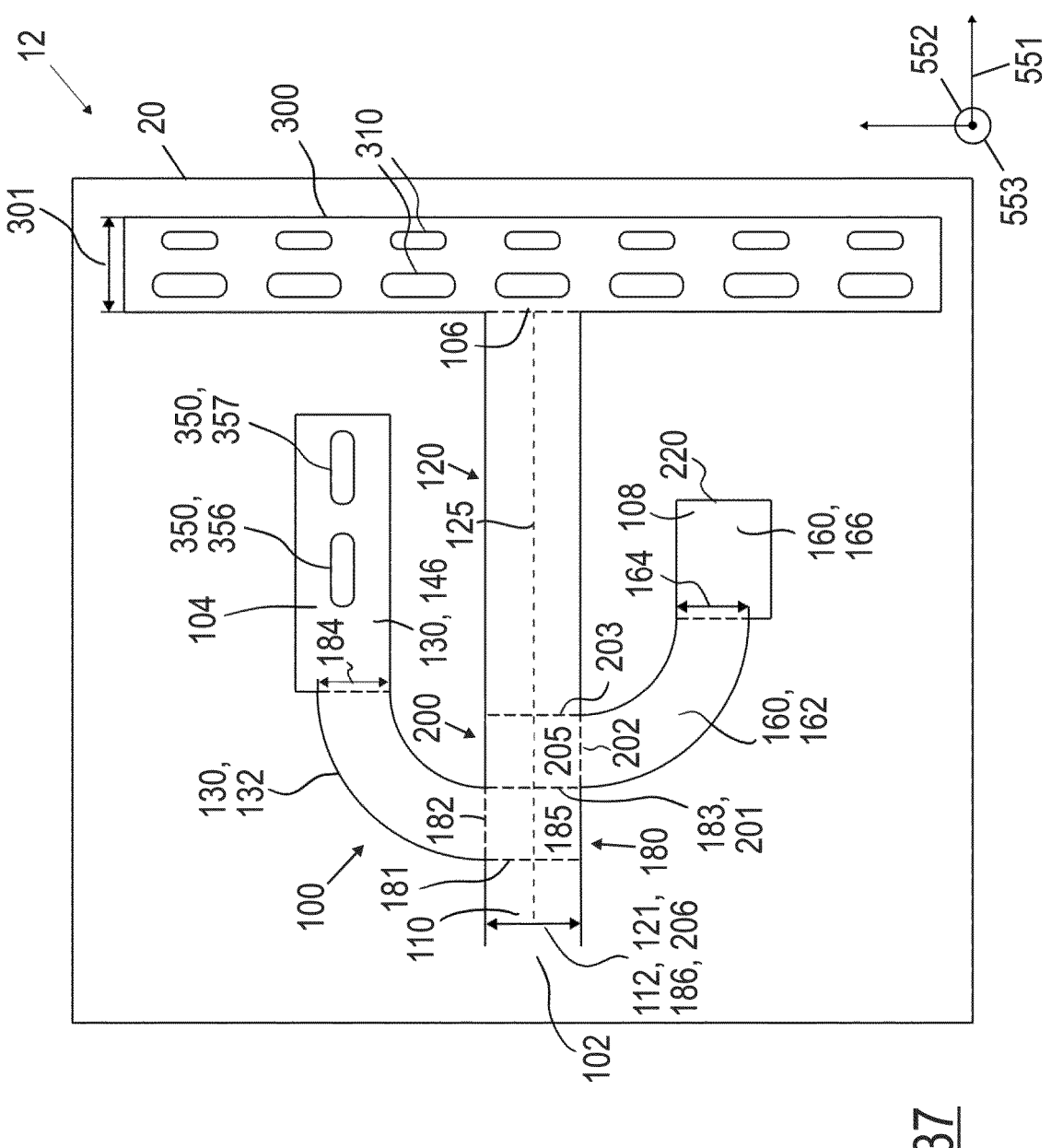
FIG. 37 is an illustration of a detailed view of a twelfth antenna system according to the present disclosure.

FIG. 37 shows a twelfth antenna system 12 according to the present disclosure. As far as no differences are disclosed, the twelfth antenna system 12 is configured as it is disclosed for the seventh antenna system 7 and vice versa.

With the twelfth antenna system 12, the guiding section 110, the branching section 180, the additional branching section 200 and the additional feed section 120 are consecutively coupled one after the other along the longitudinal path 125. The longitudinal path 125 thereby is a straight path. With other embodiments, the guiding section 110 may comprise at least one additional bent section. The bent section or all additional bent sections may be located at a distance from the branching section 180. Alternatively, one of the bent sections may be located directly at the branching section 180. For example, the bent section may directly connect to the first end 181 of the branching section 180.

The additional feed section 120 connects to the first antenna 300 at the additional port 106 at a right angle with respect to the elongation direction of the first antenna 300. The elongation direction thereby is parallel to the second transverse direction 552.

The branching section 180 and the additional branching section 200 are located directly next to each other. The third end 183 of the branching section 180 is located directly at the first end 201 of the additional branching section 200. With other embodiments, the additional branching section 200 may be located at a distance from the branching section 180.

With the twelfth antenna system 12, the filter section 132 and the additional filter section 162 are located at opposite sides from the longitudinal path 125 connecting the branching section 180 and the additional branching section 200. With other embodiments, the filter section 132 and the additional filter section 162 may also be located at the same side from the longitudinal path 125.

The first filter section 132 connects the guiding section 110 to the second antenna 350 at the port 104. The second filter section 162 connects the termination 220 to the guiding section 110 at the further port 108.

The feed section 146 is orientated parallel to the longitudinal path 125 and the additional feed section 120. Furthermore, the further feed section 166 is orientated parallel to the longitudinal path 125 and the additional feed section 120.

The second antenna 350 exemplarily comprises a multitude of antenna elements that are serially coupled to the port 104 and the filter section 132. With the embodiment shown, the second antenna 350 comprises two antenna elements, namely a first antenna element 356 and a second antenna element 357. With other embodiments, the second antenna 350 may only comprise a single antenna element or more than two antenna elements.

The antenna elements 356, 357 are both configured as longitudinally fed antenna elements. Exemplarily, they are configured as longitudinally fed slots. With other embodiments, the second antenna 350 may also comprise at least one transversely fed antenna element. For example, all antenna elements of the second antenna 350 may be configured as transversely fed antenna elements. Alternatively, the second antenna 350 may comprise both at least one transversely fed antenna element and at least one longitudinally fed antenna element.

The layout of the transmission line network 100 shown in FIG. 37, in which the feed section 110, the branching sections 180, 200 and the additional feed section 120 are aligned along a straight longitudinal path 125 may also be implemented with any other one of the transmission line networks 100 of the antenna systems 1, 2, 3, 4, 5, 6, 7, 8, 9, 10 according to the present disclosure. Furthermore, transmission line networks 100 in which the second ends 182, 202 of the branching sections 180, 200 are located at opposite sides from the longitudinal path 125, as it is shown in FIG. 37, may also be implemented with any other antenna system 1, 2, 3, 4, 5, 6, 7, 8, 9, 10 according to the present disclosure. The waveguides of these antenna systems then may be configured as three-dimensional structures that are not bounded to a flat substrate and that allow to join, if needed, the transmission line segments coupled to the second ends 182, 202 of the branching sections 180, 200 even if the second ends 182, 202 are located at opposite sides of the waveguides segments of the branching sections 180, 200.

Figure 38:
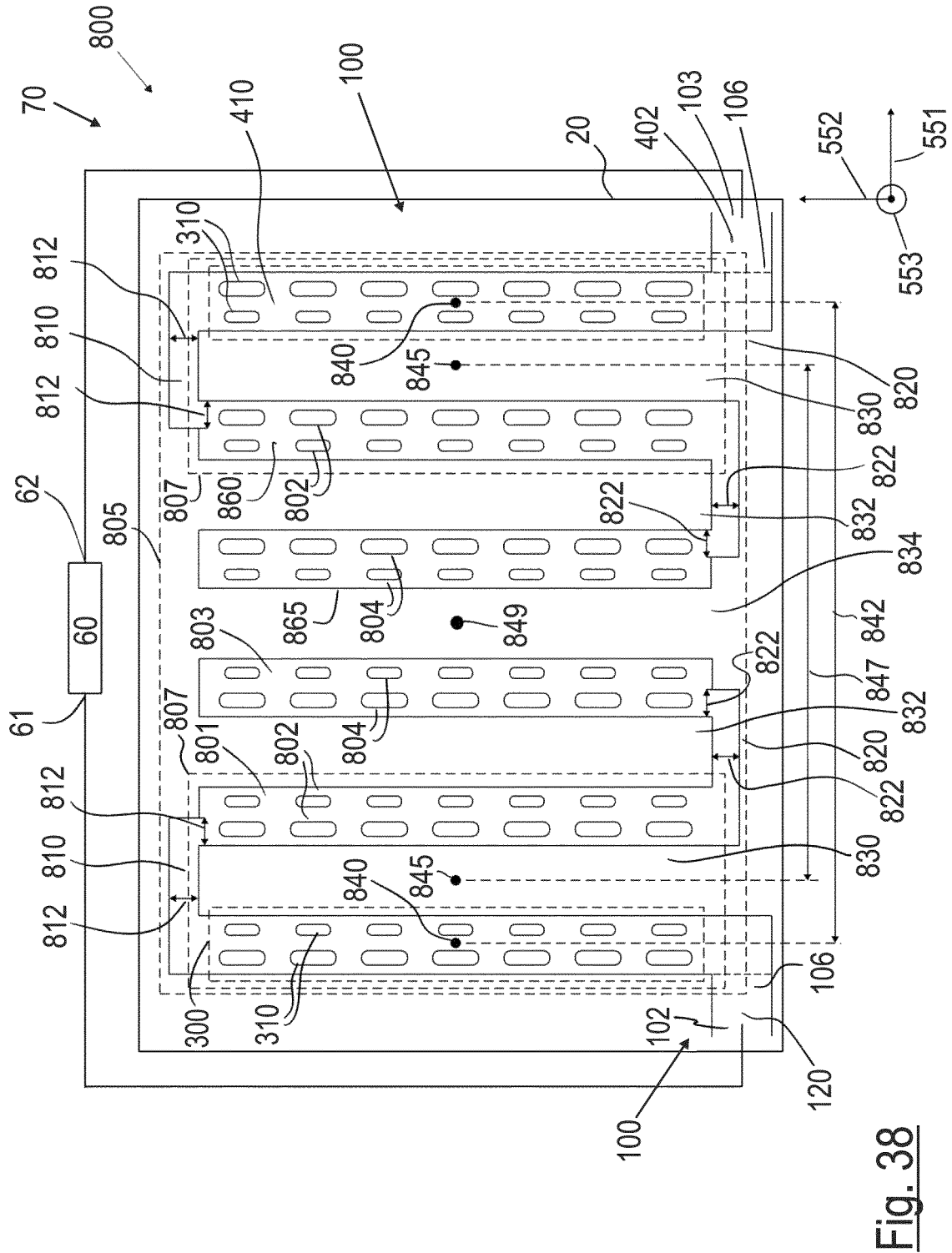
FIG. 38 is an illustration of a detailed view of a thirteenth antenna system according to the present disclosure.

FIG. 38 shows radar system 70 comprising a thirteenth antenna system 800. As far as no differences are disclosed, the thirteenth antenna system 800 is configured as it is disclosed for the second variant of the tenth antenna system 10 and vice versa.

The thirteenth antenna system 800 comprises an antenna board 20 with a first antenna 300, a second antenna 801 and a third antenna 803. The first antenna 300, the second antenna 801 and the third antenna 803 are consecutively arranged next to each other along a first transverse direction 551. The first transverse direction 551 thereby constitutes a separation direction of the antennas 300, 801, 803. The first antenna 300 and the second antenna 801 share a common sidewall 830 and the second antenna 801 and the third antenna 803 also share a common sidewall 832.

The first antenna 300, the second antenna 801 and the third antenna 803 have parallel polarizations. Their polarization is exemplarily parallel to the first transverse direction 551.

The first antenna 300 comprises a set of antenna elements 310 that are configured as elongated antenna elements with an elongation direction parallel to the second transverse direction 552 and the elongation direction of the first antenna 300. The antenna elements 310 are exemplarily configured as elongated slots. The second antenna 801 comprises a set of antenna elements 802 and the third antenna 803 comprises a set of antenna elements 804. The antenna elements 802, 804 are configured as elongated antenna elements with an elongation direction parallel to the second transverse direction 552 and parallel to the elongation direction of their respective antenna 801, 803. The antenna elements 802, 804 are exemplarily configured as elongated slots.

The antenna board 20 further comprises a transmission line network 100 with a guiding section 120 that connects a feed port 102 with an additional port 106. The first antenna 300, the second antenna 801, and the third antenna 803 are coupled to the feed port 102 via the additional port 106 and the guiding section 120.

The first antenna 300 is directly coupled to the additional port 106 and the guiding section 120.

The second antenna 801 is coupled to the feed port 102 via the first antenna 300. The third antenna 803 is also coupled to the feed port 102 via the first antenna 300. With the embodiment shown in FIG. 38, the third antenna 803 is coupled to the feed port 102 via the second antenna 801 and the first antenna 300. This results in the first antenna 300, the second antenna 801 and the third antenna 803 being coupled in series to the additional port 106. With other embodiments, the second antenna 801 and the third antenna 803 may be coupled to the first antenna 300 in parallel, as it is shown in FIG. 30 for the first variant of the tenth antenna system 10.

The guiding section 102 is configured to transduce electromagnetic energy within a first frequency band comprising the first frequency, to transduce electromagnetic energy within a second frequency band comprising the second frequency and to transduce electromagnetic energy within a third frequency band comprising the third frequency.

The thirteenth antenna system 800 is configured to transduce electromagnetic energy within the first frequency band over the first antenna 300 and to block the electromagnetic energy within the first frequency band from being transduced via the second antenna 801. Additionally, the thirteenth antenna system 800 is configured to block the electromagnetic energy at the first frequency from being transduced via the third antenna 803.

Furthermore, the thirteenth antenna system 800 is configured to transduce electromagnetic energy within the second frequency band via the second antenna 801 and to block the electromagnetic energy within the second frequency band from being transduced via the third antenna 803. The thirteenth antenna system 800 is exemplarily also configured to transduce the electromagnetic energy within the second frequency band via the first antenna 300. With other embodiments, the thirteenth antenna system 800 may also be configured to block the electromagnetic energy within the second frequency band from being transduced via the first antenna 300.

In addition, the thirteenth antenna system 800 is configured to transduce electromagnetic energy within the third frequency band via the third antenna 803. Additionally, the thirteenth antenna system 800 is exemplarily configured to transduce the electromagnetic energy within the third frequency band also via first antenna 300 and the second antenna 801.

The second antenna 801 is coupled to the feed port 102 via a filter section 810 that is configured to block electromagnetic energy within the first frequency band and to pass electromagnetic energy within the second frequency band. The third antenna 803 is coupled to the feed port 102 via an additional filter section 820 that is configured to block electromagnetic energy within the second frequency band and to pass electromagnetic energy within the third frequency band.

The filter section 810 is additionally configured to pass electromagnetic energy within the third frequency band. The first frequency band therefore constitutes a blocked frequency band of the filter section 810 and the second frequency band and the third frequency band each constitute passed frequency bands of the filter section 810.

Furthermore, the additional filter section 820 is configured to block electromagnetic energy within the second frequency band. The first frequency band and the second frequency band thus constitute blocked frequency bands of the additional filter section 820 and the third frequency band constitutes a passed frequency band of the additional filter section 120.

The filter section 810 and the additional filter section 820 are configured as stepped impedance filters. A width 812 of the filter section 810 is adapted to block the electromagnetic energy within the blocked frequency bands of the filter section 810 and to pass the electromagnetic energy within the passed frequency bands of the filter section 810. Likewise, a width 822 of the additional filter section 820 is adapted to block the electromagnetic energy within the blocked frequency bands of the additional filter section 820 and to pass the electromagnetic energy within the passed frequency bands of the additional filter section 820.

As far as no differences are disclosed in the description or the Figures, the filter section 810 is configured as it is disclosed for the further filter section 385 shown in FIG. 31 and vice versa. Likewise, as far as no differences are disclosed in the description or the Figures, the additional filter section 820 is configured as it is disclosed for the additional further filter section 386 shown in FIG. 31 and vice versa.

Electromagnetic energy within the first frequency band is transduced between the antenna system 800 and a first antenna field of the antenna system 800 via only the first antenna 300. A phase center 840 of electromagnetic energy transduced within the first frequency band thus is located at the first antenna 300. Thereby, the phase center 840 is located at the antenna elements 310 of the first antenna 300.

The electromagnetic energy within the second frequency band is transduced via both the first antenna 300 and the second antenna 801. The first and second antenna 300, 801 thus operate as a single common antenna 807. A phase center 845 of the electromagnetic energy within the second frequency band that is transduced via the common antenna 807 is located in between the first antenna 300 and the second antenna 801.

The parts of the transmission line network 100 and the antennas 300, 801, 803 that are coupled to the feed port 102 constitute a subsystem of the thirteenth antenna system 800. As can be seen from FIG. 38, the thirteenth antenna system 800 comprises a further subsystem that is coupled to an additional feed port 103 of the thirteenth antenna system 800. As far as no differences are disclosed, the subsystem coupled to the additional feed port 103 is configured as it is disclosed for the subsystem coupled to the feed port 102 and vice versa.

A layout of the subsystem coupled to the additional feed port 103 is mirrored with respect to a layout of the subsystem coupled to the feed port 102 along an axis that is orientated parallel to the second transverse direction 552. The subsystem comprises an additional first antenna 410, an additional second antenna 860 and an additional third antenna 865 that are coupled to the additional feed port 103 via an additional guiding section 402 of the transmission line network 100.

The additional third antenna 865, the additional second antenna 860 and the additional first antenna 410 are consecutively located next to each other along the first transverse direction 551.

The additional third antenna 865 thereby is located directly adjacent to the third antenna 803 coupled to the feed port 102. The third antenna 803 and the additional third antenna 865 share a common sidewall 834.

Each common sidewall 830, 832, 834 may comprise a single boundary structure that forms a boundary structure of both neighboring antennas 300, 410, 801, 803, 860, 865 separated by the respective common sidewall 830, 832, 834. This allows to place the antennas 300, 410, 801, 803, 860, 865 at short distances next to each other.

The additional first antenna 410 is directly coupled to a further port 106 that is coupled to the additional feed port 103 via the additional guiding section 402. The additional second antenna 860 is coupled to the additional first antenna 410 via a filter section 810 and the additional third antenna 865 is coupled to the additional first antenna 410 via an additional filter section 820. The filter section 810 and the additional filter section 820 are configured as it is disclosed for the corresponding filter section 810 and the corresponding additional filter section 820 of the subsystem coupled to the feed port 102.

The thirteenth antenna system 800 is configured to transduce the electromagnetic energy within the first frequency band over the additional first antenna 410 and to block the electromagnetic energy within the first frequency band from being transduced via the additional second antenna 860 and the additional third antenna 865. Furthermore, the thirteenth antenna system 800 is configured to transduce the electromagnetic energy within the second frequency band via the additional second antenna 860 and to block electromagnetic energy within the second frequency band from being transduced via the additional third antenna 865. The thirteenth antenna system 800 is also configured to transduce the electromagnetic energy within the third frequency band via the additional third antenna 865.

The thirteenth antenna system 800 is further configured to transduce the electromagnetic energy within the second frequency band and the electromagnetic energy within the third frequency band over the additional first antenna 410 and to transduce the electromagnetic energy within the third frequency band also over the additional second antenna 860. Within the second frequency band, the additional first antenna 310 and the additional second antenna 860 operate as a single common antenna 807 having a phase center 845 located in between the additional first antenna 410 and the additional second antenna 860.

A distance 842 between the phase centers 840 of the first antenna 300 and the additional antenna 410 is larger than a distance 847 between the phase centers 845 of the common antennas 807. The distance 847 thereby is larger than a distance in between the second antenna 801 and the additional second antenna 860.

The radar system 70 depicted in FIG. 38 comprises a radar circuit 60 having a first circuit port 61 that is coupled to the feed port 102 and a second circuit port 62 that is coupled to the additional feed port 103.

The radar circuit 60 is configured to operate in a separated operation mode. In the separated operation mode, antennas 300, 801, 803 that are coupled to the feed port 102 are operated independently from antennas 410, 860, 865 that are coupled to the additional feed port 103. Exemplarily, the radar circuit 60 is configured to operate at least one of the antennas 300, 801, 803 coupled to the feed port 102 to establish a first antenna of a MIMO configuration and to operate at least one of the additional antennas 410, 860, 865 coupled to the additional feed port 103 to establish a second antenna of the MIMO configuration. The first and second antenna are thereby may be established by operating only a single one of the antennas 300, 410, 801, 803, 860, 865 as the respective first or second antenna or by operating a multitude of the antennas 300, 801, 803 as a common antenna forming the first antenna of the MIMO configuration and/or by operating a multitude of the additional antennas 410, 860, 865 as a common antenna forming the second antenna of the MIMO configuration.

With the embodiment shown in FIG. 38, the radar circuit 60 is configured to operate the first antenna 300 as a first antenna of a MIMO configuration and the additional first antenna 410 as a second antenna of the MIMO configuration, the first and second antenna having the distance 842 with respect to each other. The radar signals transduced via the feed port 102 and the additional feed port 103 thereby lie within the first frequency band. The radar signals have mutually differing, such as mutually orthogonal, separability parameters or coding, such as mutually differing phase coding.

The radar circuit 60 is furthermore configured to operate the common antenna 807 formed by the second antenna 801 and the first antenna 300 as a first antenna of a MIMO configuration and the common antenna 807 formed by the additional second antenna 860 and the additional first antenna 410 as a second antenna of the MIMO configuration. The first and second antenna of the MIMO configuration then have the distance 847 in between them. The common antennas 807 are operated with radar signals within the second frequency band.

The distances 842, 847 amount to integer multiples of half a wavelength of electromagnetic energy within an operating frequency band of the thirteenth antenna system 800, such as the first frequency band and/or the second frequency band and/or the third frequency band. Exemplarily, the distance 842 between the phase centers 840 amounts to 2.5 times the wavelength of electromagnetic radiation within the operating frequency band. The distance 847 between the phase centers 845 exemplarily amounts to two times the wavelength of electromagnetic radiation within operating frequency band.

The radar circuit 60 is configured to also operate in a combined operation mode. In the combined operation mode, at least one of the antennas 300, 801, 803 coupled to the feed port 102 and at least one of the additional antennas 410, 860, 865 coupled to the additional feed port 103 are operated as a single common antenna. Thereby, radar signals having the same frequency and the same separability parameter or coding, such as the same phase coding, are simultaneously routed via the feed port 102 and the additional feed port 103.

With the embodiment shown in FIG. 38, all antennas 300, 801, 803 and all additional antennas 410, 860, 865 are operated as the common antenna in the combined operation mode. To this end, radar signals within the third frequency band are simultaneously routed via the feed port 102 and the additional feed port 103, whereby the radar signals have the same separability parameter or coding, such as the same phase coding. This establishes a single common antenna having a phase center 849 that is exemplarily located at the center of the antenna arrangement comprising the antennas 300, 801, 803 and the additional antennas 410, 860, 865.

The distances between the centers of the individual antennas 300, 410, 801, 803, 860, 865 may amount to half the wavelength at the operating frequency of the antennas 300, 410, 801, 803, 860, 865, such as within the first, second or third frequency band. This avoids a formation of grating lobes in the combined mode of operation.

Compared to operating only a single one of the antennas 300, 410, 801, 803, 860, 865, an antenna gain of the combined antenna 805 is at least 3 dB, such as at least 5 dB, 6 dB or 7 dB. Furthermore, transducing electromagnetic energy via two feed ports 102, 103 provides an increase of the routed power of 3 dB. In total, this results in an increase of the gain of at least 6 dB, such as at least 8 dB, 9 dB or 10 dB.

With the thirteenth antenna system 800, a width of a main antenna lobe of the common antennas 805, 807 in a transverse direction is smaller than respective widths of main antenna lobes of the first antennas 300, 410. Furthermore, a direction of a main antenna lobe of the common antennas 805, 807 may differ from directions of respective main antenna lobes of the first antennas 300, 410.

With some embodiments, the respective main antenna lobes of the first antennas 300, 410 are orientated parallel to the boresight direction 553. At least one of the respective main antenna lobes of the common antenna 807 and the common antenna 805, such as all main antenna lobes of the common antennas 805, 807, are tilted with respect to the boresight direction 553, for example by an angle of ±60° and/or along the first transverse direction 551.

With some embodiment, the second antennas 301, 860 and the third antennas 803, 865 have a main antenna lobe that is tilted with respect to the boresight direction 553 along the first transverse direction 551, exemplarily by an amount of 60°.

Two embodiments of the thirteenth antenna system 800 that have tilted main antenna lobes of the second antennas 301, 860 and/or the third antennas 803, 865 may be mounted at two opposite corners of a vehicle, such as at two opposite front corners of the vehicle. Thereby, the thirteenth antenna systems 800 may be exemplarily mounted in orientations that direct the tilted main antenna lobes towards a forward direction of the vehicle. This results in a combined main antenna lobe that is directed in the driving direction.

For example, the tilted main antenna lobes of the antenna system mounted at the left corner of the vehicle may be tilted by positive angles, such as by +60°, along the first transverse direction 551 and the tilted main antenna lobes of the antenna system mounted at the right corner of the vehicle may be tilted by negative angles, such as by minus 60°, along the first transverse direction 551.

A radar system comprising two embodiments of a radar antenna system 1, 2, 3, 4, 5, 6, 7, 8, 9, 10, 12, 600, 800 according to the present disclosure that are configured to be mounted to the same vehicle may be configured to operate both antenna systems 800 in a combined mode of operation to form a combined antenna comprising antennas of both radar antenna systems. For example, such a radar system may comprise two of the thirteenth radar antenna system 800 and the combined antennas 805 of the individual thirteenth radar antenna systems 800 may be operated to form a further combined antenna.

The thirteenth antenna system 800 may comprise a further antenna that is connected to the feed port 102 via at least a branching section. The further antenna and its connection to the feed port 102 may be configured as it is disclosed for the second antennas 350 of any of the radar antenna systems 1, 2, 3, 4, 5, 6, 7, 8, 9, 10, 12 according to the present disclosure.

With the thirteenth antenna system 800 shown in FIG. 38, the first frequency is smaller than the second frequency and the second frequency is smaller than the third frequency. As an example, the first frequency amounts to 76.5 GHz, the second frequency to 78 GHz and the third frequency to 80.5 GHz. The first frequency band has a lower bound of 75.75 GHz and an upper bound of 77.25 GHz. The second frequency band has a lower bound of 77.75 GHz and an upper bound of 78.25 GHz. The third frequency band has a lower bound of 79.5 GHz and an upper bound of 81 GHz.

In general, the radar circuits 60 connected to the tenth antenna system 10, to the eleventh antenna system 600 and to the thirteenth antenna system 800 may operate, in the separated operation mode, a first antenna connected to the feed port 102 and a first antenna connected to the additional feed port 103 as two separate antennas, for example as two separate antennas of a MIMO configuration. In addition, the radar circuit 60 may operate in the combined operation mode a second antenna connected to the feed port 102 and a second antenna connected to the additional feed port 103 as a single common antenna.

The first and second antennas coupled to the same feed port 102, 103 thereby may be separate antennas. The second antennas may be located directly adjacent to each other. Additionally, they may be located in between the first antennas. Placing the second antennas next to each other avoids a generation of grating lobes in the combined operation mode.

In addition to the second antennas, also the first antennas may be operated in the combined operation mode as parts of the single common antenna.

Embodiments of radar antenna systems, radar systems and vehicles according to the present disclosure encompass the following:

Embodiment 1: Radar antenna system (1, 2, 3, 4, 5, 6, 7, 8, 9, 10, 12, 600, 800) for a vehicle (80) comprising a first antenna (300), a second antenna (350) and a transmission line network (100), wherein the transmission line network (100) has a guiding section (110), a branching section (180) and a coupling section (130) with a filter section (132), wherein the transmission line network (100) couples the first antenna (300) and the second antenna (350) to the guiding section (110) via the branching section (180), wherein the second antenna (350) is coupled to the branching section (180) via the filter section (132), wherein the guiding section (110) is configured to guide electromagnetic energy at a first frequency (258) and to guide electromagnetic energy at a second frequency (259), wherein the filter section (132) is configured to block electromagnetic energy at the first frequency (258) and to pass electromagnetic energy at the second frequency (259), wherein all sections (110, 120, 180, 200) of the transmission line network (100) that couple the first antenna (300) to the guiding section (110) are configured to pass electromagnetic energy at the first frequency (258).

Embodiment 2: The radar antenna system (1, 2, 3, 4, 5, 6, 7, 8, 9, 10, 12, 600, 800) of embodiment 1, wherein the transmission line network (100) is configured as a substrate integrated waveguide.

Embodiment 3: The radar antenna system (1, 2, 3, 4, 5, 6, 7, 8, 9, 10, 12, 600, 800) of at least one of the preceding embodiments, wherein the guiding section (110) and the first antenna (300) share a common sidewall (114).

Embodiment 4: The radar antenna system (1, 2, 3, 4, 5, 6, 7, 8, 9, 10, 12, 600, 800) of at least one of the preceding embodiments, wherein the coupling section (130) and the first antenna (300) share a common sidewall (138)

Embodiment 5: The radar antenna system (1, 2, 3, 4, 5, 6, 7, 8, 9, 10, 12, 600, 800) of at least one of the preceding embodiments, having an additional first antenna (410), wherein the first antenna (300) and the additional first antenna (410) are placed at a distance (420) from each other in a separation direction (24), wherein the second antenna (350) is placed in between the first antenna (300) and the additional first antenna (410), wherein the filter section (132) and/or the branching section (180) are placed in between the first antenna (300) and the additional first antenna (410).

Embodiment 6: The radar antenna system (1, 2, 3, 4, 5, 6, 7, 8, 9, 10, 12, 600, 800) of at embodiment 5, wherein the guiding section (110) and the additional first antenna (410) share a common sidewall (114).

Embodiment 7: The radar antenna system (1, 2, 3, 4, 5, 6, 7, 8, 9, 10, 12, 600, 800) of at least one of embodiments 5 and 6, wherein the coupling section (130) and the additional first antenna (410) share a common sidewall (138).

Embodiment 8: The radar antenna system (1, 2, 3, 4, 5, 6, 7, 8, 9, 10, 12, 600, 800) of at least one of embodiment 5 to 7, wherein the distance (420) between the first antenna (300) and the additional first antenna (410) equals at most four times, such as at most 3.5 times or three times, a transverse width (301) of the first antenna (300) and/or a transverse width (411) of the additional first antenna (410).

Embodiment 9: The radar antenna system (1, 2, 3, 4, 5, 6, 7, 8, 9, 10, 12, 600, 800) of at least one of embodiment 5 to 8, wherein the distance (420) between the first antenna (300) and the additional first antenna (410) equals at most 2.5 times, such as at most two times or 1.5 times, a wavelength of electromagnetic energy having the first or second frequency (259).

Embodiment 10: The radar antenna system (1, 2, 3, 4, 5, 6, 7, 8, 9, 10, 12, 600, 800) of at least one of embodiment 5 to 9, wherein the first antenna (300) and the additional first antenna (410) are part of an antenna arrangement that is configured to be operated in a MIMO configuration for determining an angular position of an irradiated target object, for example along the separation direction (24).

Embodiment 11: The radar antenna system (1, 2, 3, 4, 5, 6, 7, 8, 9, 10, 12, 600, 800) of at least one of the preceding embodiments, wherein a transverse width (134) of the coupling section (130) and/or a transverse width (351) of the second antenna (350) each are at most two times, such as at most 1.5 times or at most one time, a transverse width (301) of the first antenna (300) and/or a transverse width (411) of an additional first antenna (410).

Embodiment 12: The radar antenna system (1, 2, 3, 4, 5, 6, 7, 8, 9, 10, 12, 600, 800) of at least one of the preceding embodiments, wherein a transverse width (147) of the coupling section (130) and/or a transverse width (351) of the second antenna (350) each are at most 1.5 times, such as at most one time or at most one half, a wavelength of the electromagnetic energy having the first or second frequency (259).

Embodiment 13: The radar antenna system (1, 2, 3, 4, 5, 6, 7, 8, 9, 10, 12, 600, 800) of at least one of the preceding embodiments, wherein the coupling section (130) runs at least partly parallel to the first antenna (300) and/or an additional first antenna (410), wherein, for example, the coupling section (130) runs offset from the guiding section (110) and/or the branching section (180) in between the first antenna (300) and the additional first antenna (410).

Embodiment 14: The radar antenna system (1, 2, 3, 4, 5, 6, 7, 8, 9, 10, 12, 600, 800) of at least one of the preceding embodiments, wherein the transmission line network (100) comprises an additional branching section (200) and an additional coupling section (160) having an additional filter section (162), wherein a first end (201) and a third end (203) of the additional branching section (200) are coupled between the guiding section (110) and the first antenna (300), wherein a second end (202) of the additional branching section (200) is coupled to the additional filter section (132) that is configured to block electromagnetic energy having the first frequency (258) and to pass electromagnetic energy having the second frequency (259).

Embodiment 15: The radar antenna system (1, 2, 3, 4, 5, 6, 7, 8, 9, 10, 12, 600, 800) of embodiment 14, wherein the coupling section (130) and the additional coupling section (160) are placed adjacent to each other and/or wherein the coupling section (130) and the additional coupling section (160) share a common sidewall (137).

Embodiment 16: The radar antenna system (1, 2, 3, 4, 5, 6, 7, 8, 9, 10, 12, 600, 800) of at least one of embodiments 14 and 15, wherein the additional filter section (162) couples the additional branching section (200) to the second antenna (350).

Embodiment 17: The radar antenna system (1, 2, 3, 4, 5, 6, 7, 8, 9, 10, 12, 600, 800) of embodiment 16, wherein the second antenna (350) comprises an antenna element (355) that is coupled to the guiding section (110) via both the filter section (132) and the additional filter section (162).

Embodiment 18: The radar antenna system (1, 2, 3, 4, 5, 6, 7, 8, 9, 10, 12, 600, 800) of embodiment 17, wherein the branching section (180) and the additional branching section (200) are coupled to the antenna element (355) from different directions, such as from opposite directions.

Embodiment 19: The radar antenna system (1, 2, 3, 4, 5, 6, 7, 8, 9, 10, 12, 600, 800) of at least one of embodiments 17 and 18, wherein the transmission line network (100) is configured to route a first portion of electromagnetic energy between the antenna element (355) and the guiding section (110) via the filter section (132) and to route a second portion of electromagnetic energy between the antenna element (355) and the guiding section (110) via the additional filter section (162).

Embodiment 20: The radar antenna system (1, 2, 3, 4, 5, 6, 7, 8, 9, 10, 12, 600, 800) of embodiment 19, wherein the transmission line network (100) is configured to route the first and second portion with a relative phase shift to the antenna element (355), such as a 180° phase shift.

Embodiment 21: The radar antenna system (1, 2, 3, 4, 5, 6, 7, 8, 9, 10, 12, 600, 800) of at least one of embodiments 16 to 20, wherein the second antenna (350) comprises a first antenna element (356) and a second antenna element (357), wherein the first antenna element (356) is coupled to the guiding section (110) via the filter section (132) but not via the additional filter section (162), wherein the second antenna element (357) is coupled to the guiding section (110) via the additional filter section (162) but not via the filter section (132).

Embodiment 22: The radar antenna system (1, 2, 3, 4, 5, 6, 7, 8, 9, 10, 12, 600, 800) of at least one of embodiments 14 and 15, wherein the additional filter section (162) couples the additional branching section (200) to a termination, such as a standing wave termination (220), of the transmission line network (100).

Embodiment 23: The radar antenna system (1, 2, 3, 4, 5, 6, 7, 8, 9, 10, 12, 600, 800) of at least one of the preceding embodiments, wherein the second antenna (350) comprises two antenna elements (355, 356, 357) that are serially coupled to the filter section (132).

Embodiment 24: The radar antenna system (1, 2, 3, 4, 5, 6, 7, 8, 9, 10, 12, 600, 800) of at least one of the preceding embodiments, wherein a width (502) of a main antenna lobe (501) of the first antenna (300) in a transverse direction (552) differs from a width (512) of a main antenna lobe (511) of the second antenna (350) in the transverse direction (552), wherein, for example, the width (502) of the main antenna lobe (501) of the first antenna (300) in the transverse direction (552) is smaller than the width (512) of the main antenna lobe (511) of the second antenna (350) in the transverse direction (552).

Embodiment 25: The radar antenna system (1, 2, 3, 4, 5, 6, 7, 8, 9, 10, 12, 600, 800) of at least one of the preceding embodiments, wherein a direction (513) of a main antenna lobe (511) of the second antenna (350) is different from a direction (503) of the main antenna lobe (501) of the first antenna (300).

Embodiment 26: The radar antenna system (1, 2, 3, 4, 5, 6, 7, 8, 9, 10, 12, 600, 800) of at least one of the preceding embodiments, wherein a polarization of the first antenna (300) differs from a polarization of the second antenna (350).

Embodiment 27: The radar antenna system (1, 2, 3, 4, 5, 6, 7, 8, 9, 10, 12, 600, 800) of at least one of the preceding embodiments, wherein the second antenna (350) comprises an antenna element (355, 356, 367) that is configured as a transversely fed slot.

Embodiment 28: The radar antenna system (1, 2, 3, 4, 5, 6, 7, 8, 9, 10, 12, 600, 800) of at least one of the preceding embodiments, wherein the first antenna (300) and/or an additional first antenna (410) have a transverse width (301, 411) parallel to the separation direction (24) that is at most one time, such as at most one half a wavelength of electromagnetic radiation having the first or second frequency (258, 259).

Embodiment 29: The radar antenna system (1, 2, 3, 4, 5, 6, 7, 8, 9, 10, 12, 600, 800) of at least one of the preceding embodiments, wherein the first antenna (300) and/or an additional first antenna (410) extend perpendicular to the separation direction (24).

Embodiment 30: The radar antenna system (1, 2, 3, 4, 5, 6, 7, 8, 9, 10, 12, 600, 800) of at least one of the preceding embodiments, further comprising a third antenna (370), wherein the transmission line network (100) couples the third antenna (370) to the guiding section (110), wherein the filter section (132) is configured to block electromagnetic energy having a third frequency, wherein all sections (110, 120, 180, 200) of the transmission line network (100) that couple the first antenna (300) to the guiding section (110) are configured to pass electromagnetic energy having the third frequency, wherein the radar antenna system (1, 2, 3, 4, 5, 6, 7, 8, 9, 10, 12, 600, 800) is configured to transduce via the third antenna (370) electromagnetic energy having the third frequency and to block electromagnetic energy having the first frequency (258) from being transduced via the third antenna (370).

Embodiment 31: The radar antenna system (1, 2, 3, 4, 5, 6, 7, 8, 9, 10, 12, 600, 800) of embodiment 30, wherein the third antenna (370) is coupled to the guiding section (110) via the branching section (180).

Embodiment 32: The radar antenna system (1, 2, 3, 4, 5, 6, 7, 8, 9, 10, 12, 600, 800) of at least one of embodiments 30 and 31, wherein the third antenna (370) is coupled to the guiding section (110) via at least a part of the first antenna (300).

Embodiment 33: The radar antenna system (1, 2, 3, 4, 5, 6, 7, 8, 9, 10, 12, 600, 800) of at least one of embodiments 30 to 32, wherein the first antenna (300) is configured to transduce electromagnetic energy at both the first frequency (258) and the third frequency.

Embodiment 34: The radar antenna system (1, 2, 3, 4, 5, 6, 7, 8, 9, 10, 12, 600, 800) of at least one of embodiments 30 to 33, wherein the third antenna (370) is orientated parallel to the first antenna (300).

Embodiment 35: The radar antenna system (1, 2, 3, 4, 5, 6, 7, 8, 9, 10, 12, 600, 800) of at least one of embodiments 30 to 34, wherein the third antenna (370) is located directly adjacent to the first antenna (300) and/or wherein the third antenna (370) and the first antenna (300) share a common sidewall (315).

Embodiment 36: The radar antenna system (1, 2, 3, 4, 5, 6, 7, 8, 9, 10, 12, 600, 800) of at least one of embodiments 30 to 35, wherein the first antenna (300) and/or the third antenna (370) are configured as slotted waveguide antennas.

Embodiment 37: The radar antenna system (1, 2, 3, 4, 5, 6, 7, 8, 9, 10, 12, 600, 800) of at least one of embodiments 30 to 36, wherein the third antenna (370) is coupled to the guiding section (110) via a further filter section (385) of the transmission line network (100), wherein the further filter section (385) is configured to pass electromagnetic energy having the third frequency and to block electromagnetic energy having the first frequency (258).

Embodiment 38: The radar antenna system (1, 2, 3, 4, 5, 6, 7, 8, 9, 10, 12, 600, 800) of embodiment 37, wherein the further filter section (385) is configured as a stepped impedance filter.

Embodiment 39: The radar antenna system (1, 2, 3, 4, 5, 6, 7, 8, 9, 10, 12, 600, 800) of at least one of embodiments 37 and 38, wherein the further filter section (385) is configured as a section of a substrate integrated waveguide.

Embodiment 40: The radar antenna system (1, 2, 3, 4, 5, 6, 7, 8, 9, 10, 12, 600, 800) of at least one of embodiments 30 to 39, wherein the third antenna (370) comprises a first antenna element (381) and a second antenna element (382), wherein the first antenna element (381) is coupled to the guiding section (110) via the further filter section (385), wherein the second antenna element (382) is coupled to the guiding section (110) via an additional further filter section (386), wherein the additional further filter section (386) is configured to pass electromagnetic energy having the third frequency and to block electromagnetic energy having the first frequency (258).

Embodiment 41: The radar antenna system (1, 2, 3, 4, 5, 6, 7, 8, 9, 10, 12, 600, 800) of embodiment 40, wherein the further filter section (385) and the additional further filter section (386) are coupled to the guiding section (110) via at least a part of the first antenna (300), wherein the further filter section (385) and the additional further filter section (386) are coupled to the first antenna (300) at different ends (303, 304) of the first antenna (300), such as opposite ends (303, 304) of the first antenna (300), wherein the first antenna (300) is coupled to the guiding section (110) in between the different ends (303, 304) of the first antenna (300).

Embodiment 42: The radar antenna system (1, 2, 3, 4, 5, 6, 7, 8, 9, 10, 12, 600, 800) of at least one embodiments 30 to 41, wherein a width (522) of a main antenna lobe (521) of the third antenna (370) in a transverse direction (552) is smaller than a width (502) of a main antenna lobe (501) of the first antenna (300) and/or a width (512) of a main antenna lobe (511) of the second antenna (350).

Embodiment 43: The radar antenna system (1, 2, 3, 4, 5, 6, 7, 8, 9, 10, 12, 600, 800) of at least one embodiments 30 to 42, further comprising an additional third antenna (440), wherein the radar antenna system (1, 2, 3, 4, 5, 6, 7, 8, 9, 10, 12, 600, 800) is configured to transduce via the additional third antenna (440) electromagnetic energy having the third frequency and to block electromagnetic energy having the first frequency (258) from being transduced via the additional third antenna (440), wherein the third antenna (370) and the additional third antenna (440) are located next to each other, wherein, for example, the third antenna (370) and the additional third antenna (370) share a common sidewall (376).

Embodiment 44: The radar antenna system (1, 2, 3, 4, 5, 6, 7, 8, 9, 10, 12, 600, 800) of embodiment 43, wherein the additional third antenna (440) is coupled to an additional guiding section (402) that is separate from the guiding section (110), wherein the guiding section (110) and the additional guiding section (402) are configured to connect to separate ports (61, 62, 63, 64) of a radar circuit (60).

Embodiment 45: A radar system (70) comprising a radar antenna system (1, 2, 3, 4, 5, 6, 7, 8, 9, 10, 12, 600, 800) of one of the preceding embodiments and a radar circuit (60), wherein a port (62) of the radar circuit (60) is coupled to the guiding section (110) of the radar antenna system (1, 2, 3, 4, 5, 6, 7, 8, 9, 10, 12, 600, 800), wherein the radar circuit (60) is configured to separately handle a first radar signal having the first frequency (258) and a second radar signal having the second frequency (259) to selectively activate the first antenna (300) or the second antenna (350).

Embodiment 46: The radar system (70) of embodiment 45 and at least one of embodiments 43 and 44, wherein the radar circuit (60) has a first port (61) that is coupled to the guiding section (110) and a second port (62) that is coupled to the additional guiding section (402), wherein the radar circuit (60) is configured to operate the third antenna (370) and the additional third antenna (440) as a single common antenna by simultaneously routing a first one of two radar signals via the first port (61) and a second one of the two radar signals via the second port (62), wherein each of the two radar signals has the third frequency.

Embodiment 47: The radar system (70) of embodiment 46, wherein each of the two radar signals has a same phase coding.

Embodiment 48: Vehicle (80) comprising a radar antenna system (1, 2, 3, 4, 5, 6, 7, 8, 9, 10, 12, 600, 800) of at least one of the embodiments 1 to 44.

The various embodiments described above are provided by way of illustration only and should not be construed to limit the invention. Those skilled in the art will readily recognize various modifications and changes that may be made to the present invention without following the example embodiments and applications illustrated and described herein, and without departing from the scope of the present disclosure.

It will be understood that what has been described for one of the methods above may analogously hold true for the computer system 1000.

REFERENCE NUMERAL LIST

1 first antenna system
2 second antenna system
3 third antenna system
4 fourth antenna system
5 fifth antenna system
6 sixth antenna system
7 seventh antenna system
8 eighth antenna system
9 ninth antenna system
10 tenth antenna system
12 twelfth antenna system
20 antenna board
24 separation direction
25 height
30 substrate
31 top plate
32 bottom plate
60 radar circuit
61 first circuit port
62 second circuit port
63 third circuit port
64 fourth circuit port
70 radar system
80 vehicle
81 forward direction
82 azimuthal direction
83 elevation direction
84 ground
85 vehicle control system
100 transmission line network
101 longitudinal direction
102 feed port
103 additional feed port
104 port
106 additional port
108 further port
109 further feed ports
110 guiding section
112 transverse width
114 sidewall
116 lateral boundary structure
120 additional feed section
121 width
125 longitudinal path
130 coupling section
132 filter section
134 transverse width
135 length
137 sidewall
138 sidewall
140 lateral boundary structure
146 feed section
147 transverse width
149 lateral boundary structure
160 additional coupling section
162 additional filter section
164 transverse width
165 length

166 further feed section
167 width
180 branching section
181 first end
182 second end
183 third end
184 width
185 guiding segment
186 transverse width
200 additional branching section
201 first end
202 second end
203 third end
205 guiding segment
206 width
220 standing wave termination
240 frequency
241 portions
242 threshold frequency
243 stop band
244 pass band
245 first frequency band
250 reduced first frequency band
251 second frequency band
252 third frequency band
254 bandwidth
255 transmission
256 reflection
258 first frequency
259 second frequency
260 transmission to additional port
262 transmission to further port
300 first antenna
301 transverse width
303 first end
304 second end
310 antenna element
320 bandwidth
350 second antenna
351 transverse width
355 antenna element
356 first antenna element
357 second antenna element
358 separating structure
359 third antenna element
360 fourth antenna element
365 power divider
370 third antenna
372 first segment
373 second segment
374 common sidewall
375 first sidewall
376 second sidewall
377 feed section
378 port
381 first antenna element
382 second antenna element
385 further filter section
386 additional further filter section
387 bent segment
388 lateral iris wall
402 additional guiding section
410 additional first antenna
411 transverse width
420 distance
430 additional second antenna
440 additional third antenna 501 main antenna lobe
502 width
503 direction
511 main antenna lobe
512 width
513 direction
521 main antenna lobe
522 width
551 first transverse direction
552 second transverse direction
553 boresight direction
555 first angle
556 second angle
558 antenna gain
559 first antenna gain
560 second antenna gain
561 first detection region
562 second detection region
565 antenna gain along first transverse direction
566 antenna gain along second transverse direction
600 eleventh antenna system
602 second antenna
603 third antenna
604 fourth antenna
605 first subsystem
606 second subsystem
610 fourth end
611 first filter section
612 second filter section
613 third filter section
621 second sidewall
622 third sidewall
623 fourth sidewall
632 antenna elements
633 antenna elements
634 antenna elements
701 first detection range
702 second detection range
703 third detection range
704 fourth detection range
705 fifth detection range
710 detection range
800 thirteenth antenna system
801 second antenna
802 antenna elements
803 third antenna
804 antenna elements
805 common antenna
807 further common antenna
810 filter section
812 width
820 additional filter section
822 width
830 common sidewall
832 common sidewall
834 common sidewall
840 phase center
842 distance
845 phase center
847 distance
849 phase center
860 additional second antenna
865 additional third antenna

The invention claimed is:

1. A radar antenna system for a vehicle comprising:
a first antenna, a second antenna, and a transmission line network;

wherein:
the transmission line network has a guiding section, a branching section, an additional branching section, a filter section and an additional filter section;
the branching section and the additional branching section are coupled in series in between the guiding section and the first antenna;
the filter section is coupled in parallel to the first antenna via the branching section and the additional filter section is coupled in parallel to the first antenna via the additional branching section;
the filter section is configured to block electromagnetic energy at a first frequency and to pass electromagnetic energy at a second frequency;
the additional filter section is configured to block electromagnetic energy at the first frequency and to pass electromagnetic energy that is at a different frequency from the first frequency;
the branching section and the additional branching section are configured to pass electromagnetic energy at the first frequency;
the filter section couples the guiding section to the second antenna; and
the additional filter section couples the guiding section to the second antenna or to a termination of the transmission line network.

2. The radar antenna system of claim 1, wherein the different frequency equals the second frequency.

3. The radar antenna system of claim 1, wherein an end of the branching section that couples to the filter section and an end of the additional branching section that couples to the additional filter section are located at opposite sides from a longitudinal path connecting the guiding section to the first antenna via the branching section and the additional branching section.

4. The radar antenna system of claim 1, wherein the additional branching section is coupled in between the branching section and the first antenna.

5. The radar antenna system of claim 1, wherein the transmission line network is configured as a substrate integrated waveguide network.

6. The radar antenna system of claim 1, wherein the filter section and/or the additional filter section are configured as stepped impedance filters.

7. The radar antenna system of claim 1, wherein the second antenna comprises two antenna elements that are serially coupled to the filter section.

8. The radar antenna system of claim 1, wherein the second antenna comprises an antenna element that is configured as a transversely fed elongated element.

9. The radar antenna system of claim 1, wherein the second antenna comprises an antenna element that is configured as a longitudinally fed elongated element.

10. The radar antenna system of claim 1, wherein:
the additional filter section couples the guiding section to the second antenna;
the second antenna comprises an antenna element that is coupled to the guiding section via both the filter section and the additional filter section.

11. The radar antenna system of claim 1, wherein:
the additional filter section couples the guiding section to the second antenna;
the second antenna comprises a first antenna element and a second antenna element;
the first antenna element is coupled to the guiding section via the filter section but not via the additional filter section; and the second antenna element is coupled to the guiding section via the additional filter section but not via the filter section.

12. The radar antenna system of claim 1, wherein a polarization of the first antenna differs from a polarization of the second antenna.

13. The radar antenna system of claim 1, wherein:

a width of a main antenna lobe of the first antenna in a transverse direction differs from a width of a main antenna lobe of the second antenna in the transverse direction; and/or a direction of a main antenna lobe of the second antenna is different from a direction of the main antenna lobe of the first antenna.

14. A vehicle comprising the radar antenna system of claim 1.

15. A radar system comprising:

a radar circuit;

a radar antenna system for a vehicle, the radar antenna system being connected to the radar circuit and including a first antenna, a second antenna, and a transmission line network;

wherein:

the transmission line network has a guiding section, a branching section, an additional branching section, a filter section and an additional filter section;

the branching section and the additional branching section are coupled in series in between the guiding section and the first antenna;

the filter section is coupled in parallel to the first antenna via the branching section and the additional filter section is coupled in parallel to the first antenna via the additional branching section;

the filter section is configured to block electromagnetic energy at a first frequency and to pass electromagnetic energy at a second frequency;

the additional filter section is configured to block electromagnetic energy at the first frequency and to pass electromagnetic energy that is at a different frequency from the first frequency;

the branching section and the additional branching section are configured to pass electromagnetic energy at the first frequency;

the filter section couples the guiding section to the second antenna; and the additional filter section couples the guiding section to the second antenna or to a termination of the transmission line network.

16. The radar system of claim 15, wherein the different frequency equals the second frequency.

17. The radar system of claim 15, wherein an end of the branching section that couples to the filter section and an end of the additional branching section that couples to the additional filter section are located at opposite sides from a longitudinal path connecting the guiding section to the first antenna via the branching section and the additional branching section.

18. The radar system of claim 15, wherein the additional branching section is coupled in between the branching section and the first antenna.

19. The radar system of claim 15, wherein the transmission line network is configured as a substrate integrated waveguide network.

20. The radar system of claim 15, wherein the filter section and/or the additional filter section are configured as stepped impedance filters.

* * * * *